(12) United States Patent
Kim et al.

(10) Patent No.: US 10,416,883 B2
(45) Date of Patent: Sep. 17, 2019

(54) USER TERMINAL APPARATUS AND CONTROLLING METHOD THEREOF

(71) Applicant: SAMSUNG ELECTRONICS CO., LTD., Suwon-si (KR)

(72) Inventors: Dae-myung Kim, Hwaseong-si (KR); Il-ho Lee, Suwon-si (KR); Hyun-sub Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 15/249,713

(22) Filed: Aug. 29, 2016

(65) Prior Publication Data

US 2016/0364139 A1 Dec. 15, 2016

Related U.S. Application Data

(63) Continuation of application No. 15/153,942, filed on May 13, 2016, now abandoned.
(Continued)

(30) Foreign Application Priority Data

Dec. 23, 2015 (KR) .................. 10-2015-0184658

(51) Int. Cl.
*G06F 3/0488* (2013.01)
*G06F 3/041* (2006.01)
(Continued)

(52) U.S. Cl.
CPC .......... *G06F 3/04886* (2013.01); *G06F 1/169* (2013.01); *G06F 1/1626* (2013.01);
(Continued)

(58) Field of Classification Search
CPC .................. G06F 1/1643; A61B 8/4477
(Continued)

(56) References Cited

U.S. PATENT DOCUMENTS 7,088,342 B2  8/2006 Rekimoto et al.
8,417,297 B2  4/2013 Lee et al.
(Continued)

FOREIGN PATENT DOCUMENTS

CN  101676853 A  3/2010
CN  101893914 A  11/2010
(Continued)

OTHER PUBLICATIONS

International Search Report dated Aug. 8, 2016 issued by International Searching Authority in counterpart International Application No. PCT/KR2016/005141.
(Continued)

*Primary Examiner* — Cao H Nguyen
(74) *Attorney, Agent, or Firm* — Sughrue Mion, PLLC

(57) ABSTRACT

A user terminal apparatus is provided. The user terminal device includes a display having a main display area disposed on a front side of the user terminal apparatus and a sub display area extended from one side of the main display area to be disposed on at least one area of a rear side of the user terminal apparatus and a processor configured to, in response to a predetermined touch input being input on the sub display area, control the display to display a UI displayed on the sub display area on the main display area.

16 Claims, 51 Drawing Sheets

Related U.S. Application Data

(60) Provisional application No. 62/169,732, filed on Jun. 2, 2015.

(51) Int. Cl.
*G06F 1/16* (2006.01)
*G06F 3/0354* (2013.01)
*H04M 1/02* (2006.01)

(52) U.S. Cl.
CPC .......... *G06F 1/1637* (2013.01); *G06F 1/1643* (2013.01); *G06F 1/1652* (2013.01); *G06F 3/03547* (2013.01); *G06F 3/0416* (2013.01); *G06F 3/04883* (2013.01); *G06F 2203/04804* (2013.01); *H04M 1/0268* (2013.01); *H04M 2250/16* (2013.01); *H04M 2250/22* (2013.01)

(58) Field of Classification Search
USPC .................................................. 715/763–765
See application file for complete search history.

(56) References Cited

U.S. PATENT DOCUMENTS

| | | | |
|---|---|---|---|
| 8,497,884 | B2 | 7/2013 | Cholewin et al. |
| 9,081,541 | B2 | 7/2015 | Jung |
| 9,377,892 | B2* | 6/2016 | Kim .................... G06F 3/0416 |
| 2010/0045621 | A1 | 2/2010 | Kang et al. |
| 2010/0064212 | A1 | 3/2010 | Snyder |
| 2010/0066698 | A1 | 3/2010 | Seo |
| 2010/0298032 | A1 | 11/2010 | Lee et al. |
| 2011/0128241 | A1* | 6/2011 | Kang .................... G06F 1/1643 |
| | | | 345/173 |
| 2011/0159927 | A1 | 6/2011 | Choi |
| 2012/0060089 | A1 | 3/2012 | Heo et al. |
| 2014/0009415 | A1 | 1/2014 | Nishida |
| 2014/0123013 | A1 | 5/2014 | Lee et al. |
| 2014/0164976 | A1 | 6/2014 | Kim et al. |
| 2014/0218309 | A1 | 8/2014 | Park |
| 2014/0247229 | A1 | 9/2014 | Cho et al. |
| 2014/0303501 | A1* | 10/2014 | Jin ...................... A61B 8/4477 |
| | | | 600/459 |
| 2014/0375596 | A1 | 12/2014 | Kim et al. |
| 2015/0123916 | A1 | 5/2015 | Inomata |
| 2016/0070407 | A1* | 3/2016 | Jeon ...................... G06F 1/1626 |
| | | | 345/173 |

FOREIGN PATENT DOCUMENTS

| | | |
|---|---|---|
| CN | 103250128 A | 8/2013 |
| CN | 103793170 A | 5/2014 |
| EP | 2779603 A2 | 9/2014 |
| JP | 2011-150511 A | 8/2011 |
| JP | 2011-203808 A | 10/2011 |
| JP | 2013-130551 A | 7/2013 |
| JP | 2013-131190 A | 7/2013 |
| KR | 10-2010-0034391 A | 4/2010 |
| KR | 2012-0036212 A | 4/2012 |
| KR | 10-1314679 B1 | 10/2013 |
| WO | 2012044788 A2 | 4/2012 |

OTHER PUBLICATIONS

Written Opinion dated Aug. 8, 2016 issued by International Searching Authority in counterpart International Application No. PCT/KR2016/005141.

Communication dated Feb. 9, 2018, from the European Patent Office in counterpart European Application No. 16185161.3.

Communication dated Feb. 22, 2017 issued by the European Patent Office in counterpart European Patent Application No. 16185161.3.

Communication dated Oct. 2, 2018 by the European Patent Office in counterpart European Patent Application No. 16185161.3.

Communication dated, Dec. 27, 2018 issued by the State Intellectual Property Office of P.R. China in counterpart Chinese Application No. 201610709273.2.

* cited by examiner

USER TERMINAL APPARATUS AND CONTROLLING METHOD THEREOF

CROSS-REFERENCE TO RELATED APPLICATIONS

This application is a continuation application of U.S. patent application Ser. No. 15/153,942 filed on May 13, 2016, which claims priority from Korean Patent Application No. 10-2015-0184658, filed in the Korean Intellectual Property Office on Dec. 23, 2015, and the benefit of U.S. Provisional Patent Application No. 62/169,732, filed in the United States Patent and Trademark Office on Jun. 2, 2015, the disclosures of which are incorporated herein by references in their entireties.

BACKGROUND

1. Field

Methods and apparatuses consistent with exemplary embodiments relate to a user terminal apparatus and a controlling method thereof, and more particularly, to a user terminal apparatus that provides various user interactions by using a display disposed on the front side and the back side of the user terminal apparatus and a controlling method thereof.

2. Description of the Related Art

With the development of electronic technologies, various types of electronic apparatuses have been used. Recently, a half round display where a display is extended to the back of an electronic apparatus using out-bending has been developed.

However, when a user uses this kind of electronic apparatus, the user needs to flip the electronic apparatus to see the contents displayed on the rear display.

Meanwhile, because the electronic apparatus is controllable by touching the rear display, a method of utilizing a rear touch is required.

In addition, because an electronic apparatus where the display is extended to the back side of the electronic apparatus has been developed, various applications for this kind of electronic apparatus are required.

SUMMARY

Apparatuses and methods consistent with the exemplary embodiments relate to a user terminal apparatus that displays a UI displayed on a display area disposed on the back side of the user terminal apparatus on a display area disposed on the front side of the user terminal apparatus according to a user's touch input.

According to an exemplary embodiment, there is provided a user terminal apparatus including a display including a main display area disposed on a front side of the user terminal apparatus and a sub display area extended from one side of the main display area to be disposed on at least one area of a rear side of the user terminal apparatus and a processor configured to, in response to a predetermined touch input being input on the sub display area, control the display to display a UI displayed on the sub display area on the main display area.

The processor may display the UI displayed on the sub display area by overlaying with a UI displayed on the main display area.

The processor may display at least one UI element included in the UI displayed on the sub display area such that the UI element has predetermined transparency on a location of the main display area corresponding to a display location of the sub display area.

The processor may display a GUI indicating a point which is touched on the sub display area on a corresponding location of the main display area.

The processor may display a UI in a different form on the sub display area according to a type of content displayed on the main display area.

The processor, in response to a touch input received on the sub display area being released, may control the UI displayed on the main display area to disappear.

The processor, in response to a touch input having same directivity as a direction where the sub display area is extended on the sub display area being received, may recognize a reverse direction of the received touch input and perform a function corresponding to the touch input.

The processor, in response to the main display area being activated, may display a UI displayed on the sub display area on the main display area.

The processor, in response to a touch input according to a predetermined touch gesture being received on the sub display area, may perform a function corresponding to the predetermined gesture.

The sub display area may be extended to be bent from an upper side of the main display area and disposed on an upper area of the rear side, and the bent area may be in a curved form.

According to an exemplary embodiment, there is provided a controlling method of a user terminal apparatus with a display consisting of a main display area disposed on a front side of the user terminal apparatus and a sub display area extended from one side of the main display area to be disposed on at least one area of a rear side of the user terminal apparatus, including receiving a predetermined touch input on the sub display area and displaying a UI displayed on the sub display area on the main display area in response to the predetermined touch input.

The displaying may include displaying the UI displayed on the sub display area by overlaying with a UI displayed on the main display area.

The displaying may include displaying at least one UI element included in the UI displayed on the sub display area such that the UI element has predetermined transparency on a location of the main display area corresponding to a display location of the sub display area.

The displaying may include displaying a GUI indicating a point which is touched on the sub display area on a corresponding location of the main display area.

The displaying may include displaying a UI in a different form on the sub display area according to a type of content displayed on the main display area.

The method may further include, in response to a touch input received on the sub display area being released, controlling the UI displayed on the main display area to disappear.

The receiving may further include, in response to a touch input having same directivity as a direction where the sub display area is extended on the sub display area being received, recognizing a reverse direction of the received touch input and performing a function corresponding to the touch input.

The displaying may include, in response to the main display area being activated, displaying a UI displayed on the sub display area on the main display area.

The receiving may further include, in response to a touch input according to a predetermined touch gesture being received on the sub display area, performing a function corresponding to the predetermined gesture.

The sub display area may be extended to be bent from an upper side of the main display area and disposed on an upper area of the rear side, and the bent area may be in a curved form.

According to the above-described various exemplary embodiments, in response to a user's touch input being received on a display area disposed on a rear side of a user terminal apparatus, a UI displayed on the rear side may be displayed on a front side of the user terminal apparatus. Thus, the user may watch the UI displayed on the rear side without flipping the user terminal apparatus, thereby improving user convenience.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Figure 1A:
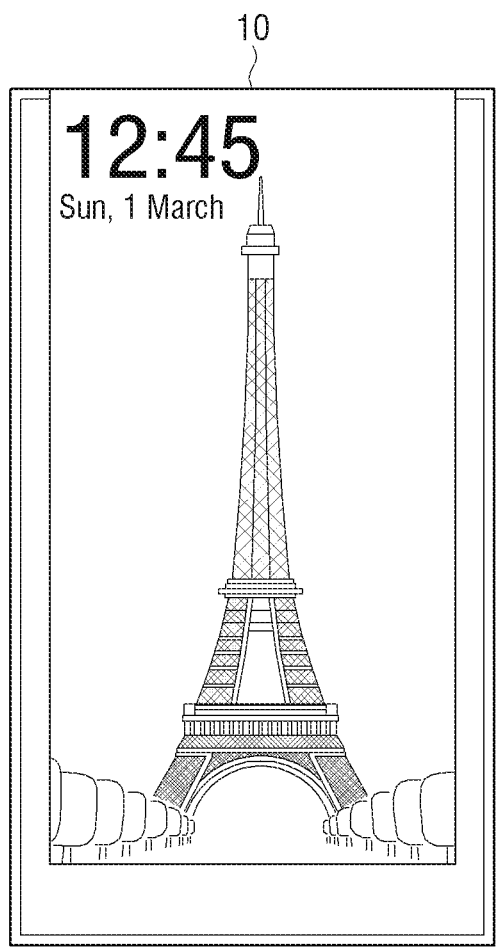
FIGS. 1A and 1B are views provided to explain an example of a display structure of a user terminal apparatus.
Figure 1A:
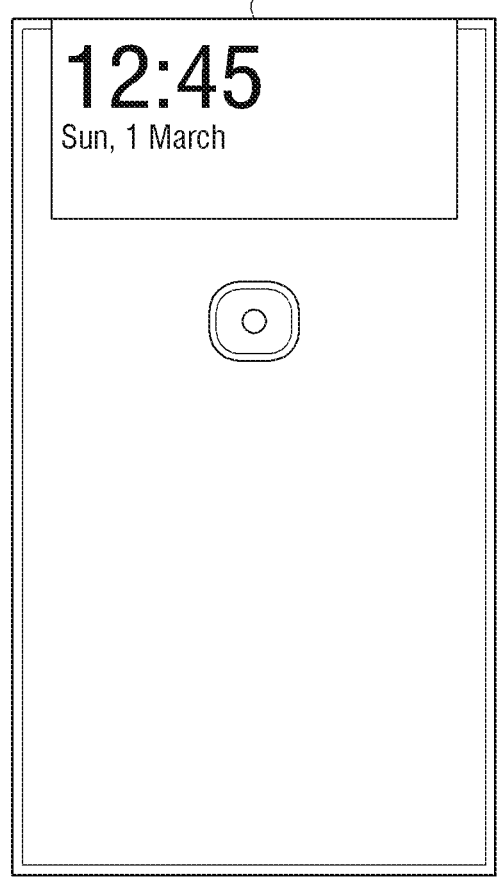

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Exemplary embodiments of the present disclosure will be described herein below with reference to the accompanying drawings. However, various exemplary embodiments of the present disclosure are not limited to the specific embodiments and should be construed as including modification, equivalent and/or alternative of exemplary embodiments of the present disclosure. In the explanation of the drawings, similar reference numerals are used for similar elements.

The term such as "first" and "second" used in various exemplary embodiments may modify various elements regardless of an order and/or importance of the corresponding elements, and does not limit the corresponding elements. These terms may be used for the purpose of distinguishing one element from another element. For example, a first user device and a second user device may indicate different user devices regardless of the order or importance. For example, a first element may be named a second element without departing from the scope of right of various exemplary embodiments of the present invention, and similarly, a second element may be named a first element.

It will be understood that when an element (for example, a first element) is "(operatively or communicatively) coupled with/to" or "connected with" another element (for example, a second element), the element may be directly coupled with/to another element, and there may be an intervening element (for example, a third element) between the element and another element. To the contrary, it will be understood that when an element (for example, a first element) is "directly coupled with/to" or "directly connected to" another element (for example, a second element), there is no intervening element (for example, a third element) between the element and another element.

The terms used in various exemplary embodiments of the present disclosure are just for the purpose of describing particular exemplary embodiments and are not intended to limit the present disclosure. In addition, the singular expression does not limit the present disclosure to have a single component or step. Instead, the present disclosure may comprise multiple components or steps even if described in singular expression. All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various exemplary embodiments. According to circumstances, even the terms defined in the exemplary embodiments should not be interpreted as excluding the embodiments of the present disclosure.

Hereinafter, exemplary embodiments will be explained in detail with reference to the accompanying drawings.

Figure 1B:
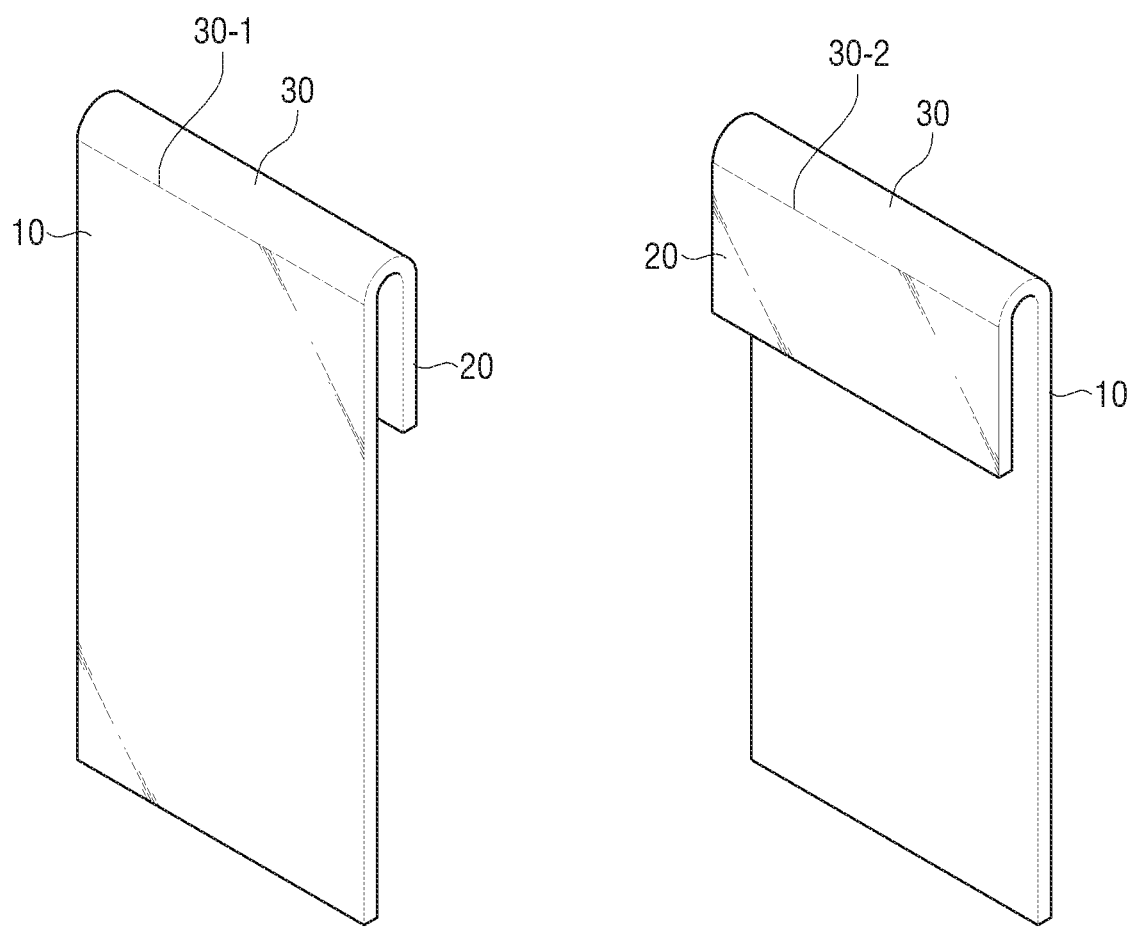

FIGS. 1A and 1B are views provided to explain an example of a display structure of a user terminal apparatus 100.

The left view of FIG. 1A represents the front side of the user terminal apparatus 100, and the right view of FIG. 1A represents the rear side of the user terminal apparatus 100. A front display is disposed on the front side of the user terminal apparatus 100, and a rear display is disposed on the rear side of the user terminal apparatus 100. The front display and the rear display may be connected to each other, and the rear display may be smaller than the front display. However, this is only an example, and the front display and the rear display may have the same size. Hereinafter, the front display will be referred to as a main display area 10 and the rear display will be referred to as a sub display area 20.

The left view of FIG. 1B is a front view of the entire display where the main display area 10, the sub display area 20 and a round display area 30 are connected to one another, and the right view of FIG. 1B is a rear view of the entire display.

The sub display area 20 may be extended from one side of the main display area 10 to be disposed on at least one area of the rear side of the user terminal apparatus 100. In particular, the sub display area 20 may be extended to be bent from the upper side of the main display area 10. The bent area may be in the form of a curved surface, but is not limited thereto. The bent area may form an angle depending on the type of display.

The round display area 30 is an area that connects the main display area 10 and the sub display area 20. As described above, the round display area 30 may be in the form of a curved surface or in an angular form. The round display area 30 is distinguished from the main display area 10 and the sub display area 20 by border lines 30-1 and 30-2.

The border lines 30-1 and 30-2 of FIG. 1B are only examples, and the border lines 30-1 and 30-2 may be changed. The border lines 30-1 and 30-2 may be set by a manufacturer at the time of manufacturing, but may be changed by a user. When the border lines 30-1, 30-2 are changed, the sizes of the main display area 10, the sub display area 20 and the round display area 30 may be changed, and the sizes of the contents displayed on each area may be changed as well.

Meanwhile, FIGS. 1A and 1B illustrate that the upper side of the user terminal apparatus 100 is covered, but one of the lower side, left side and right side of the user terminal apparatus 100 may be covered. In addition, more than one side of the user terminal apparatus 100 may be covered.

Meanwhile, as the main display area 10, the sub display area 20 and the round display area 30 are connected to one another, various sensors and receivers may be provided on the side surface or on the lower surface of the user terminal apparatus 100. In particular, a directional receiver may be provided. However, this is only an example, and a receiver may be provided on an integrated cover that can be interlocked with the user terminal apparatus 100. Meanwhile, if a receiver is provided on the lower part of the user terminal apparatus 100, the processor 120 may reverse the screen up and down and display the screen when making a telephone call.

Hereinafter, first of all, the structure where the sub display area 20 is extended from the main display area 10 via the round display area 30 in the form of a curved surface will be described. In addition, a display having another structure will be further described with an exemplary embodiment.

Hereinafter, the direction towards the round display area 30 from the main display area 10 and the sub display area 20 will be referred to as the upper side of the user terminal apparatus 100, and the opposite direction will be referred to as the lower side. The left side and the right side will be described with reference to a display area viewed by a user. Accordingly, the left side and the right side would be reversed according to whether a user watches the main display area 10 or the sub display area 20.

Figure 2A:
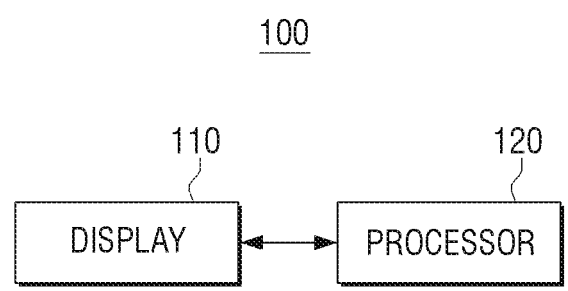
FIG. 2A is a block diagram illustrating configuration of a user terminal apparatus according to an exemplary embodiment.

FIG. 2A is a block diagram illustrating configuration of the user terminal apparatus 100 according to an exemplary embodiment.

Referring to FIG. 2A, the user terminal apparatus 100 includes a display 110 and the processor 120.

The display 110 may include the main display area 10 disposed on the front side of the user terminal apparatus 100, a sub display area 20 extended from one side of the main display area 10 and disposed on at least one area of the rear side of the user terminal apparatus 100 and a round display area 30 connecting the main display area 10 and the sub display area 20. However, this is only an example, not a limitation. For example, the sub display area 20 may be configured to cover the entire rear side of the user terminal apparatus 100.

Here, the terms "front side" and "rear side" are used for convenience of explanation and thus should not be limited thereto. For example, as for a specific electronic apparatus, the front side and the rear side may be interpreted as one side and another side. Meanwhile, in the above exemplary embodiment, the sub display area 20 is extended from one side of the main display area 10, but this is only an example. For example, the sub display area 20 may be extended from all sides of the main display area 10 such that the user terminal apparatus 100 as a whole is covered by the display 110.

The sub display area 20 of the display 110 may be curved and extended from the upper side of the main display area 10 to be disposed on the upper area of the rear side. For example, if you look at the main display area 10 and the sub display area 20 from the side, the connection part may form a curved line like TT'. However, this is only an example, and if you look at the main display area 10 and the sub display area 20 from the side, the connection part may form 90° like '⊏'. Further, various connection parts may be formed based on the shape of the user terminal apparatus 100.

The display 110 may display various UIs under the control of the processor 120. For example, the display 110 may display a UI for reproducing contents, a UI for making a phone call, etc. The display 110 may display different contents on each of the main display area 10, the sub display area 20 and the round display area 30 under the control of the processor 120. For example, the display 110 may display a video on the main display area 10, an image on the sub display area 20, and a UI for message transmission on the round display area 30.

In addition, the display 110 may interlock at least two areas of the main display area 10, the sub display area 20 and the round display area 30 and display contents. For example, the display 110 may display a video on the main display area 10, a UI for controlling the video on the sub display area 20, and a UI for providing a function that is not related to the video on the round display area 30.

Further, the display 110 may display the same contents on at least two areas among the main display area 10, the sub display area 20 and the round display area 30. For example, the display 110 may display the same contents on the main display area 10 and the sub display area 20, and display separate contents on the round display area 30.

The display 110 may be implemented as a Liquid Crystal Display Panel (LCD), an Organic Light Emitting Diodes (OLED) display, a Plasma Display Panel (PDP), etc., but is not limited thereto. In addition, the display 110 may be implemented as a transparent display, a flexible display, etc. depending on circumstances.

The processor 120 may control the overall operations of the user terminal apparatus 100.

When receiving a predetermined touch input on the sub display area 20, the processor 120 may control the display 110 to display a UI displayed on the sub display area 20 on the main display area 10.

Here, the processor 120 may overlay the UI displayed on the sub display area 20 with a UI displayed on the main display area 10.

Meanwhile, the processor 120 may display at least one UI element included in the UI displayed on the sub display area 20 such that the at least one UI element has a predetermined transparency at a location of the main display area 10 corresponding to the display location of the sub display area 20.

In addition, the processor 120 may display a GUI indicating the point touched on the sub display area 20 on a corresponding location of the main display area 10.

The processor 120 may display different types of UIs on the sub display area 20 according to the type of contents displayed on the main display area 10.

If a touch input on the sub display area 20 is released, the processor 120 may control to remove a UI displayed on the main display area 10.

Meanwhile, if a touch input with directivity consistent with the extension direction of the sub display area 20 is received on the sub display area 20, the processor 120 may recognize the direction of the received touch input reversely and perform a function corresponding to the touch input.

If the main display area 10 is activated, the processor 120 may display a UI displayed on the sub display area 20 on the main display area 10.

Meanwhile, if a touch input according to a predetermined gesture is received on the sub display area 20, the processor 120 may perform a function corresponding to the predetermined gesture.

Figure 2B:
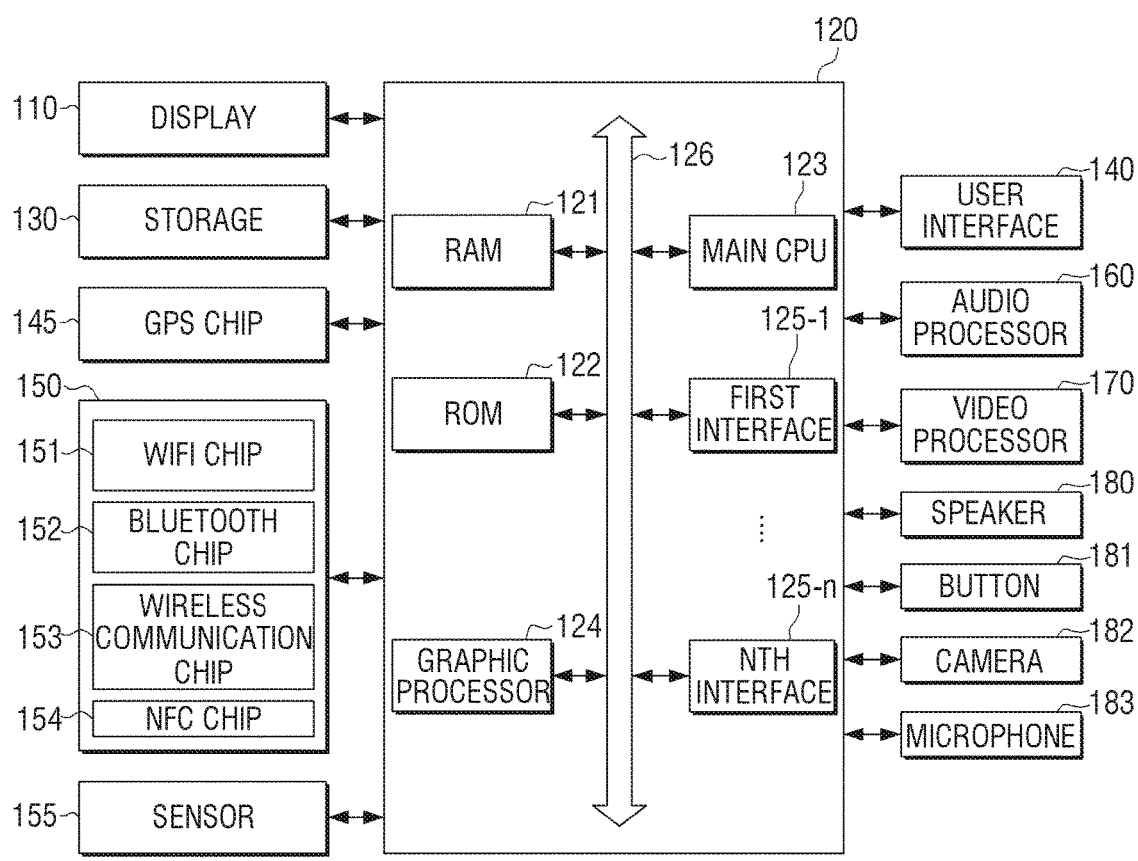
FIG. 2B is a block diagram illustrating an example of detailed configuration of a display apparatus.

FIG. 2B is a block diagram illustrating an example of detailed configuration of the display apparatus 100. Referring to FIG. 2B, the display apparatus 100 includes the display 110, the processor 120, a storage 130, a user interface 140, a GPS chip 145, a communicator 150, a sensor 155, an audio processor 160, a video processor 170, a speaker 180, a button 181, a camera 182, and a microphone 183. The elements of FIG. 2B which are overlapped with the elements of FIG. 2A will not be described in detail.

As described above, the display 110 may be divided into the main display area 10, the sub display area 20 and the round display area 30. The display 110 may be realized as various forms of displays such as Liquid Crystal Display (LCD), Organic Light Emitting Diodes (OLED) display, Plasma Display Panel (PDP), etc. The display 110 may further include a driving circuit, a backlight unit, etc. that can be embodied in the form of a-si TFT, LTPS (low temperature poly silicon) TFT, OTFT (organic TFT), etc. Meanwhile, the display 110 may be realized as a touch screen by combining with a touch sensor included in the sensor 155.

In this case, the touch sensor may include at least one of touch panel and a pen recognition panel. The touch panel may sense a user's finger gesture input and output a touch event value corresponding to the sensed touch signal. The touch panel may be mounted below at least one of the main display area 10, the sub display area 20 and the round display area 30 of the display 110.

The touch panel may sense a user's finger gesture input using two methods, the capacitive-type method and the resistive-type method. The capacitive-type method calculates a touch coordinates by sensing the micro electricity excited by part of the user body. The resistive-type method includes two electrode plates embedded within a touch panel, and senses an electric current flow as the upper and the lower plates at the touched point are brought into contact each other, and calculates a touch coordinates.

The pen recognition panel may sense a user's pen gesture input according to the use of a touch pen (for example, a stylus pen, a digitizer pen, etc.), and output a pen proximity event value or a pen touch event value. The pen recognition panel may be mounted below at least one of the main display area 10, the sub display area 20 and the round display area 30 of the display 110.

The pen recognition panel may be implemented as, for example, an electromagnetic resonance (EMR) scheme and may sense a touch or a proximity input depending on a change in strength of electric field due to the proximity or touch of the pen. In detail, the pen recognition panel may be configured to include an electromagnetic induction coil sensor having a grid structure and an electronic signal processor sequentially providing an alternating signal having a predetermined frequency to each loop coil of the electromagnetic induction coil sensor. If a pen having a resonance circuit embedded therein is present around the loop coil of the pen recognition panel, a magnetic field transmitted from the corresponding loop coil generates a current based on mutual electromagnetic induction to the resonance circuit in the pen. Based on the current, the induction magnetic field is generated from the coil configuring the resonance circuit within the pen and the pen recognition panel may detect the induction magnetic field from the loop coil in the signal receiving state to sense an approach position or a touched position of the pen.

The processor 120 controls the overall operations of the user terminal apparatus 100 using various programs stored in the storage 130.

Specifically, the processor 120 includes a RAM 121, a ROM 122, a main CPU 123, graphic processor 124, first to nth interfaces 125-1-125-n, and a bus 126.

The RAM 121, the ROM 122, the main CPU 123, the graphic processor 124, the first to the nth interfaces 125-1-125-n, etc. may be connected to each other via the bus 126.

The first to nth interfaces 125-1 to 125-n are connected to the foregoing various components. One of the interfaces may be a network interface connected to the external device through a network.

The main CPU 123 accesses the storage 130 to perform booting using the Operating System (O/S) stored in the storage 130. Further, the main CPU 123 performs various operations using various programs stored in the storage 130.

The ROM 122 stores a set of commands for system booting. If a turn on command is input and thus power is supplied, the main CPU 123 copies the O/S stored in the storage 130 to the RAM 121 and executes the O/S, according to the command stored in the ROM 122, thereby booting the system. If the booting is completed, the main CPU 123 copies various application programs stored in the storage 130 to the RAM 121 and executes the application programs copied to the RAM 121, thereby performing various operations.

The graphic processor 124 uses an operator and a renderer to create a screen including various objects, such as an icon, an image, a text, etc. Here, the operator may be a component for operating attribute values, such as coordinate values, forms, sizes, and colors by which each object is displayed, according to a layout of the screen, based on the received control command. The renderer may be a component for generating a screen of various layouts including an object based on the attribute values calculated by the operator. The screen created by the renderer may be displayed in a display region of the display 110.

Meanwhile, the operation of the above-described processor 120 may be performed by a program stored in the storage 130.

The storage 130 stores various data, such as an O/S software module, to drive the user terminal apparatus 10, a contents reproduction module, a display UI module of various applications, etc.

In this case, the processor 120 may process and display an input image based on information stored in the storage 130.

The user interface 140 receives various user interactions. Here, the user interface 140 may be implemented in various forms according to an exemplary embodiment of the user terminal apparatus 100. If the user terminal apparatus 100 is implemented as a digital TV, the user interface 140 may be realized as a remote control receiver that receives a remote control signal from a remote control apparatus, a camera that senses a user motion, a microphone that receives a user voice, etc. Alternatively, if the user terminal apparatus 100 is implemented as a touch-based mobile terminal, the user interface 140 may be configured in the form of a touch screen having a layer structure with respect to a touch pad. In this case, the user interface 140 may be used as the above-described display 110.

The GPS chip 145 is an element to receive a GPS signal from a Global Positioning System (GPS) satellite and calculate the current position of the user terminal device 100. When it is necessary to use a navigation program or the current position of a user, the GPS chip 145 may calculate the user's position using the GPS chip 145.

The communicator 150 is an element to perform communication with various types of external devices according to various types of communication methods. The communicator 150 includes a WiFi Chip 151, a Bluetooth chip 152, a wireless communication chip 153, a Near Field Communication (NFC) chip 154, etc. The processor 120 performs communication with various external devices using the communicator 150.

The WiFi chip 151 and the Bluetooth chip 152 respectively perform communication according to a WiFi method and a Bluetooth method. When the WiFi chip 151 or the Bluetooth chip 152 is used, a variety of connectivity information, such as SSID and a session key may be transmitted and received first, and communication is established using the connectivity information, and then a variety of information may be transmitted and received. The wireless communication chip 153 refers to a chip that performs communication according to various communication standards, such as IEEE, Zigbee, $3^{rd}$ Generation (3G), $3^{rd}$ Generation Partnership Project (3GPP), Long Term Evolution (LTE), etc. The NFC chip 154 refers to a chip that operates in the NFC method using a band of 13.56 MHz from among various RF-ID frequency bands, such as 135 kHz, 13.56 MHz, 433 MHz, 860-960 MHz, 2.45 GHz, etc.

Meanwhile, the communicator 150 may perform unilateral communication or bilateral communication with respect to an electronic apparatus. When unilateral communication is performed, the communicator 150 may receive a signal from an electronic apparatus. When bilateral communication is performed, the communicator 150 may receive a signal from an electronic apparatus and transmit a signal to an electronic apparatus.

The sensor 155 may include a touch sensor, a magnetic sensor, a gyro sensor, an acceleration sensor, a proximity sensor, a grip sensor, etc. In addition to the above-described touch, the sensor 155 may sense various manipulations, such as rotation, tilt, pressure, approach, grip, etc.

The touch sensor may be realized as a capacitive sensor or a resistive sensor. The capacitive sensor calculates a touch coordinates by sensing micro-electricity excited by a user body when part of the user body touches a display screen using a dielectric coated on the display surface. The resistive sensor comprises two electrode plates embedded in the user terminal apparatus 100, and calculates a touch coordinates as the upper and lower plates of the touched point contact with each other to sense flowing electric current when a user touches a screen. In addition, an infrared detecting method, a surface acoustic wave method, an integral strain gauge method, a piezo electric method, etc. may be used to detect a touch interaction.

In addition, the user terminal apparatus 100 may determine whether a touch object, such as a finger or a stylus pen, touches or approaches using a magnetic field sensor, an optical sensor, a proximity sensor, etc. instead of a touch sensor.

The geomagnetic sensor detects the rotation state, the direction of motion, etc. of the user terminal apparatus 100. The gyro sensor detects the rotation angle of the user terminal apparatus 100. The user terminal apparatus 100 may include both the geomagnetic sensor and the gyro sensor, but the user terminal apparatus 100 may detect the rotation state only with one of them.

The acceleration sensor detects the degree of tilt of the user terminal apparatus 100.

The proximity sensor detects a motion that is approaching a display surface without actually contacting the surface. The proximity sensor may be realized as various types of sensors, such as inductive proximity sensor that detects an electric current induced by magnetic field properties that change when an object approaches by forming a high frequency magnetic field, a magnetic proximity sensor that uses a magnet, and a capacitive proximity sensor that detects capacitance that changes as an object approaches.

The grip sensor is disposed on the rear side, border, or handle of the user terminal apparatus 100 separately from a touch sensor provided on a touch screen, and detects a user's grip. The grip sensor may be realized as a pressure sensor other than a touch sensor.

The audio processor 160 performs processing with respect to audio data. The audio processor 160 may perform various processing, such as decoding, amplification, noise filtering, etc. with respect to audio data.

The video processor 170 performs processing with respect to video data. The video processor 170 may perform various image processing, such as decoding, scaling, noise filtering, frame rate conversion, resolution conversion, etc. with respect to video data.

The speaker 180 outputs not only various audio data processed by the audio processor 160 but also various notification sounds or voice messages, etc.

The button 181 may be realized as various types of buttons, such as a mechanical button, a touch pad, a wheel, etc., which are formed on the front, side, or rear of the exterior of a main body.

The camera 182 photographs a still image or a moving image according to a user's control. The camera 182 may be realized as a plurality of cameras, such as a front camera, a rear camera, etc. In particular, the camera 182 may be used to photograph a motion of a subject to be controlled.

The microphone 183 receives a user voice or other sounds and converts the user voice or other sounds into audio data.

In addition, the user terminal apparatus 100 may further include a USB port connectable to a USB connector, various external input ports for connecting to various external terminals, such as a headset, a mouse, a LAN, etc., a DMB chip to receive and process a Digital Multimedia Broadcasting (DMB) signal, various sensors, etc. depending on exemplary embodiments.

Figure 2C:
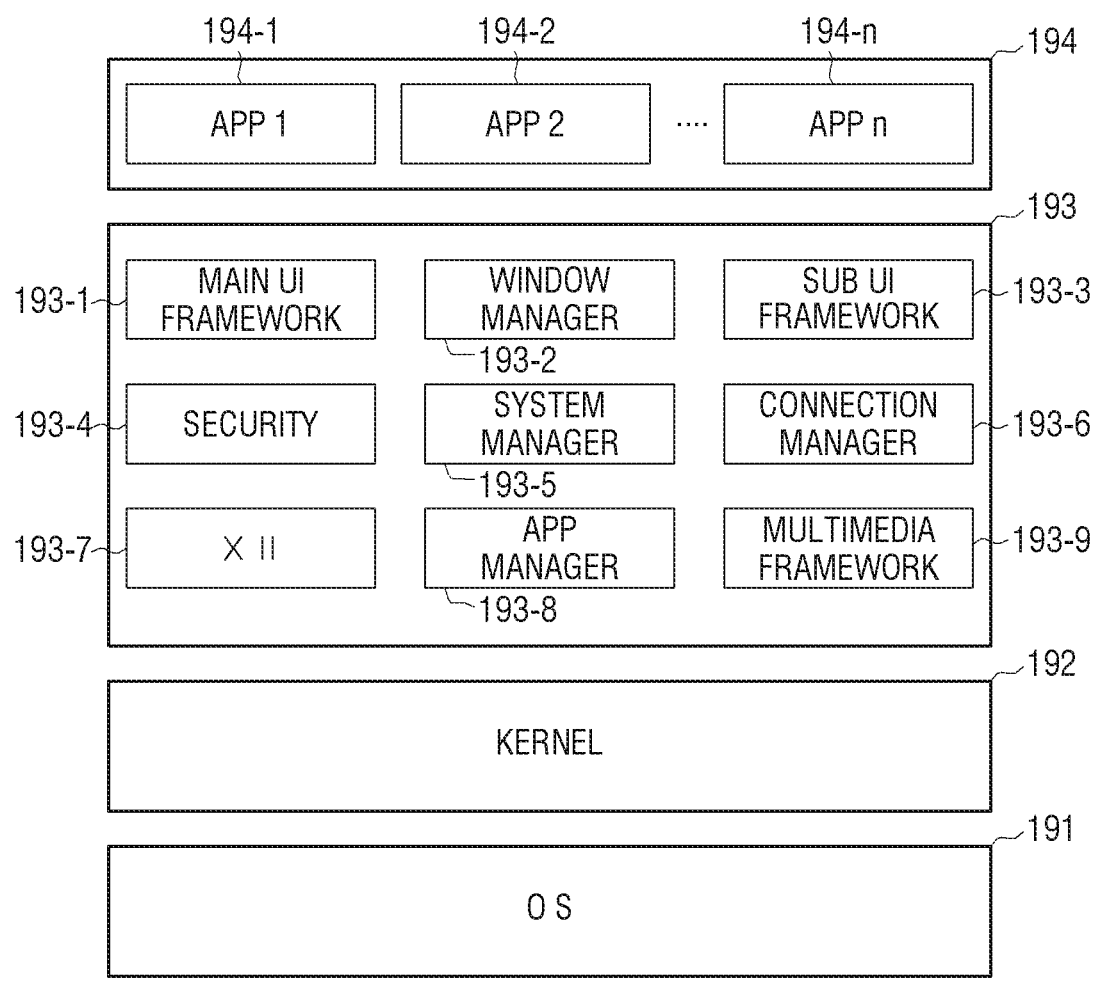
FIG. 2C is a view provided to explain various modules stored in a storage.

FIG. 2C is a view provided to explain various modules stored in the storage 130.

The software of FIG. 2C may be stored in the storage 130, but this is only an example. The software may be stored in various types of storage mean used in the user terminal apparatus 100. Referring to FIG. 2C, the user terminal apparatus 100 may store software including an O/S 191, a kernel 192, middleware 193, an application 194, etc.

The O/S 191 controls and manages the overall operations of hardware. In other words, the O/S 191 is responsible for management of hardware and basic functions, such as memory, security, etc.

The kernel 192 serves as a path through which various signals in addition to a touch signal, etc., sensed by the display 110 are transferred to the middleware 193.

The middleware 193 includes various software modules for controlling the operations of the user terminal apparatus 100. Referring to FIG. 2C, the middleware 193 may include a main UI framework 193-1, a window manager 193-2, a sub UI framework 193-3, a security module 193-4, a system manager 193-5, a connection manager 193-6, an X11 module 193-7, an APP manager 193-8, and a multimedia framework 193-9.

The main UI framework 193-1 is a module for providing various UIs to be displayed on a main display area 10 of the display 110, and the sub UI framework 193-3 is a module for providing various UIs to be displayed on an auxiliary display area 20 and a round display area 30. The main UI framework 193-1 and the sub UI framework 193-3 may include an image compositor module configuring various objects, a coordinate compositor calculating coordinates at which objects are to be displayed, a rendering module rendering the configured objects at the calculated coordinates, a 2D/3D UI toolkit providing a tool for configuring a 2D or 3D type of UI, etc.

The window manager 193-2 may sense a touch event of a user's body or a pen or other input events. When the events are sensed, the window manager 193-2 transfers the event signal to the main UI framework 193-1 or the sub UI framework 193-3 to perform an operation corresponding to the event.

In addition, when the user touches and drags the screen, various program modules, such as a handwriting module for drawing a line according to a drag trajectory, an angle calculation module for calculating a pitch angle, a roll angle, a yaw angle, etc., based on sensor values sensed by the sensor may also be stored.

The security module 193-4 is a module for supporting certification, permission, secure storage for hardware, etc.

The system manager 193-5 monitors a state of each component within the user terminal apparatus 100 and provides the results to other modules. For example, when a residual battery is insufficient, an error occurs, or a communication is disconnected, etc., the system manager 193-5 may provide the results to the main UI framework 193-1 or the sub UI framework 193-3 to output a notification message or a notification sound.

The connection manager 193-6 is a module for supporting a wired or wireless network connection. The connection manager 193-6 may include various detailed modules, such as a DNET module, an UPnP module, etc.

The X11 module 193-7 is a module for receiving various event signals from various hardware included in the user terminal apparatus 100. Here, the event may include various events, such as an event where a user manipulation is sensed, an event where a system alarm is generated, an event where a specific program is executed or ended, etc.

The APP manager 193-8 is a module for managing an execution state of various applications installed in the storage 130. When an application execution event is sensed from the X11 module 193-7, the APP manager 193-8 calls and executes an application corresponding to the event. In other words, an event where at least one object is selected is sensed, the APP manager 193-8 performs the operation of calling and executing an application corresponding to the object.

The multimedia framework 193-9 is a module for playing multimedia contents stored in the user terminal apparatus 100 or provided from external sources. The multimedia framework 193-9 may include a player module, a camcorder module, a sound processing module, and the like. Therefore, the multimedia framework 193-9 may perform an operation of playing various multimedia contents to generate and play a screen and a sound.

The software structure illustrated in FIG. 2C is only an example, and therefore is not limited thereto. Therefore, some of the components may be omitted, changed, or added, if necessary. For example, the storage 310 may additionally store various programs, such as a sensing module for analyzing signals sensed by various sensors, a messaging module for providing a Short Message Service (SMS) & Multimedia Message Service (MMS), an e-mail program, etc., a call info aggregator program module, a VoIP module, and a web browser module, etc.

Meanwhile, as described above, the user terminal apparatus 100 may be embodied as various types of apparatuses, such as mobile phone, tablet PC, laptop PC, PDA, MP3 player, e-album device, TV, PC, kiosk, etc. Accordingly, the configuration described above with reference to FIGS. 2B and 2C may be changed in various ways according to the type of the user terminal apparatus 100.

As described above, the user terminal apparatus 100 may be configured in various forms and configurations.

Hereinafter, basic configuration and various exemplary embodiments will be described to help understanding of the present disclosure. FIGS. 3A to 3D are views provided to explain an example where only one of the main display area 10, the sub display area 20 and the round display area 30 is used.

Figure 3A:
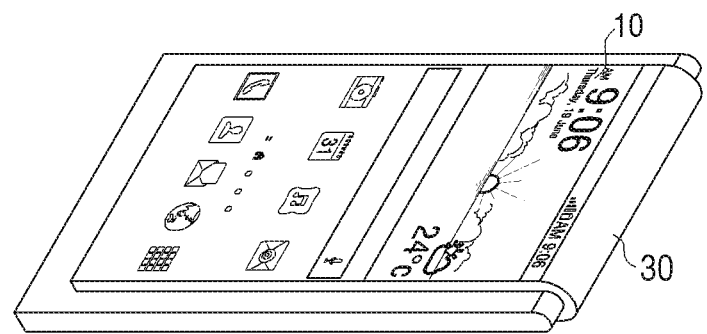
FIGS. 3A to 3D are views provided to explain an example where only one of a main display area, a sub display area and a round display area is used.
Figure 3A:
Figure 3A:
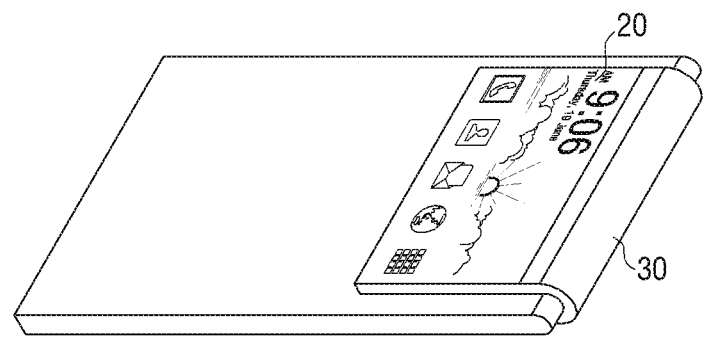

As illustrated in FIG. 3A, the processor 120 may determine an area where information is to be provided based on an orientation of the user terminal apparatus 100. For example, if the main display area 10 of the user terminal apparatus 100 faces upward, the processor 120 may provide information to the main display area 10, if the sub display area 20 faces upward, the processor 120 may provide information to the sub display area 20, and if the round display area 30 faces upward, the processor 120 may provide information to the round display area 30.

In this exemplary embodiment, if information is provided to one area, the processor 120 may not provide the information to the other two areas.

If a user presses a power button, the processor 120 may perform the operation of determining the area to which information is to be provided. Alternatively, if a call or a text message is received, the processor 120 may perform the operation of determining the area to which information is to be provided.

Meanwhile, in the above exemplary embodiment, the area to which information is to be provided is determined based on the orientation of the user terminal apparatus 100, but this is only an example. For example, the processor 120 may recognize a user and provide information to the area that is close to the user's gaze.

In this case, the processor 120 may recognize a user using the camera 182. The camera 182 may be provided on at least one of a front side, a rear side and a round side of the user terminal apparatus 100. Here, the round side refers to a side near the round display area 30.

If the camera 182 is provided only one of the front side, rear side and round sound of the user terminal apparatus 100, the processor 120 may determine the area where information is to be provided according to whether a user is recognized. For example, if the camera 182 is provided only on the rear side of the user side of the user terminal apparatus 100, the processor 120 may provide the information through the sub display area 20 when a user is recognized by the camera 182. Similarly, the processor 120 may provide the information through at least one of the main display area 10 and the round display area 30 when a user is not recognized by the camera 182.

The information provided may vary depending on applications executed. For example, if a camera application is executed, the processor 120 may provide a live-view screen. If a call function is executed, the processor 120 may provide a screen, such as a call-receiving screen, a call-sending screen, a on-the-phone screen, etc. Alternatively, if a message application is executed, the processor 120 may provide a message-receiving screen, a message-content screen, a message-writing screen, etc.

Meanwhile, even if a user's gaze is close to the round display area 30, the processor 120 may provide information only to the main display area 10 or the sub display area 20.

Figure 3B:
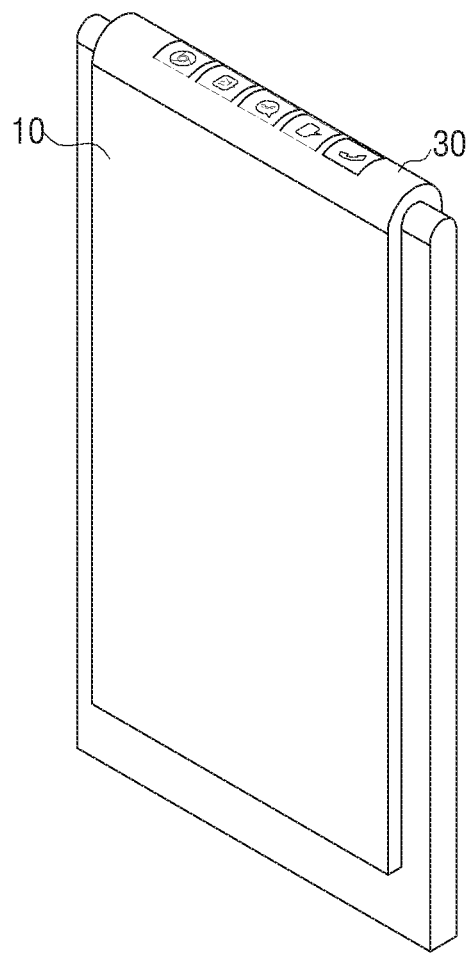

In addition, even if a user is not recognized, the processor 120 may provide information to the round display area 30 as illustrated in FIG. 3B. In addition, even if a user is recognized, when the user's gaze is not toward the user terminal apparatus 100, the processor 120 may provide information to the round display area 30. However, this is only an example, and the processor 120 may provide information to at least one of the main display area 10 and the sub display area. Alternatively, the processor 120 may not provide information and provide information only when a user is recognized or a user's gaze is toward the user terminal apparatus 100.

Meanwhile, the processor 120 may change the display area to which information is to be provided according to a user's touch input with respect to an area where the information is not provided. For example, if the user input of touching one area of the sub display area 20 consecutively while the processor 120 is providing information to the main display area 10, the processor 120 may change to display the information provided to the main display area 10 on the sub display area 20.

Figure 3C:
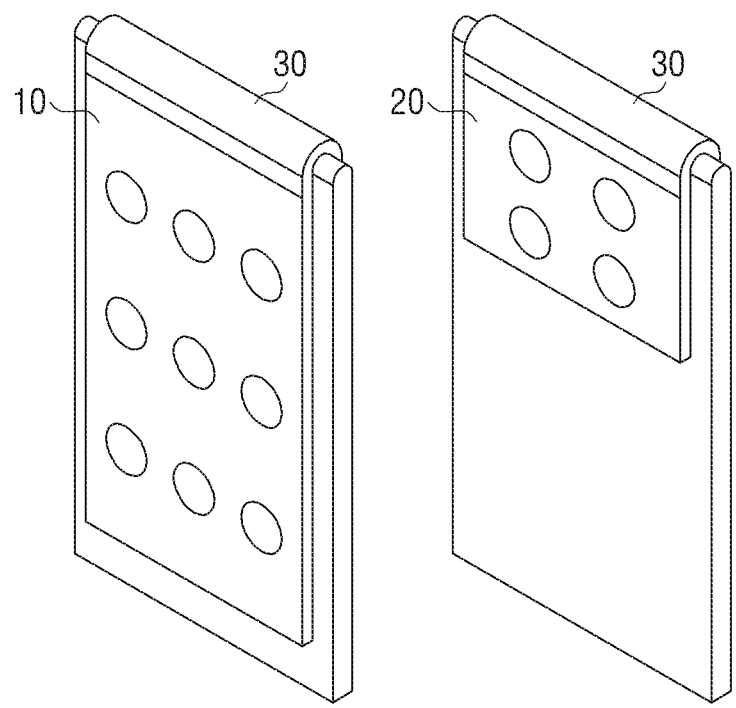

Meanwhile, as illustrated in FIG. 3C, the processor 120 may display the same information differently according to a display area. For example, the processor 120 may display a UI of the same lock screen differently in the main display area 10, the sub display area 20 and the round display area 30. As described above with respect to FIG. 3A, the processor 120 may change the area on which information is to be displayed.

In this case, a lock release pattern may be different according to each area. Alternatively, the processor 120 may provide a lock releasing method differently for each area. For example, as illustrated in FIG. 3C, the processor 120 may provide a pattern lock screen to the main display area 10, a pin number lock screen to the sub display area 20, and a finger print recognition lock screen to the round display area 30.

FIG. 3C depicts only a lock screen, but the same technical feature may be applied to other applications. For example, if a camera application is executed, the main display area may provide various setting menus in addition to a preview image. In this case, if the display area is changed to the sub display area 20, the processor 120 may display only the preview image on the sub display area 20. If the display area is changed to the round display area 30, the processor 120 may display only the setting menu on the round display area 30.

In addition, as illustrated in FIG. 3A, the processor 120 may change the layout of a home screen for each display area and display the home screen, which will be described later.

If a call or a text message is received, the processor 120 may display a corresponding UI on a display area where a user's gaze is headed. In addition, the processor 120 may also display different UIs on the main display area 10, the sub display area 20 and the round display area 30 with respect to a video application, a music application, etc. in addition to the above-described application.

Figure 3D:
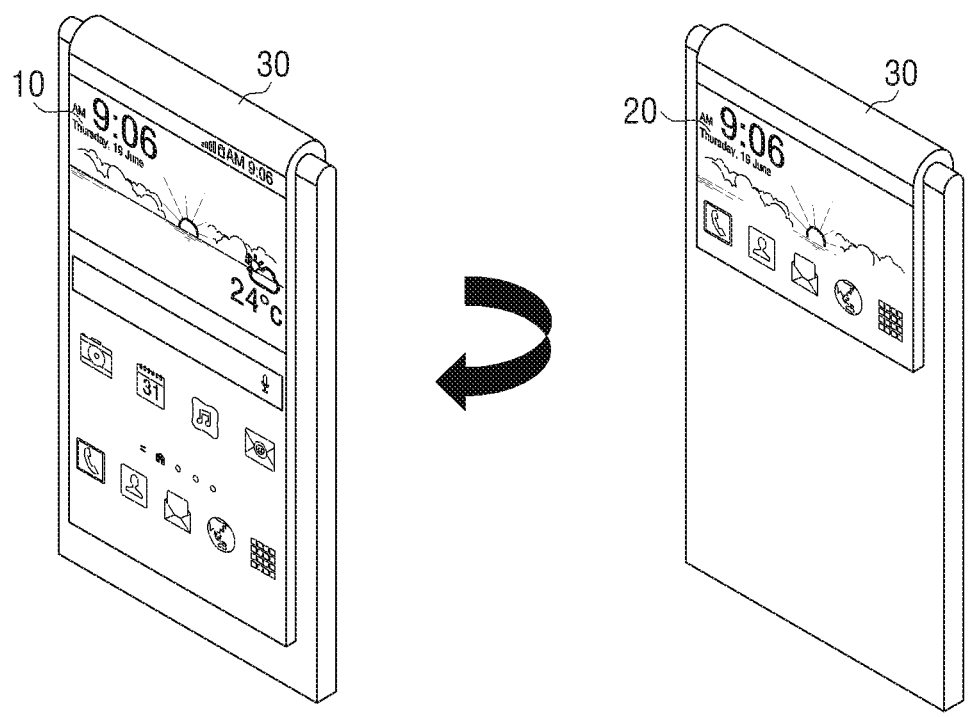

Meanwhile, as shown in FIG. 3D, if the orientation of the user terminal apparatus 100 is changed, the processor 120 may change the area to which information is provided. For example, if the user terminal apparatus 100 is rotated at more than a predetermined angle while the home screen is displayed on the main display area 10, the processor 120 may change to display the home screen on the sub display area 20.

FIG. 3D depicts that the display area is changed from the main display area 10 to the sub display area 20, but this is only an example. For example, the processor 120 may determine the round display area 30 as the display area depending on the rotation direction, rotation angle, etc.

Meanwhile, if the orientation of the user terminal apparatus 100 is changed and thus causes the change of the display area, the processor 120 may change the layout of the information to be provided. For example, as illustrated in FIG. 3D, the home screen of the main display area 10 includes time information, general applications and dock bar applications, the home screen of the sub display area 20 may include only the time information and the dock bar applications.

FIG. 3D depicts that the sub display area 20 does not include general applications, but this is only an example. For example, if the area where information is provided is changed, the processor 120 may change not only objects but also all of the sizes of the objects, the contents and the layout.

If the display area becomes smaller, the processor 120 may not provide a part of the objects but instead make the sizes of the objects smaller. Alternatively, the processor 120 may change the layout to narrow the distances between the objects so that more objects can be displayed.

Meanwhile, if the orientation of the user terminal apparatus 100 is changed and thus, the display area is changed, the processor 120 may change the operation state of the application which is currently being executed and provide information on another display area. For example, if the orientation of the user terminal apparatus 100 is changed while a message indicating that a call or a text message is received is displayed on the main display area 10, the processor 120 may display a UI connected to the call or the contents of the message on the sub display area 20 or the round display area 30.

Alternatively, if the orientation of the user terminal apparatus 100 is changed while a camera application is executed and a preview is displayed on the main display area 10, the processor 120 may display a previously-photographed image on the sub display apparatus 20.

Meanwhile, if the orientation of the user terminal apparatus 100 is changed, the processor 120 may divide the displayed information and display the divided information on other display areas. For example, if the orientation of the user terminal apparatus 100 is changed while a camera application is executed and thus a preview and a setting menu are displayed on the main display area 10, the processor 120 may change to display the preview on the sub display area 20 and the setting menu on the round display area 30, respectively.

FIGS. 4A to 4F are views provided to explain an example where at least two areas among the main display area 10, the sub display area 20 and the round display area 30 are used.

Figure 4A:
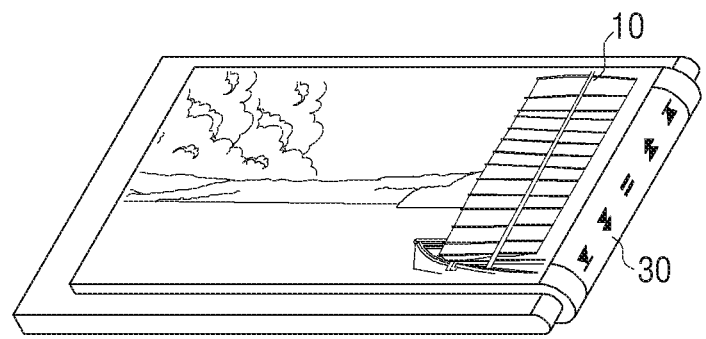
FIGS. 4A to 4F are views provided to explain an example where at least two areas from among a main display area, a sub display area and a round display area are used.

As illustrated in FIG. 4A, the processor 120 may provide related information to two areas among the main display area 10, the sub display area 20 and the round display area 30. For example, the processor 120 may display a video on the main display area 10 and display a UI for controlling the video on the round display area 30. In this case, the processor 120 may not provide any information to the sub display area 20.

Alternatively, when a camera application is executed, the processor 120 may display a preview on the main display area 10 and display a setting menu on the round display area 30.

Figure 4B:
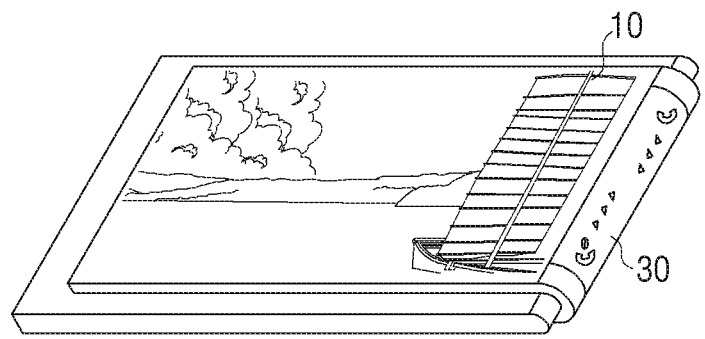

As illustrated in FIG. 4B, the processor 120 may provide unrelated information to two areas among the main display area 10, the sub display area 20 and the round display area 30. For example, the processor 120 may display a video on the main display area 10 and display a UI for receiving a call on the round display area 30. The processor 120 may not provide any information to the sub display area 20.

If a call is received while a UI for controlling a video is displayed on the round display area 30 as illustrated in FIG. 4A, the processor 120 may display a call receiving UI on the round display area 30, and move a UI for controlling the video to the sub display area 20 and display the UI.

If the call receiving UI is touched and the call is connected, a phone conversation UI may be displayed on the round display area 30 and the video may be played continuously. In this case, the processor 120 may mute the video. In addition, the processor 120 may pause the video.

Alternatively, if the call receiving UI is touched and the call is connected, the phone conversation UI may be displayed on the main display area 10, the video may be stopped, and play information may be displayed on the round display area 30.

FIGS. 4A and 4B are exemplary embodiments that are limited to the case where a video application is being executed, but they are only examples. For example, the processor 120 may operate in the same manner when other applications, such as a camera application, are being executed.

FIGS. 4A and 4B describe a method where the main display area 10 and the round display area 30 are used, but the method of using the main display area and the sub display area 20 and a method of using the sub display area 20 and the round display area 30 may also be the same. Detailed description thereof will not be provided for simplicity.

Figure 4C:
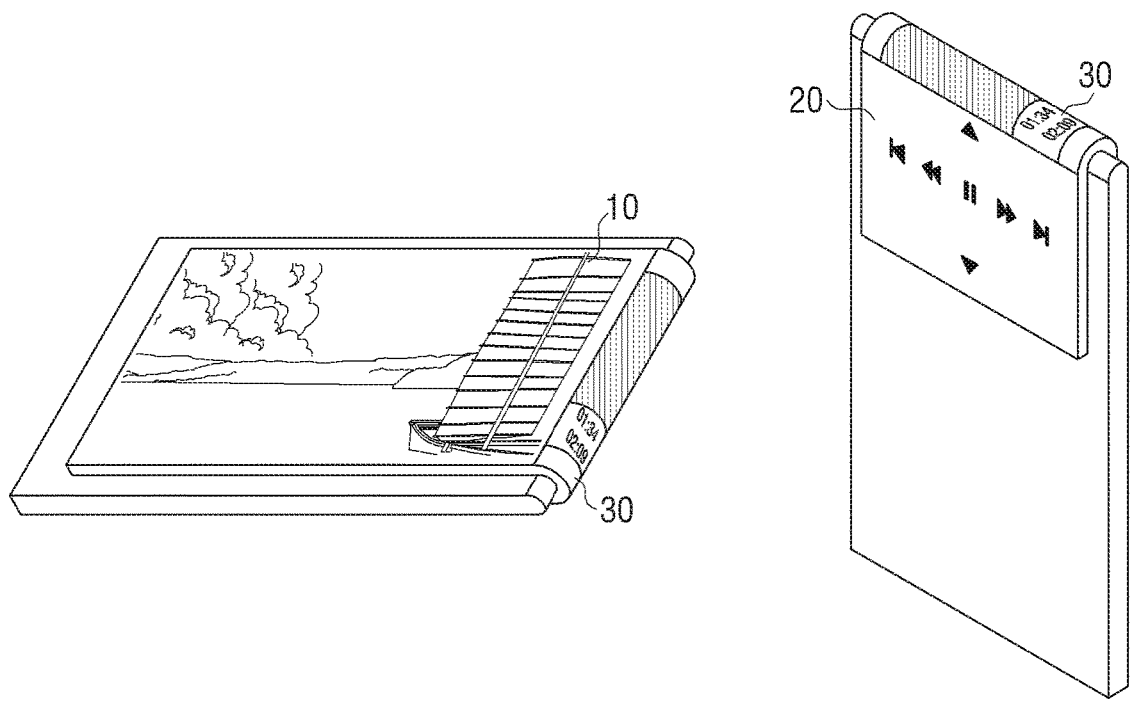

Meanwhile, as illustrated in FIG. 4C, the processor 120 may provide related information using all of the main display area 10, the sub display area 20 and the round display area 30. For example, the processor 120 may display a video on the main display area 10, a UI for controlling the video on the sub display area 20, and a UI for indicating a video play time on the round display area 30.

Alternatively, the processor 120 may provide information which is unrelated using all of the main display area 10, the sub display area 20 and the round display area 30. For example, the processor 120 may display a video on the main display area 10, a text message on the sub display area 20, and the state of the user terminal apparatus 100, such as a battery state on the round display area 30.

Alternatively, the processor 120 may provide related information on two areas among the main display area 10, the sub display area 20 and the round display area 30, and provide unrelated information on the other area.

Meanwhile, as illustrated in FIGS. 3A to 3D, if the orientation of the user terminal apparatus 100 is changed, the processor 120 may change the display area of the information displayed on each area. For example, the processor 120 may change to display the information displayed on the main display area 10 on the sub display area 20, display the information displayed on the sub display area 20 on the round display area 30, and display the information displayed on the round display area 30 on the main display area 10. In this case, the processor 120 may change the layout of information displayed on each area and display the information on another area.

Alternatively, the processor 120 may combine information displayed each area or divide information and change the display area. For example, the processor 120 may divide the information displayed on the main display area 10 and display the divided information on the sub display area 20 and the round display area 30, and display the information displayed on the sub display area 20 and the round display area 30 on the main display area 10.

Figure 4D:
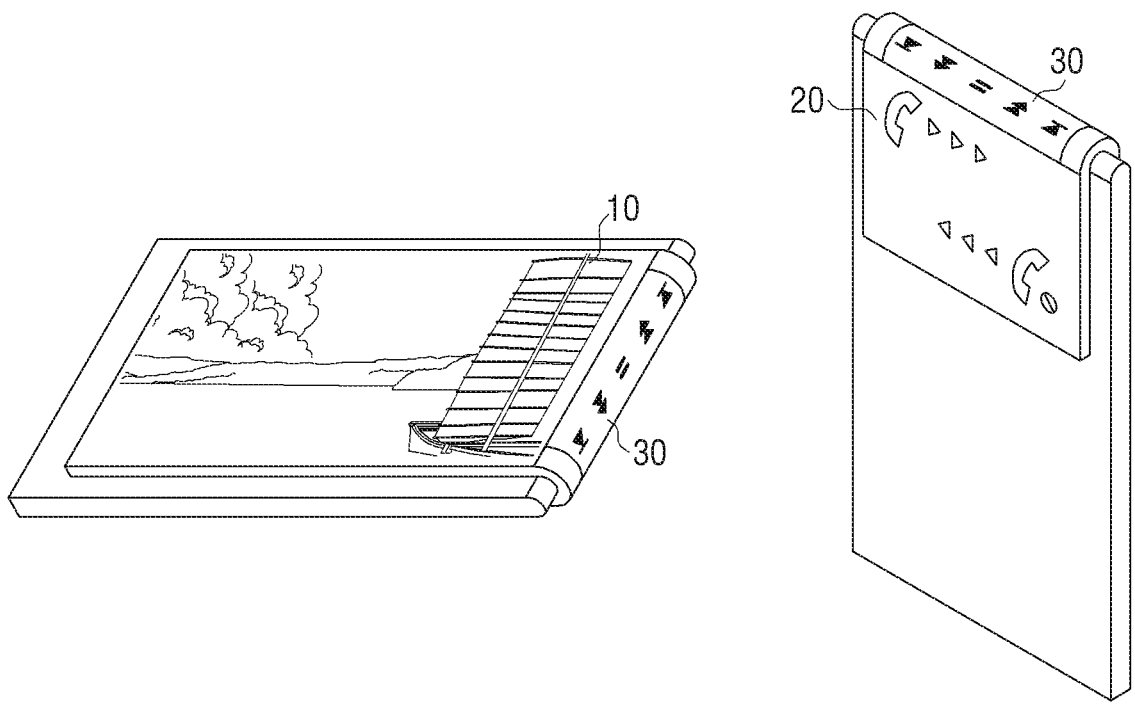

Meanwhile, if a call is received in the state as illustrated in FIG. 4C, the processor 120 may display the call receiving UI on the sub display area 20 and move the UI for controlling a video to the round display area 30 and display the UI as illustrated in FIG. 4D. In this case, a user may determine whether to receive the call while continuously watching the video displayed on the main display area 10.

Alternatively, the processor 120 may display the call receiving UI on the round display area 30. In this case, the user may also continuously watch the video displayed on the main display area 10.

Figure 4E:
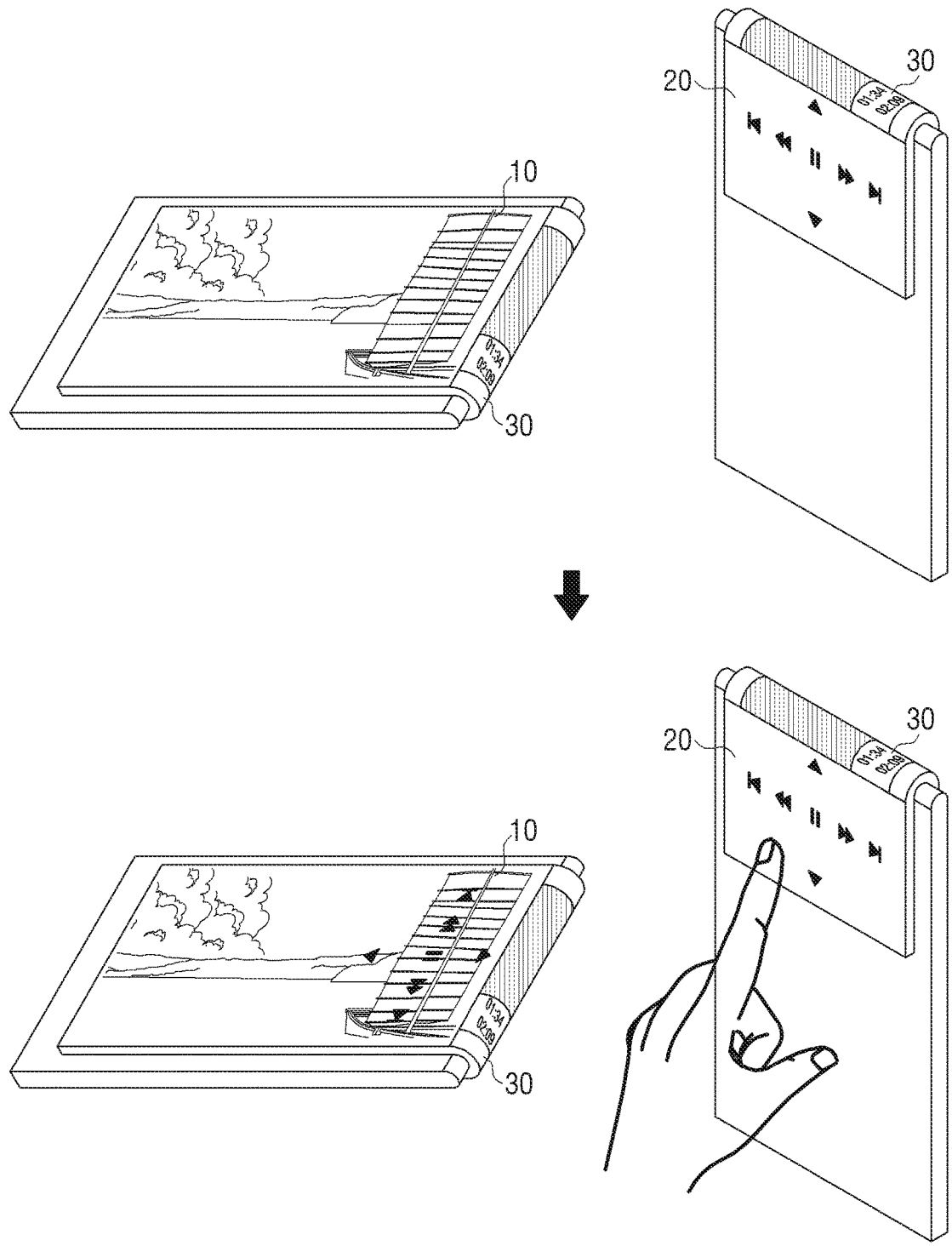

Meanwhile, as illustrated in FIG. 4E, when a touch input is received on the sub display area 20, the processor 120 may display the UI displayed on the sub display area 20 on the main display area 10. For example, if a user touches the sub display area 20 in the state as illustrated in FIG. 4C, the processor 120 may display the UI for controlling a video of the sub display area 20 on the main display area 10. The lower right view of FIG. 4E is provided for convenience of explanation, and a user may control to perform the above-described operation by touching the sub display area 20 without changing the orientation of the user terminal apparatus while watching the video of the main display area 10 as illustrated in the lower left view of FIG. 4E.

The processor 120 may overlay the UI for controlling a video with the main display area 10 and display the UI. In addition, the processor 120 may control the video play according to the user manipulation of additionally touching the sub display area 20. In other words, the user may touch the UI displayed on the sub display area 20 without watching the UI of the sub display area 20.

Meanwhile, when a touch input is received on the main display area 120, the processor 120 may display the UI displayed on the main display area 10 on at least one of the sub display area 20 and the round display area 30. In particular, if the sizes of the main display area 10 and the sub display area 20 are the same, the processor 120 may display the entire UI displayed on the main display area 10 on the sub display area 20.

Figure 4F:
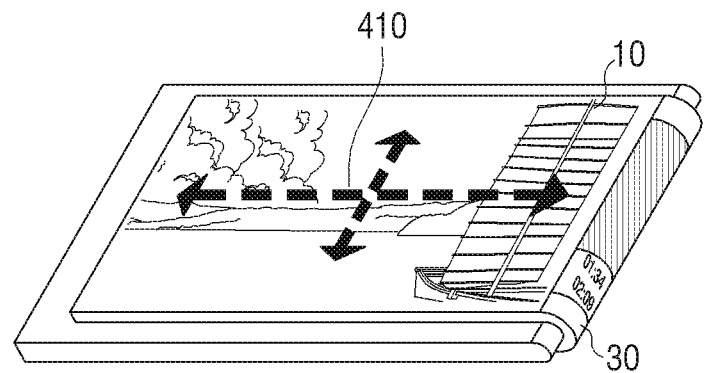
Figure 4F:
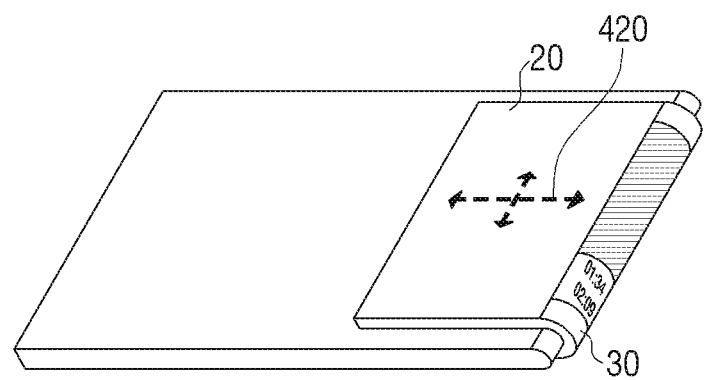

Meanwhile, as shown in FIG. 4F, with respect to the same setting value, the processor 120 may differently adjust the setting value according to whether a touch manipulation is input on the main display area 10, the sub display area 20 or the round display area 30. For example, if a drag manipulation is input with respect to the main display area 10 while a video is displayed on the main display area 10, the processor 120 may adjust a play time, a volume, etc. according to the direction of the drag manipulation. In addition, the processor 120 may adjust the play time, the volume, etc. only using a drag manipulation with respect to the sub display area 20. In this case, the processor 120 may adjust the play time, the volume, etc. more minutely when the drag manipulation is input with respect to the sub display area 20 than when the drag manipulation is input with respect to the main display area 10.

GUIs 410 and 420 indicating a direction in FIG. 4F are provided for convenience of explanation, and they may be displayed on the display area depending on circumstances. For example, if there is a user touch, the processor 120 may display GUIs of four directions with respect to the touch point.

FIGS. 4A to 4F are only examples, and the present disclosure is not limited thereto. For example, the main display area 10, the sub display area 20 and the round display area 30 of FIGS. 4A to 4F may be interchangeable.

In addition, the video application and the call application of FIGS. 4A to 4F may be replaced with other applications.

Figure 5A:
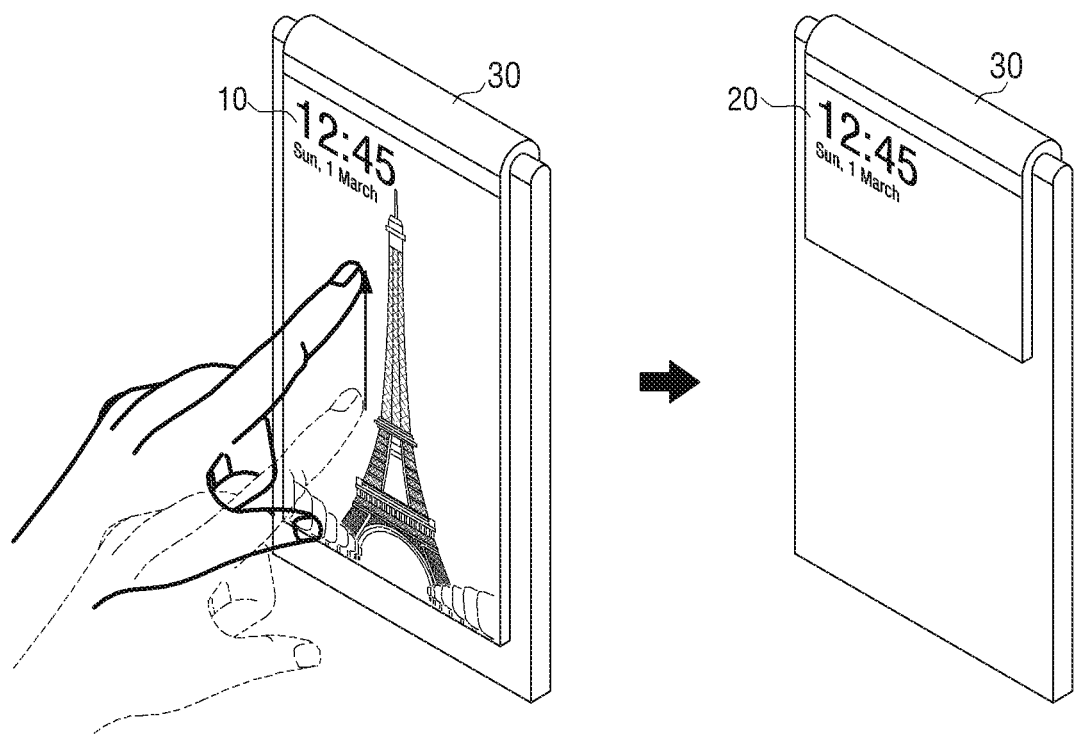
FIGS. 5A and 5B are views provided to explain each area and an example of an operation according to a touch input.
Figure 5B:
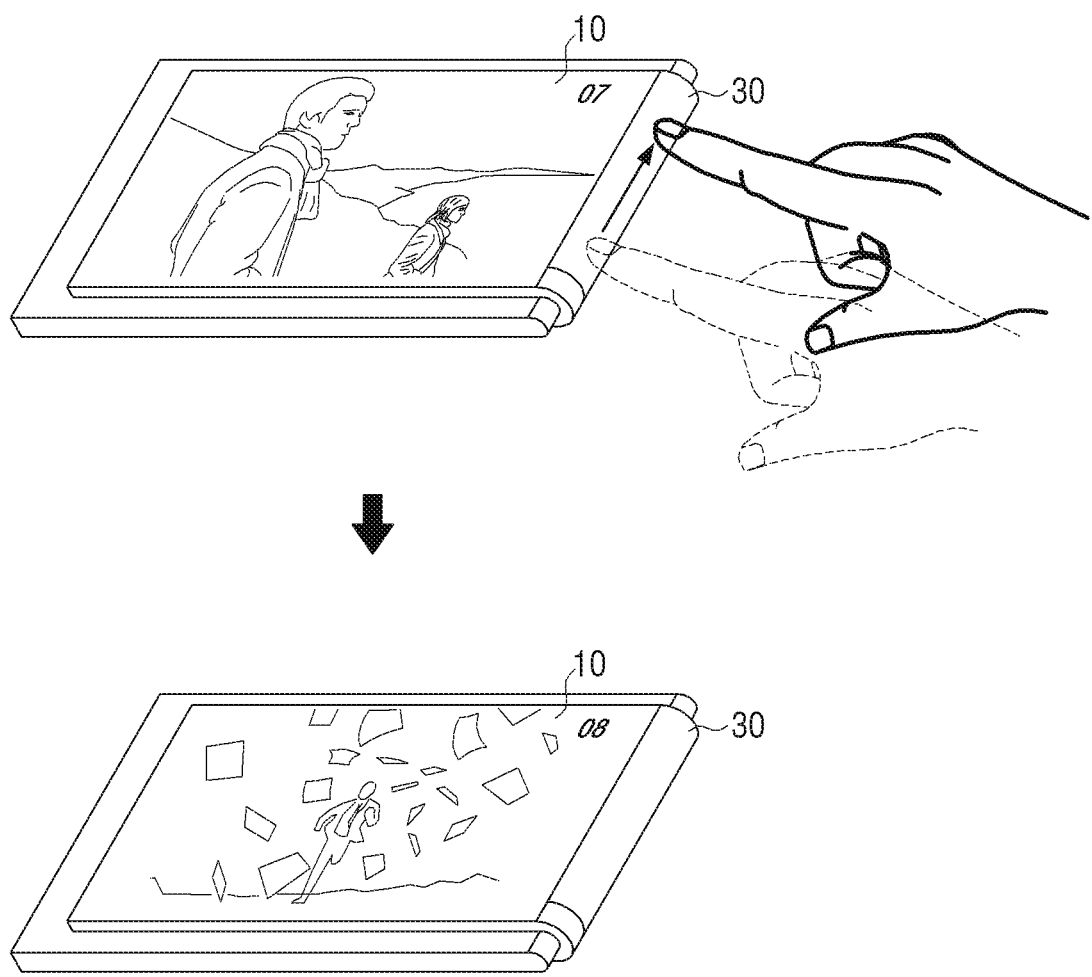

FIGS. 5A and 5B are views provided to explain each area and an example of an operation according to a touch input.

As illustrated in FIG. 5A, if a drag input toward the round display area 30 is received on one area of the main display area 10, the information provided on the main display area 10 may be displayed on the sub display area 20.

The processor 120 may display the information displayed on the main display area 10 on the sub display area 20 only when a drag input with more than a predetermined size is received.

If there is information provided to the sub display area 20 before a drag input is input, the processor 120 may not provide information which has been provided on the sub display area 20 anymore. In addition, the processor 120 may display the information that has been provided to the sub display area 20 on the main display area 10 or the round display area 30.

If a drag input toward the round display area 30 is received on one area of the sub display area 20, the processor 120 may display the information provided to the sub display area 20 on the main display area 10.

Meanwhile, the similar operation may be performed in areas where information is not provided. For example, if a drag input toward one area of the main display area 10 is received on the round display area 30 while the main display area 10 does not provide information and the sub display area 20 provides information, the processor 120 may display the information provided on the sub display area 20 on the main display area 10.

Alternatively, if a drag input toward one area of the sub display area 20 is received on the round display area 30 while the main display area 10 provides information and the sub display area 20 does not provide information, the processor 120 may display the information provided on the main display area on the sub display area 20.

FIG. 5A describes that only the main display area 10 and the sub display area 20 are used, but this is only an example. For example, depending on the type of a user input, the processor 120 may display information provided to one of the main display area 10 and the sub display area 20 on the round display area 30. Alternatively, the processor 120 may display the information provided to the round display area 30 on one of the main display area 10 and the sub display area 20.

Meanwhile, as illustrated in FIG. 5B, the processor 120 may receive a touch input without providing information to a specific area. For example, if the user input of dragging the round display area 30 is received while a broadcast content is displayed on the main display area 10, the processor 120 may change the channel or the volume of the broadcast content. In this case, no information may be provided to the round display area 30.

FIGS. 6A to 6D are views provided to explain an example of an operation according to a touch input on the sub display area 20.

Figure 6A:
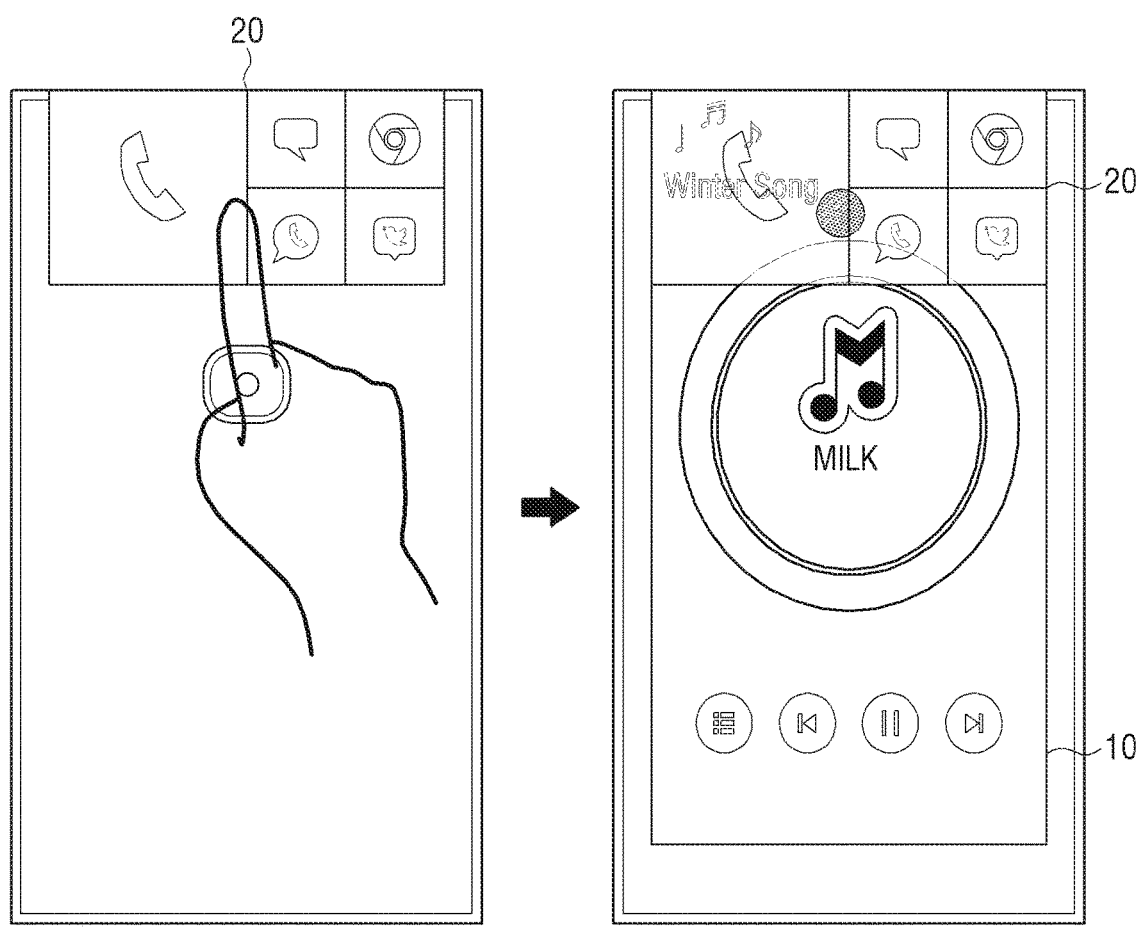
FIGS. 6A to 6D are views provided to explain an example of an operation according to a touch input on a sub display area.

As illustrated in FIG. 6A, if a predetermined touch input is received on the sub display area 20, the processor 120 may control the display 110 to display the UI displayed on the sub display area 20 on the main display area 10. For example, if a user touches the sub display area 20 that is provided on the rear side of the user terminal apparatus 100, the processor 120 may display the UI displayed on the sub display area 20 on the main display area 10. However, this is only an example, and the processor 120 may display the UI displayed on the sub display area 20 on the main display area 10 when a touch input is received twice in a row or a touch input is received for more than a predetermined time.

Here, the processor 120 may provide information to the sub display area 20 according to the user input of touching the sub display area 20 while the information is provided to the main display area 10. Alternatively, if the manipulation of pressing a specific button on the user terminal apparatus 100 is input, the processor 120 may provide information to the sub display area 20. The processor 120 may display the corresponding information on the sub display area 20 when a text message, etc. is received. Alternatively, as illustrated in FIG. 5A, the processor 120 may display the information provided to the main display area 10 on the sub display area 20 according to a drag input. Such an operation may be performed in the same manner with respect to the main display area 10 and the round display area 30.

The processor 120 may display a home screen, a lock screen, a notification screen, an application screen, etc. on the sub display area 20. In addition, the processor may change the size, the location, the layout, etc. of an object displayed on the main display area 10 and display the object on the sub display area 20.

Meanwhile, in order to prevent power consumption, the processor 120 may not provide information to the sub display area 20 after displaying the UI displayed on the sub display area 20 on the main display area 10. In addition, the processor 120 may receive a touch input using the sub display area 20 by activating only a touch function of the sub display area 20.

FIG. 6A illustrates that the processor 120 displays the UI displayed on the sub display area 20 on an upper part of the main display area 10, but this is only an example. For example, the processor 120 may display the UI displayed on the sub display area 20 on a lower part rather than the upper part of the main display area 10. Alternatively, the processor 120 may display the UI displayed on the sub display area 20 on the round display area 30. In this case, the processor 120 may change the UI displayed on the sub display area 20 and display the UI on the round display area 30.

Meanwhile, the processor 120 may display a GUI indicating a touched point on the sub display area 20 at a corresponding location of the main display area 10, which will be described in detail with reference to FIG. 8.

Figure 6B:
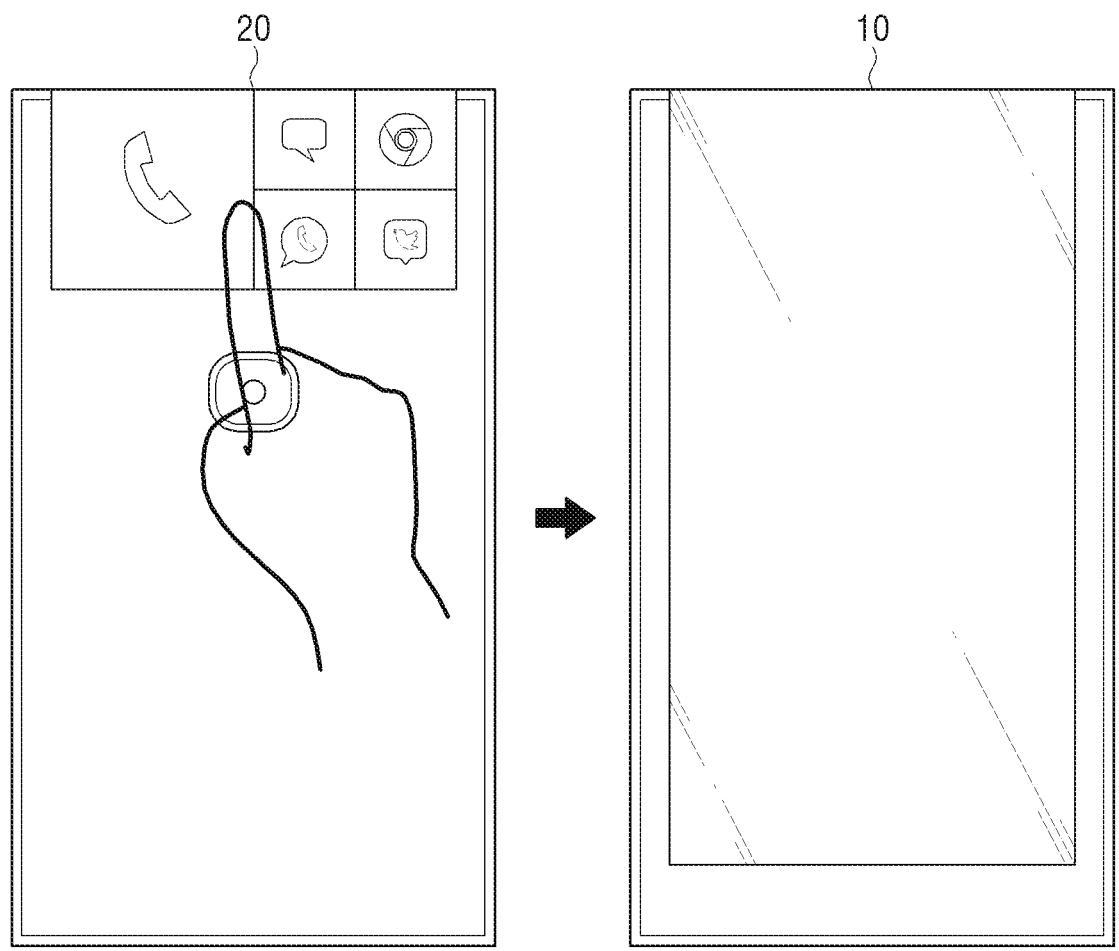

As illustrated in FIG. 6B, if a predetermined touch input is received on the sub display area 20 and the main display area 10 is activated, the processor 120 may display the UI displayed on the sub display area 20 on the main display area 10. For example, as illustrated in FIG. 6A, the processor 120 may display the UI displayed on the sub display area 20 on the main display area 10 only when a certain UI is displayed on the main display area 10, and as illustrated in FIG. 6B, if the main display area 10 is inactivated, the processor 120 may not display the UI displayed on the sub display area 20 on the main display area 10.

Here, an activated display function may refer to a state where information is provided, and an inactivated display function may refer to a state where information is not provided. In particular, the inactivated display function may indicate a state where power is not supplied to the display 110, a state where power is supplied to the display 110 but a backlight is turned off, a state where the display 110 displays a block color, etc.

In addition, a touch function may be activated regardless of a display function, that is, the touch function may be activated even if the display function is inactivated. Alternatively, the display function may be activated even if the touch function is inactivated.

Meanwhile, if a predetermined touch input is received on the sub display area 20 when the main display area 10 is inactivated, the processor 120 may activate the main display area 10 and display the UI displayed on the sub display area 20 on the main display area 10.

In particular, if a user is recognized and the user's gaze faces the main display area 10, the processor 120 may display the UI displayed on the sub display area 20 on the main display area 10. For example, the processor 120 may display the UI displayed on the sub display area 20 on the main display area 10 only when the user gazes at the main display area 10. If the user gazes at the sub display area 20, the processor 120 may not provide information to the main display area 10 even if a predetermined touch input is received on the sub display area 20.

Meanwhile, the processor 120 may cause the user terminal apparatus 100 to enter a power saving mode when a battery is lower than a certain level. For example, when entering a power saving mode, the processor 120 inactivate at least one of the main display area 10, the sub display area 20 and the round display area 30. However, this is only an example, and the processor 120 may enter a power saving mode according to a user input. FIG. 6B illustrates that the main display area 10 is inactivated, but the sub display area 20 may be inactivated as illustrated in FIG. 6C.

Meanwhile, in a power saving mode where the main display area 10 is inactivated, the processor 120 may compare the UI displayed on the sub display area 20 with the UI displayed on the main display area 10 and display a simpler design. For example, the processor 120 may display a phone icon and a corresponding phrase on the main display area 10, but display only the phone icon without the corresponding phrase on the sub display area 20.

Figure 6C:
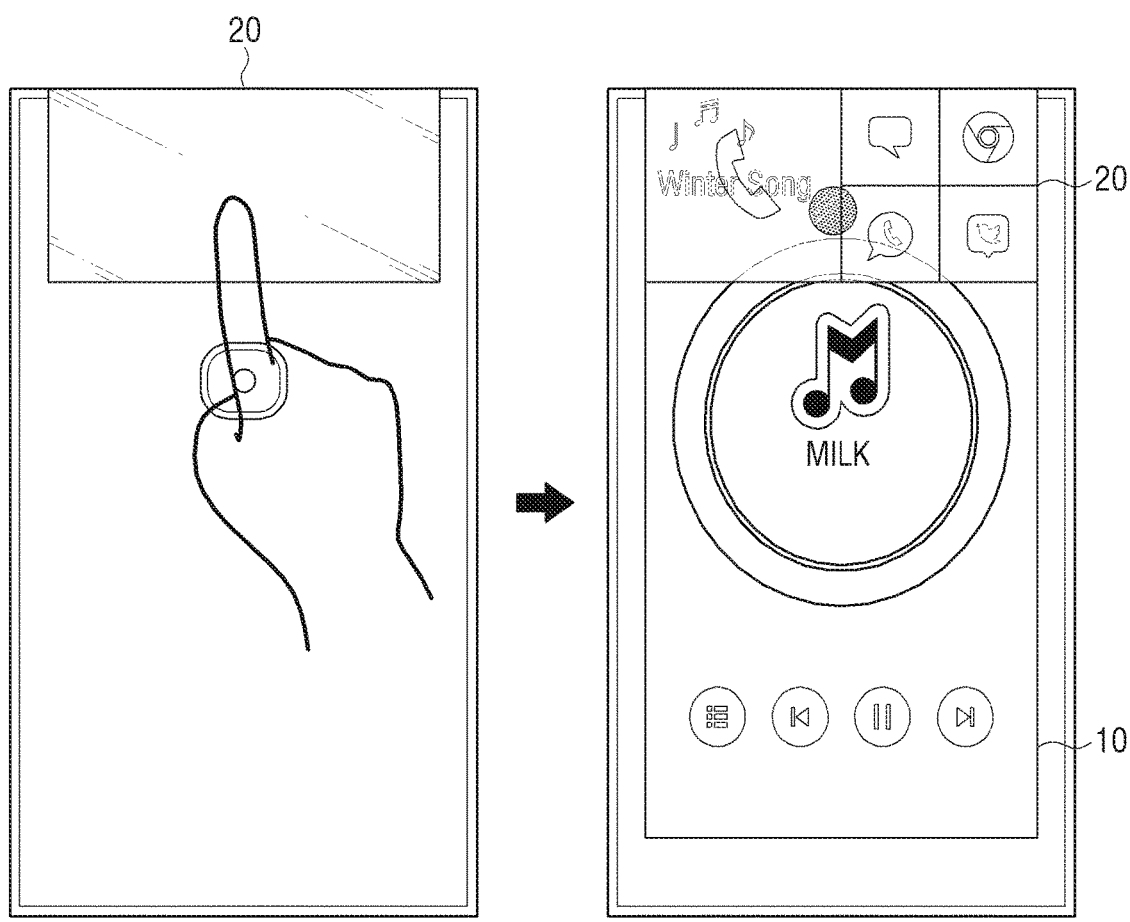

As illustrated in FIG. 6C, even when the sub display area 20 is inactivated and only the main display area 10 is activated, if a predetermined touch input is received on the sub display area 20, the processor 120 may activate the sub display area 20 and display a predetermined UI on the main display area 10. For example, even when the sub display area 20 is inactivated and only the main display area 10 is activated, if a predetermined touch input is received on the sub display area 20, the processor 120 may display the most basic UI on the sub display area 20 and display the corresponding UI on the main display area 10. The most basic UI may be a UI including a call function, a message function, etc.

However, this is only an example, and the processor 120 may display the most basic UI on the main display area 10 without activating the sub display area 20. In addition, the processor 120 may display, instead of the most basic UI, one of a UI set by a user, a UI that has been displayed before the sub display area 20 is inactivated, a UI related to the UI displayed on the main display area 10, and a soft key on the main display area 10.

The processor 120 may control a function that is provided to the UI additionally displayed on the main display area 10 according to a touch input on the sub display area 20 regardless of whether the sub display area 20 is activated. For example, even if the sub display area 20 is inactivated, if a touch input is received on the sub display area 20, the processor 120 may display a predetermined UI on the main display area 10, and if an additional touch input is received on the sub display area 20, may execute a function corresponding to the additional touch input. In this case, even when the function is executed, the processor 120 may maintain the state where the display function of the sub display area 20 is inactivated and may recognize a touch input.

Figure 6D:
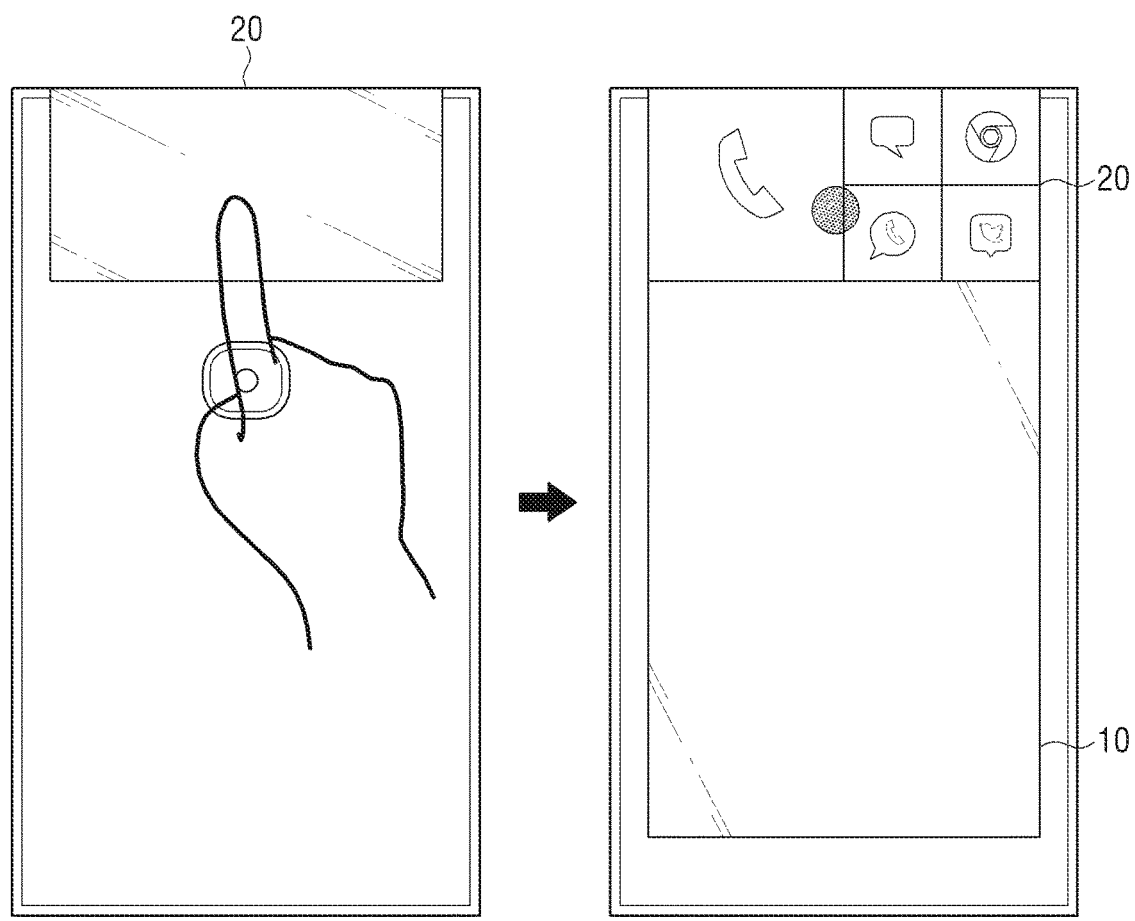

As illustrated in FIG. 6D, even when both of the main display area 10 and the sub display area 20 are inactivated, if a predetermined touch input is received on the sub display area 20, the processor 120 may activate the main display area 10 and the sub display area 20 and display a predetermined UI on the main display area 10. However, this is only an example, and the processor 120 may activate only the main display area 10 and display the predetermined UI on the main display area 10. In addition, the processor 120 may activate only the sub display area 20 and display the predetermined UI on the sub display area 20. The processor 120 may display another UI instead of the predetermined UI as described above.

Here, which one of the main display area 10 and the sub display area 20 will be activated may be determined according to a user's gaze, the orientation of the user terminal apparatus 100, etc.

Figure 7A:
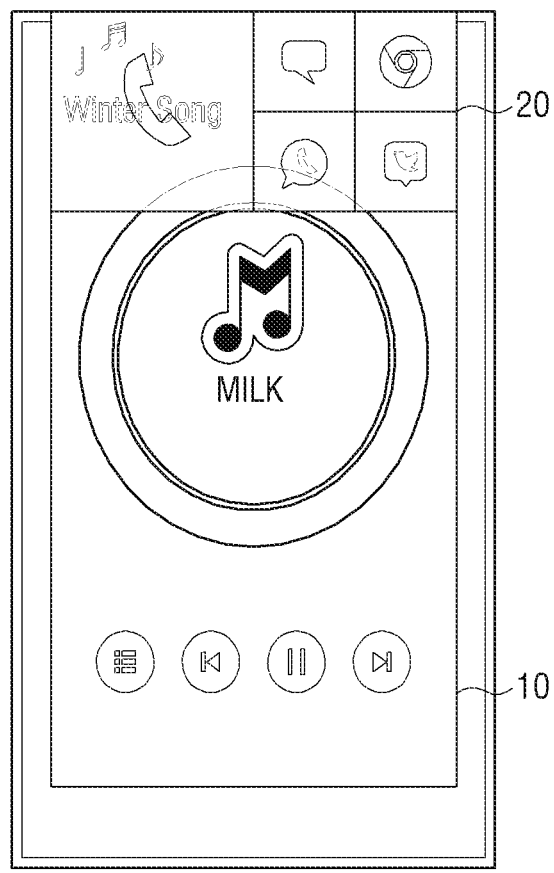
FIGS. 7A and 7B are views provided to explain an example of a method of displaying a UI displayed on a sub display area on a main display area.
Figure 7B:
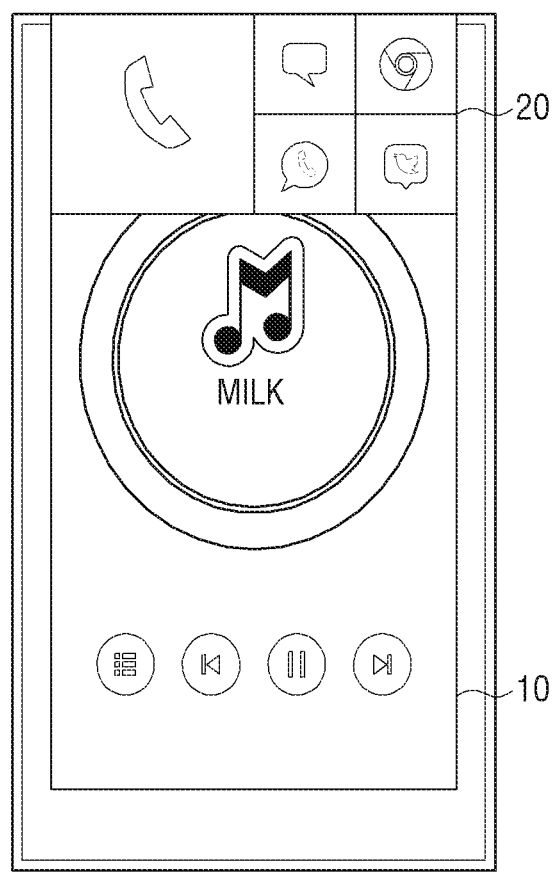

FIGS. 7A and 7B are views provided to explain an example of a method of displaying a UI displayed on the sub display area 20 on the main display area 10.

Referring to FIG. 7A, the processor 120 may overlay the UI displayed on the sub display area 20 with the UI displayed on the main display area 10. For example, the processor 120 may increase the transparency of the UI displayed on the sub display area 20 and display the UI by overlaying the UI with the UI displayed on the main display area 10.

However, this is only an example, and the processor 120 may display only a UI element included in the UI displayed on the sub display area 20 and make the remaining area transparent and display the UI element on the UI displayed on the main display area 10. The UI element in FIG. 7A may be a phone icon, a message icon, an Internet icon, etc.

Referring to FIG. 7B, the processor 120 may cause the UI displayed on the sub display area 20 to cover part of the UI displayed on the main display area 10. For example, if the processor 120 displays the UI displayed on the sub display area 20 on the upper part of the main display area 10, the information displayed on the upper part of the main display area 10 may not be displayed.

Figure 8:
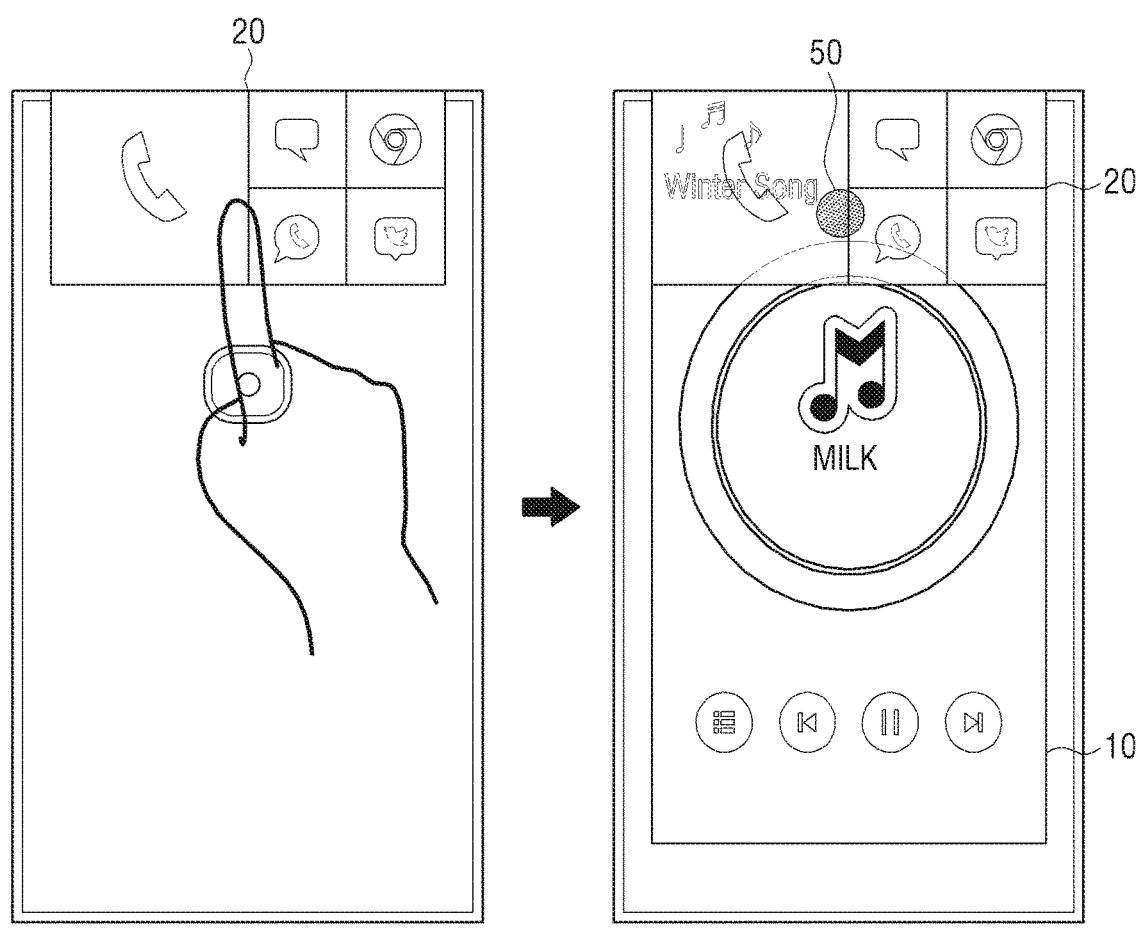
FIG. 8 is a view provided to explain a method of displaying a user's touch point on a main display area according to an exemplary embodiment.

FIG. 8 is a view provided to explain a method of displaying a user's touch point on the main display area 10 according to an exemplary embodiment.

Referring to FIG. 8, the processor 120 may display a GUI 50 indicating a point touched on the sub display area 20 at a corresponding location of the main display area 10. For example, the processor 120 may display the GUI 50 indicating a touched point on the main display area 10 based on a relative location on the main display area 10 with respect to the point touched on the sub display area 20. There may be various exemplary embodiments regarding a point touched on the sub display area 20 and a relative location of the GUI 50 that indicates the touched point according to the method of displaying the UI displayed on the sub display area 20 on the main display area 10, which will be described in detail later.

The processor 120 may partially change the transparency of the UI displayed on the sub display area 20, which is displayed on the main display area 10 based on the position of the main display area 10 where the GUI 50 is displayed. For example, if the GUI 50 is located at a place close to a phone icon, the processor 120 may lower the transparency of the phone icon to increase the visibility of the phone icon. In this case, the processor 120 may lower the transparency of the phone icon only and may maintain or increase the transparency of a message icon and an Internet icon that are far away from the GUI 50.

Meanwhile, FIG. 8 illustrates that GUI 50 is in the form of circle, but this is only an example. For example, the processor 120 may display a GUI in the form of arrow or in the form of finger.

FIGS. 9A to 9D are views provided to explain a method of displaying a UI element and an example of a touch input according to the method.

Figure 9A:
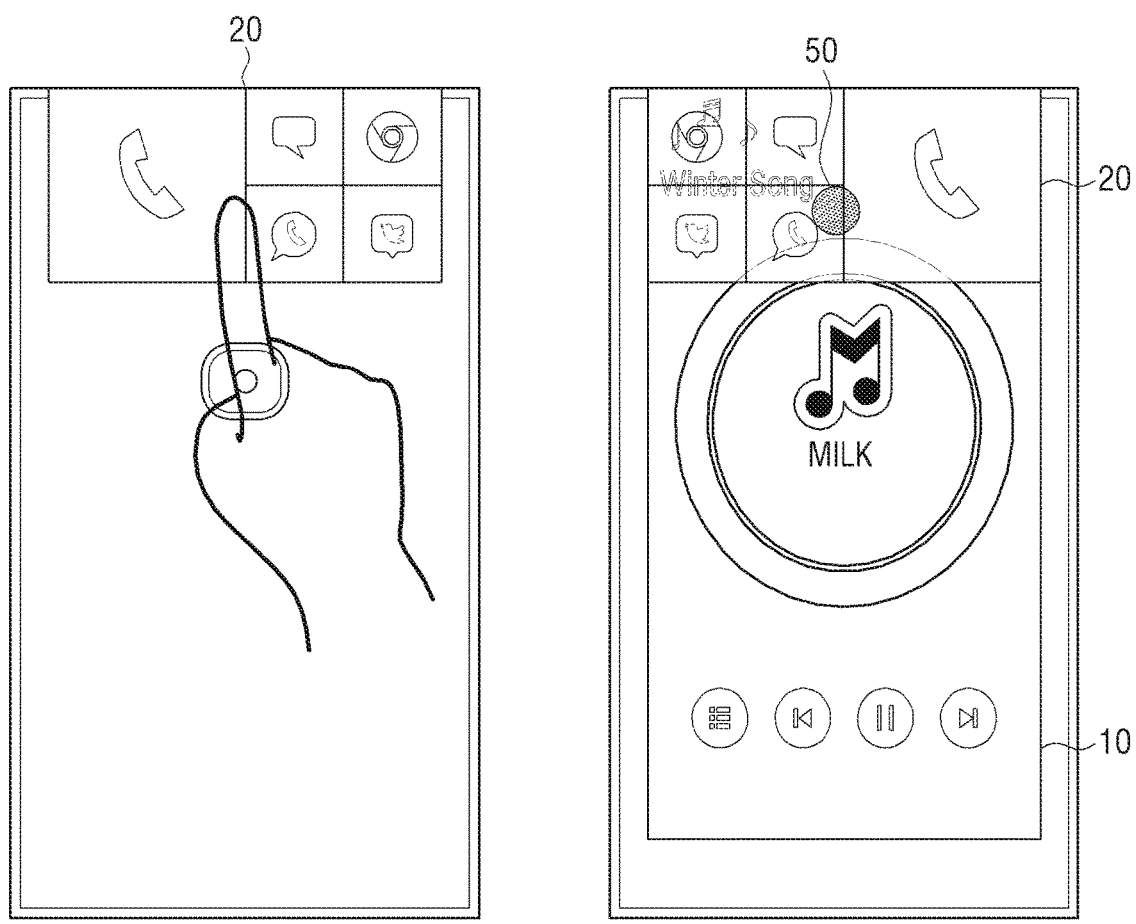
FIGS. 9A to 9D are views provided to explain a method of displaying a UI element and an example of a touch input according to the method.

Referring to FIG. 9A, the processor 120 may display at least one UI element included in the UI displayed on the sub display area 20 at a location of the main display area 10 corresponding to the display position of the sub display area 20 and the UI element has predetermined transparency. For example, the UI element may be a phone icon, a message icon, an Internet icon, etc., and the processor 120 may place the phone icon disposed on the left side of the sub display area 20 on the right side of the main display area 10. In other words, the processor 120 may display a UI element by placing it a symmetrical manner with reference to a user terminal.

However, a UI element, not a picture (icon) shown in the UI element, is placed in a symmetrical manner with reference to a user terminal. FIG. 9A illustrates that the direction in which the phone icon is tilted is the same on the main display area 10 and the sub display area 20, and the picture (icon) shown in the UI element UI itself is not symmetrical. However, this is only an example, and the processor 120 may display the icon in a symmetrical manner.

Figure 9B:
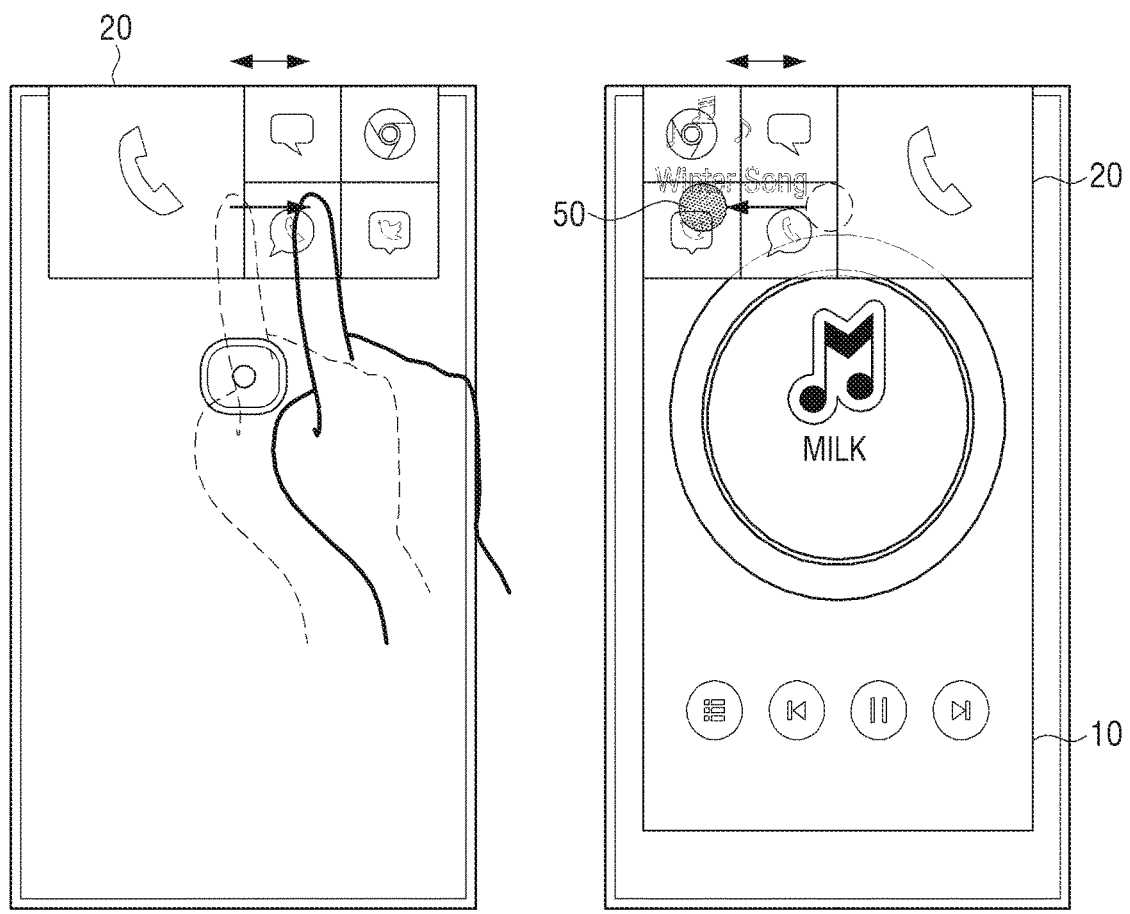

Referring to FIG. 9B, if a touch input proceeds to the right direction in the setting illustrated in FIG. 9A, the processor 120 may move the GUI 50 displayed on the main display area 10 in the left direction and display the GUI 50. For example, if a user's touch input moves from the phone icon to the Internet icon passing the message icon, the processor 120 may move the GUI 50 displayed on the main display area 10 in the left direction so as to display the GUI 50 on the phone icon passing the message icon to the Internet icon. Such an operation makes it easier for a user to intuitively use the user terminal apparatus 100, but the UI element touched on the sub display area 20 and the UI element where the GUI 50 of the main display area 10 may be different from each other. However, this is only an example, and the direction where a touch input moves may be the same as the direction where the GUI 50 moves.

Meanwhile, if the UI element displayed on the sub display area 20 and the UI element where the GUI 50 is located on the main display area 10 are different from each other, the processor 120 may execute a function based on the disposition state of the user terminal apparatus 100. For example, if the main display area 10 of the user terminal apparatus 100 faces upward, the processor 120 may execute a function corresponding to the UI element where the GUI 50 is located. However, this is only an example, and the processor 120 may execute a function corresponding to the UI which is touched on the sub display area 20 even if the main display area 10 of the user terminal apparatus 100 faces upward.

Alternatively, the processor 120 may select a corresponding function based on the direction of a user's gaze by recognizing the user's gaze. For example, if a user gazes at the main display area 10 of the user terminal apparatus 100, the processor 120 may execute a function corresponding to the UI element where the GUI 50 is located.

Figure 9C:
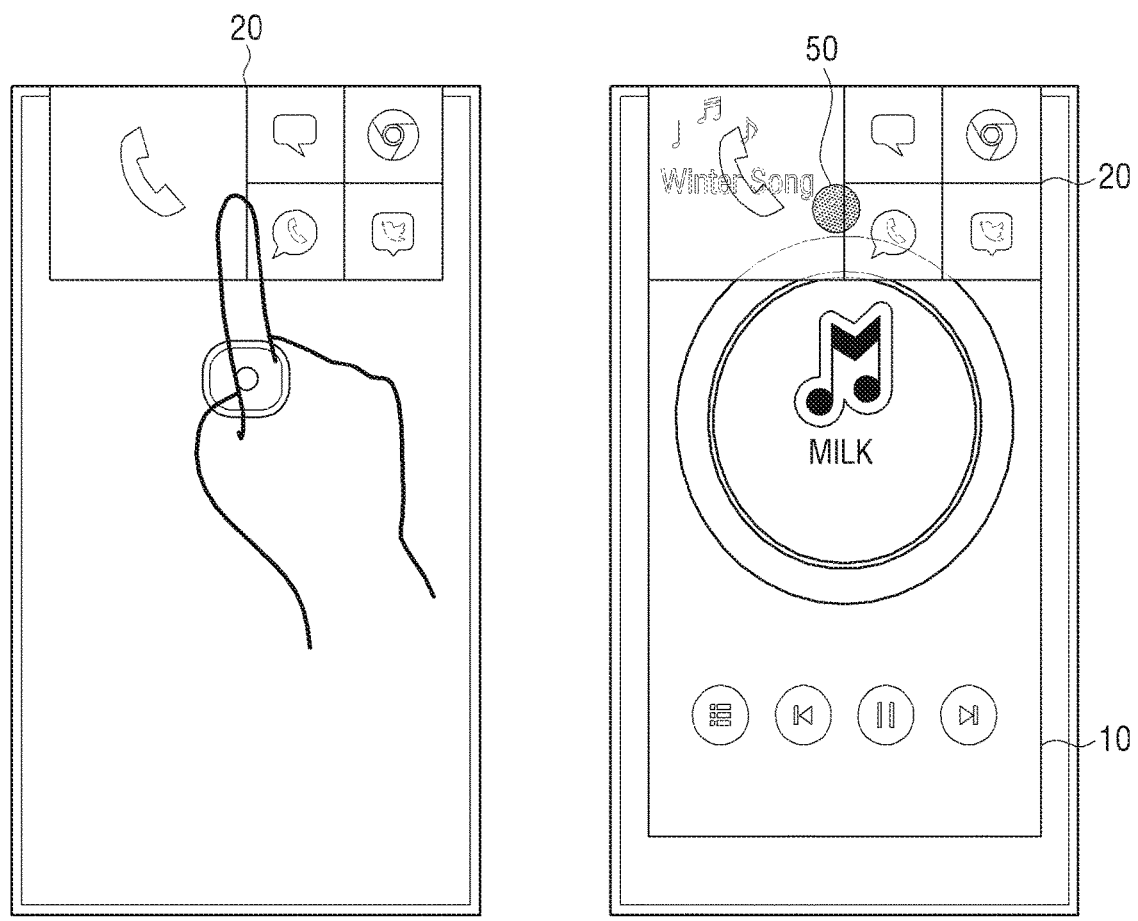

Referring to FIG. 9C, the processor 120 may display the UI displayed on the sub display area 20 on the main display area 10 in the same manner. For example, the processor 120 may display the UI of the sub display area 20 where the phone icon, the message icon and the Internet icon are displayed from the left side to the right side on the main display area 10 in the same manner.

Figure 9D:
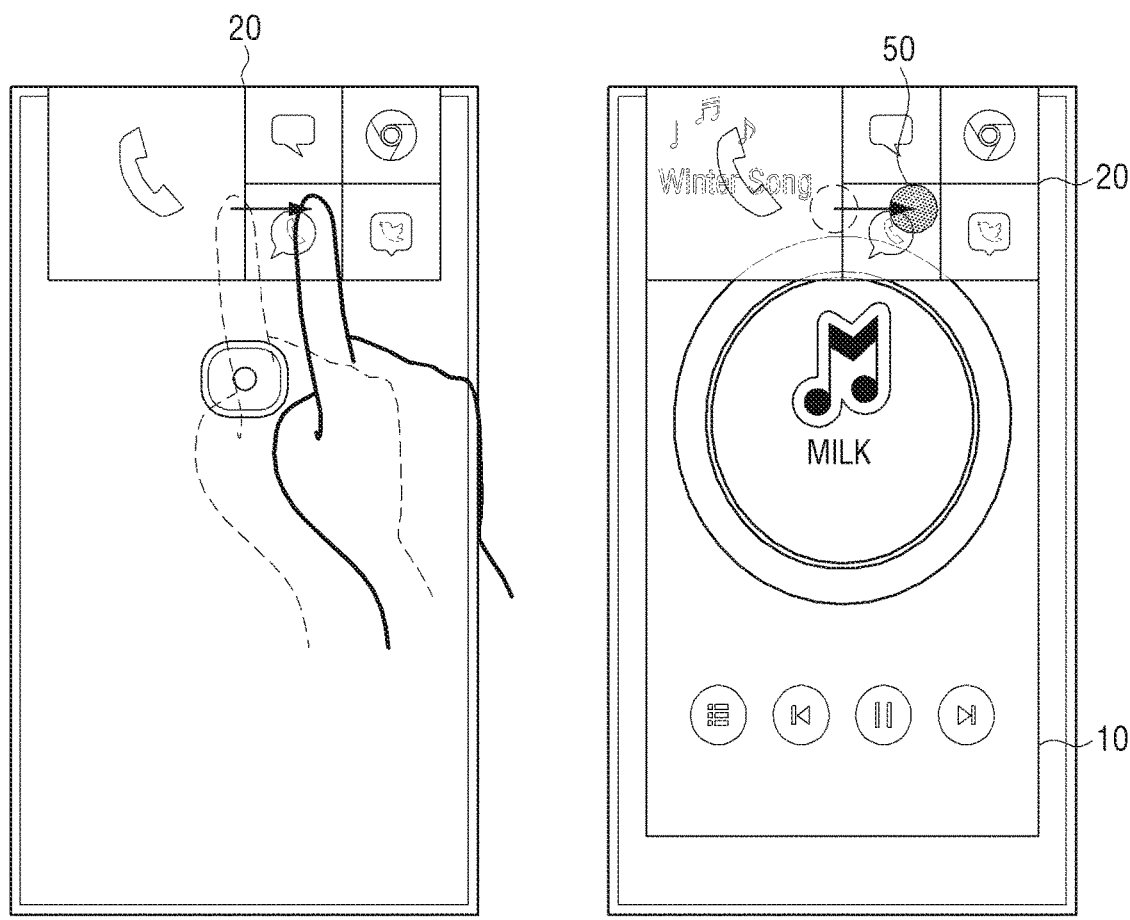

Referring to FIG. 9D, if a touch input proceeds to the right direction in the setting illustrated in FIG. 9C, the processor 120 may move the GUI 50 displayed on the main display area 10 in the right direction and display the GUI 50. For example, if a user's touch input moves from the phone icon to the Internet icon passing the message icon, the processor 120 may move the GUI 50 displayed on the main display area 10 in the right direction so that the GUI 50 is placed on the Internet icon passing the phone icon and the message icon. However, this is only an example, and the direction where the touch input moves may be opposite to the direction where the GUI 50 moves.

Meanwhile, FIGS. 9A to 9D illustrate an example of the left-and-right arrangement direction of a UI element, and the processor 120 may display at least one of the UI element and the location of the UI element in bilateral symmetry using other configurations. Alternatively, the processor 120 may change a UI element included in the UI displayed on the sub display area 20 in up-and-down direction and arrange the UI element, or may reconfigure and arrange the UI in a completely new manner.

In addition, the method of displaying the UI displayed on the sub display area 20 on the main display area 10 and the direction of a touch input and the GUI 50 may be set by a user.

Meanwhile, if a predetermined touch input is received on the sub display area 20, the processor 120 may display the UI displayed on the sub display area 20 on the main display area 10 and inactivate the sub display area 20. In particular, if a user's gaze faces the main display area 10, the processor 120 display the UI displayed on the sub display area 20 on the main display area 10 and inactivate the sub display area 20.

However, this is only an example, and the processor 120 may not inactivate the sub display area 20 after displaying the UI displayed on the sub display area 20 on the main display area 10. Alternatively, the processor 120 may make the sub display area 20 blurry without inactivating the sub display area 20.

Figure 10A:
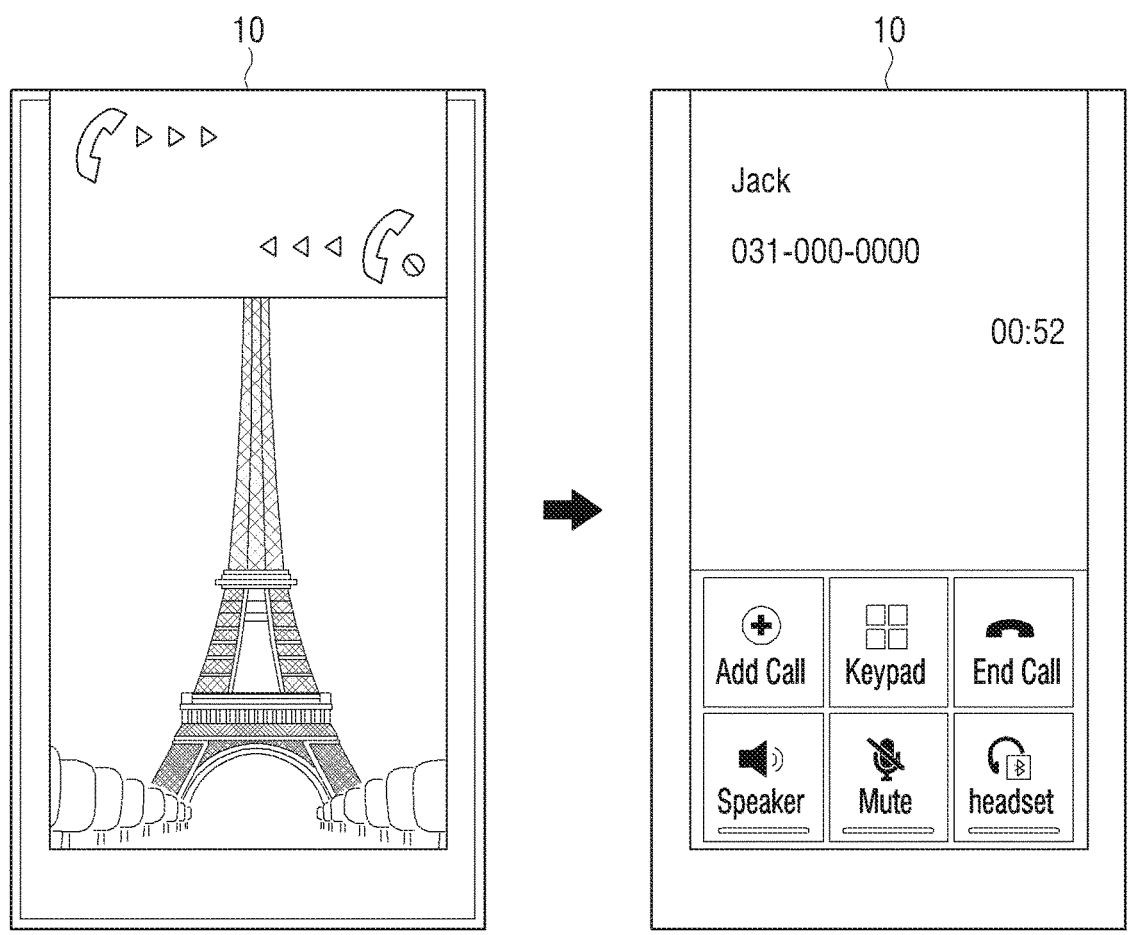
FIGS. 10A and 10B are views provided to explain an example of a result of controlling a UI displayed on a sub display area on a main display area.
Figure 10B:
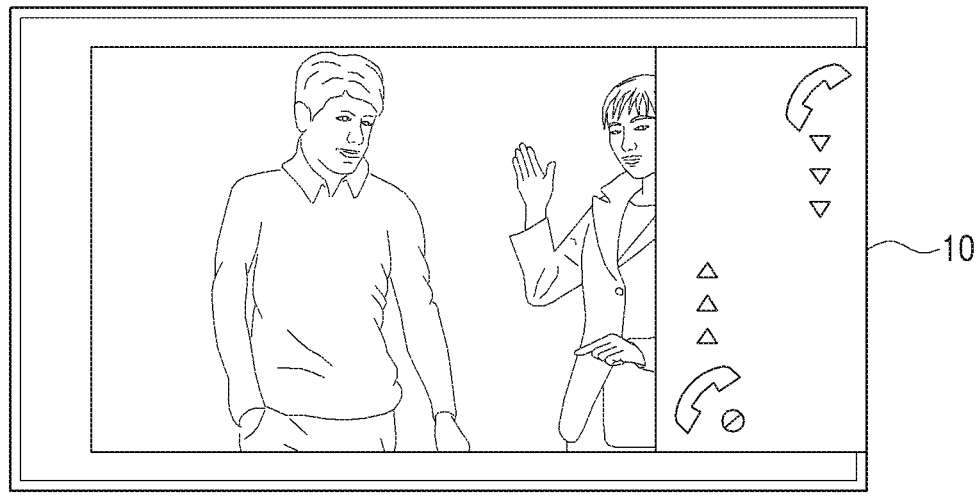
Figure 10B:
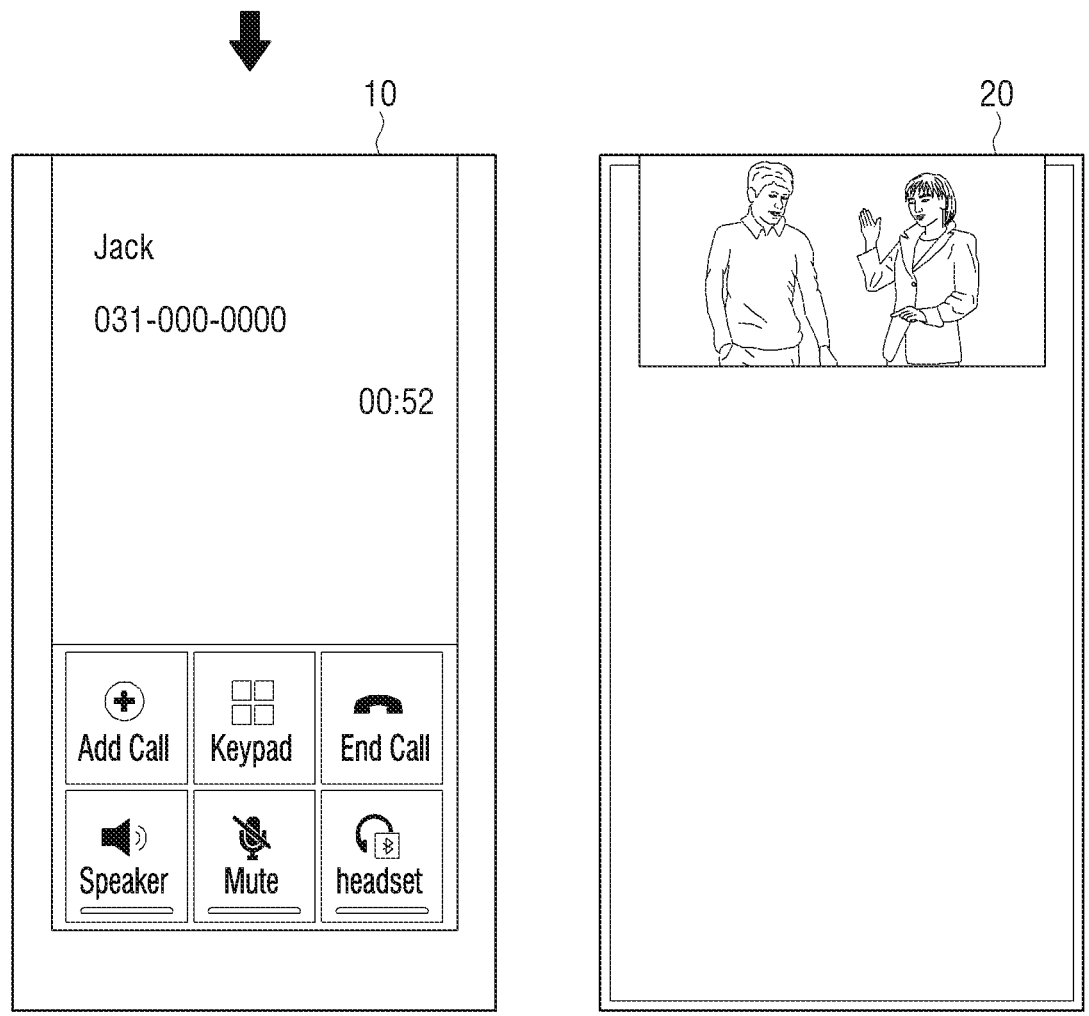

FIGS. 10A and 10B are views provided to explain an example of displaying a result of controlling a UI displayed on the sub display area 20 on a main display area 10.

As illustrated in FIG. 10A, the processor 120 may display the result of controlling the UI displayed on the sub display area 20 on the main display area 10. For example, if a call is received while a lock screen is displayed on the main display area 10, the processor 120 may display a call receiving UI on the sub display area 20. The processor 120 may touch the sub display area 20 to display the call receiving UI displayed on the sub display area 20 on the main display area 10. If a user provides a drag input to receive the call, the processor 120 may connect the call to the opposite party and display a UI indicating that the line is busy on the main display area 10.

However, this is only an example, and the processor 120 may maintain the home screen on the main display area 10 and display a UI indicating that the line is busy on the sub display area 20 or the round display area 30.

The processor 120 may determine an area to display a UI indicating the control result based on at least one of an application executed, a user's gaze and the orientation of a user terminal apparatus. For example, if there is a user input to receive a call, the processor 120 may detect the user's gaze and determine the area to display a UI indicating that the line is busy.

Meanwhile, as illustrated in FIG. 10B, the processor 120 may display a UI indicating the control result on the main display area 10 and display a video content that has been displayed on the main display area 10 on the sub display area 20.

The processor 120 may determine whether to move a screen displayed to another display area based on at least one of an executed application, a user's gaze and the orientation of a user terminal apparatus. FIGS. 10A and 10B illustrate that the processor 120 determines a display area, but the display area may be determined by a user. A user may set the priority of applications in advance. In addition, when a new event occurs, the processor 120 may display a UI inquiring of a user about a display area.

FIGS. 11A to 11G are views provided to explain an example of a UI displayed on the sub display area 20.

Figure 11A:
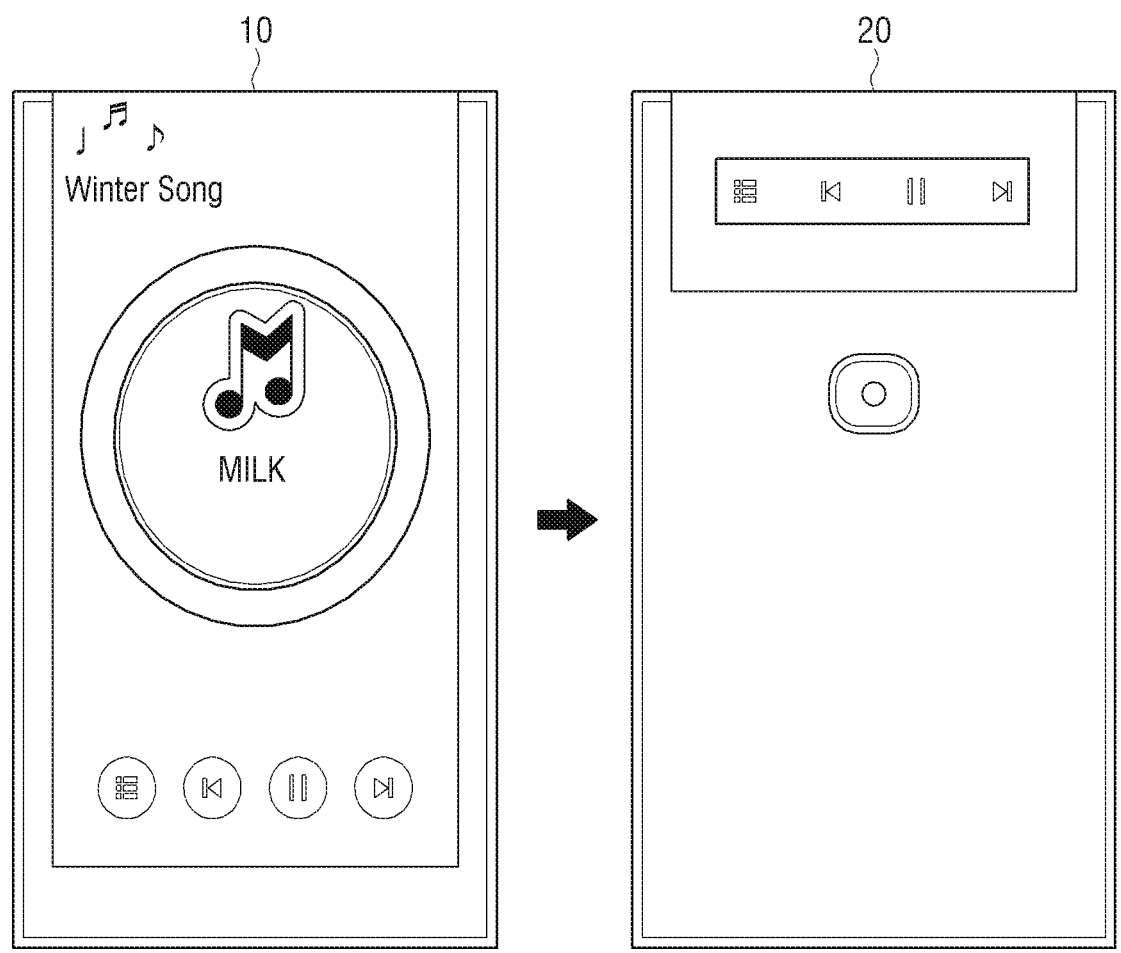
FIGS. 11A to 11G are views provided to explain an example of a UI displayed on a sub display area.

Referring to FIG. 11A, the processor 120 may display a UI in a different form on the sub display area 20 according to the type of content displayed on the main display area 10. For example, if a music content is reproduced on the main display area 10, the processor 120 may display a UI for controlling the music content on the sub display area 20. The UI for controlling the music content may be a UI provided by an application that reproduces the music content, but this is only an example. For example, the processor 120 may detect that the music content is reproduced on the main display area 10, and display a UI related to the music content among UIs stored in the user terminal apparatus 100.

Figure 11B:
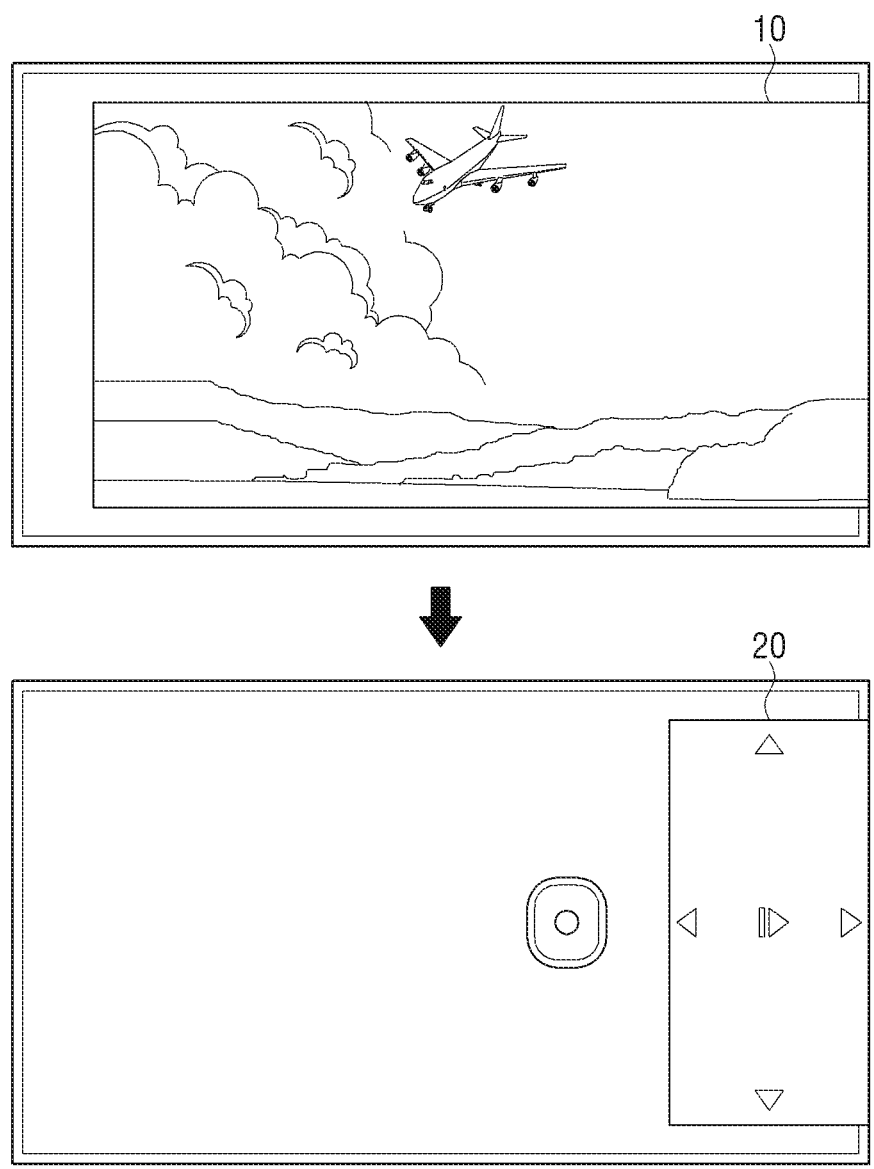

Referring to FIG. 11B, if a video content is reproduced on the main display area 10, the processor 120 may display a UI for controlling the video content on the sub display area 20. The UI for controlling the video content may be UI provided by an application that reproduces the video content, but this is only an example. For example, the processor 120 may detect that the video content is reproduced on the main display area 10, and display a UI related to the video content among UIs stored in the user terminal apparatus 100.

Figure 11C:
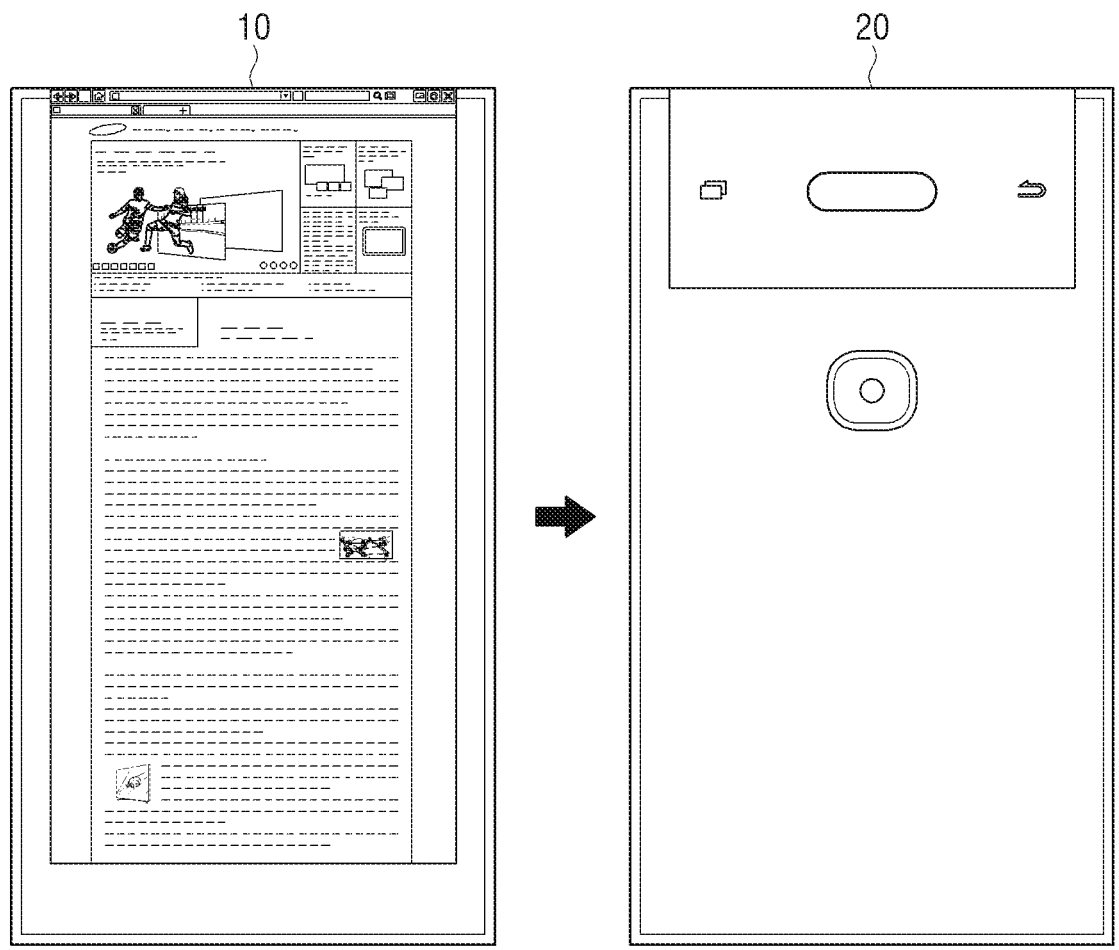

Referring to FIG. 11C, the processor 120 may display a soft key on the sub display area 20. For example, if an Internet screen is displayed on the main display area 10, the processor 120 may display a soft key on the sub display area 20.

The processor 120 may determine whether there is a UI corresponding to an application to be displayed on the sub display area 20 based on information regarding the application that is executed on the main display area 10, and if it is determined that there is no UI to be displayed on the sub display area 20, may display a soft key. For example, an Internet application may not provide any UI to be displayed on the sub display area 20, and the thus processor 120 may determine that there is no UI to be displayed and display a soft key. Alternatively, an application for which a soft key is displayed on the sub display area 20 may be determined by a user's setting.

Figure 11D:
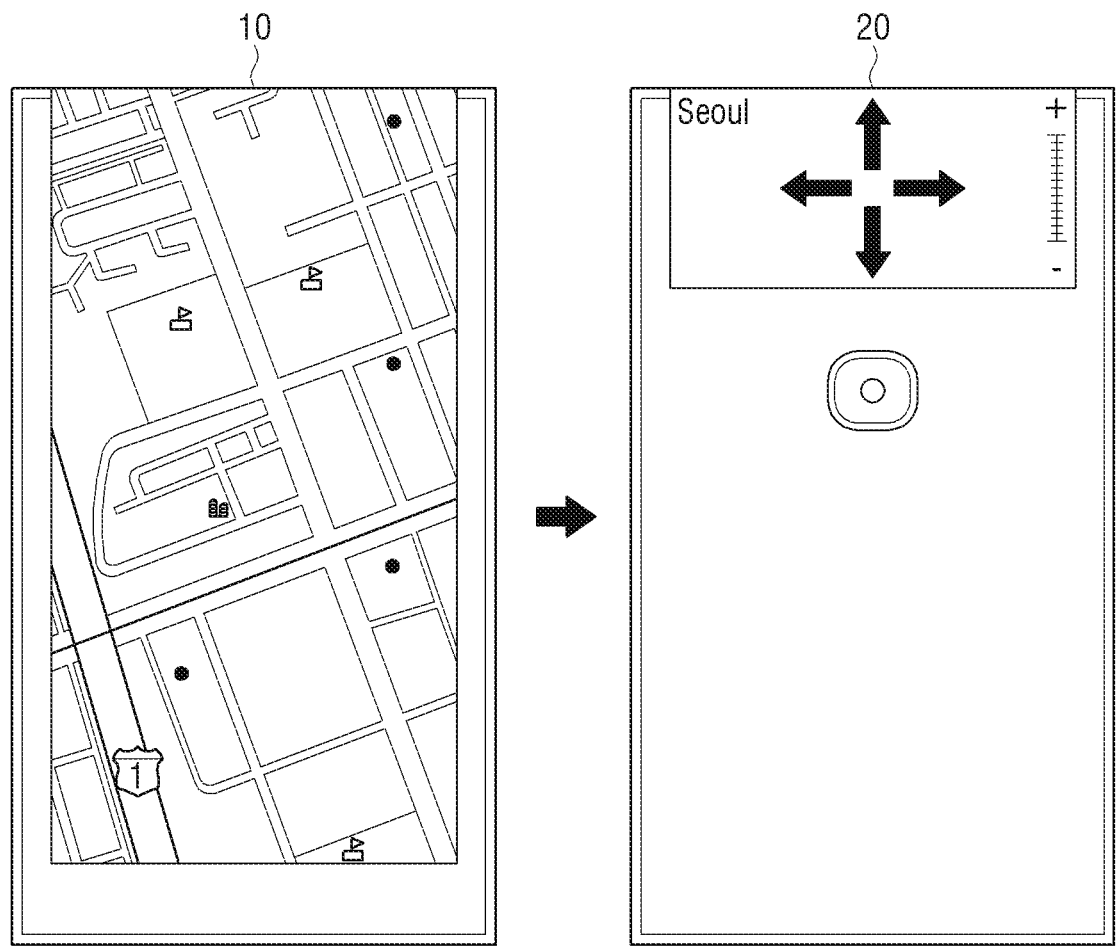

Referring to FIG. 11D, if a map application is executed on the main display area 10, the processor 120 may display a UI for controlling the map application on the sub display area 20. The UI for controlling the map application may be a map provided by the map application, but this is only an example. For example, the processor 120 may detect that the map application is reproduced on the main display area 10, and display a UI related to the map application among UIs stored in the user terminal apparatus 100.

The processor 120 may change the location of the map displayed on the main display area 10 by using a touch-and-drag input with respect to the sub display area 20. In addition, the processor 120 may display a UI for changing a reduced scale on the right side of the sub display area 20. The processor 120 may display the name of places represented by the map that is displayed on the main display area 10.

Meanwhile, FIGS. 11A to 11D illustrate that the UI to be displayed on the sub display area 20 is determined according to the type of content displayed on the main display area 10, but this is only an example.

Figure 11E:
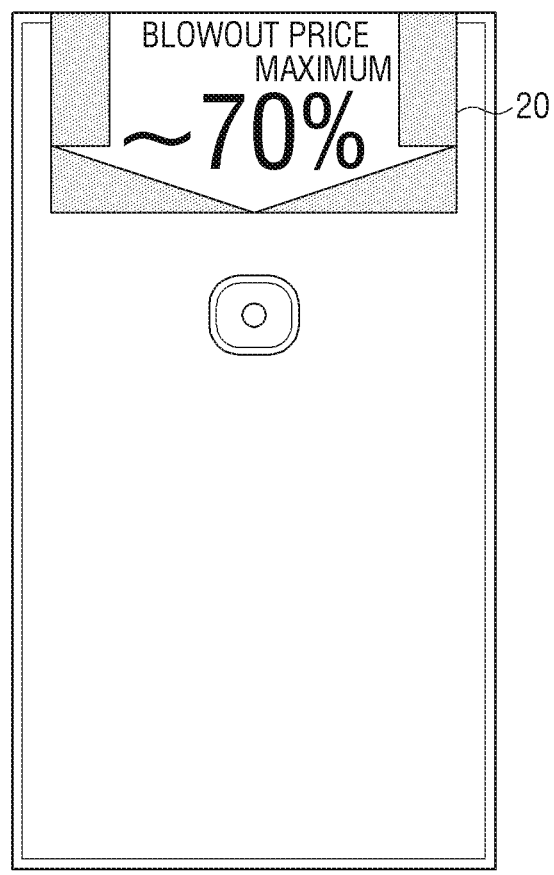

Referring to FIG. 11E, the processor 120 may display an advertisement on the sub display area 20 based on the disposition of the user terminal apparatus 100. In this case, the processor 120 may display an advertisement on the sub display area 20, which has nothing to do with the content displayed on the main display area 10. For example, if it is believed that the user terminal apparatus 100 stands on almost vertically such that the sub display area 20 can be exposed to others, the processor 120 may display an advertisement on the sub display area 20. However, this is only an example, and the processor 120 may periodically display an advertisement. In addition, if a music application is executed on the main display area 10, the processor 120 may display an advertisement related to the music.

The processor 120 may also display an advertisement based on the location information of a user. For example, if a user is in an amusement park, the processor 120 may display an advertisement of the corresponding amusement part or a toy advertisement based on the location information regarding the amusement park.

However, this is only an example, and the processor 120 may display an advertisement based on a usage pattern of the user terminal apparatus 100. For example, if a user is doing an Internet shopping using the user terminal apparatus 100, the processor 120 may display an advertisement regarding a related product.

Meanwhile, the processor 120 may store information regarding the number of an advertisement being exposed and the places where the advertisement has been exposed, and may provide profits to a user based on the stored information. For example, the user may be provided with communication expenses, a discount coupon, etc. from an advertising company based on the stored information.

Figure 11F:
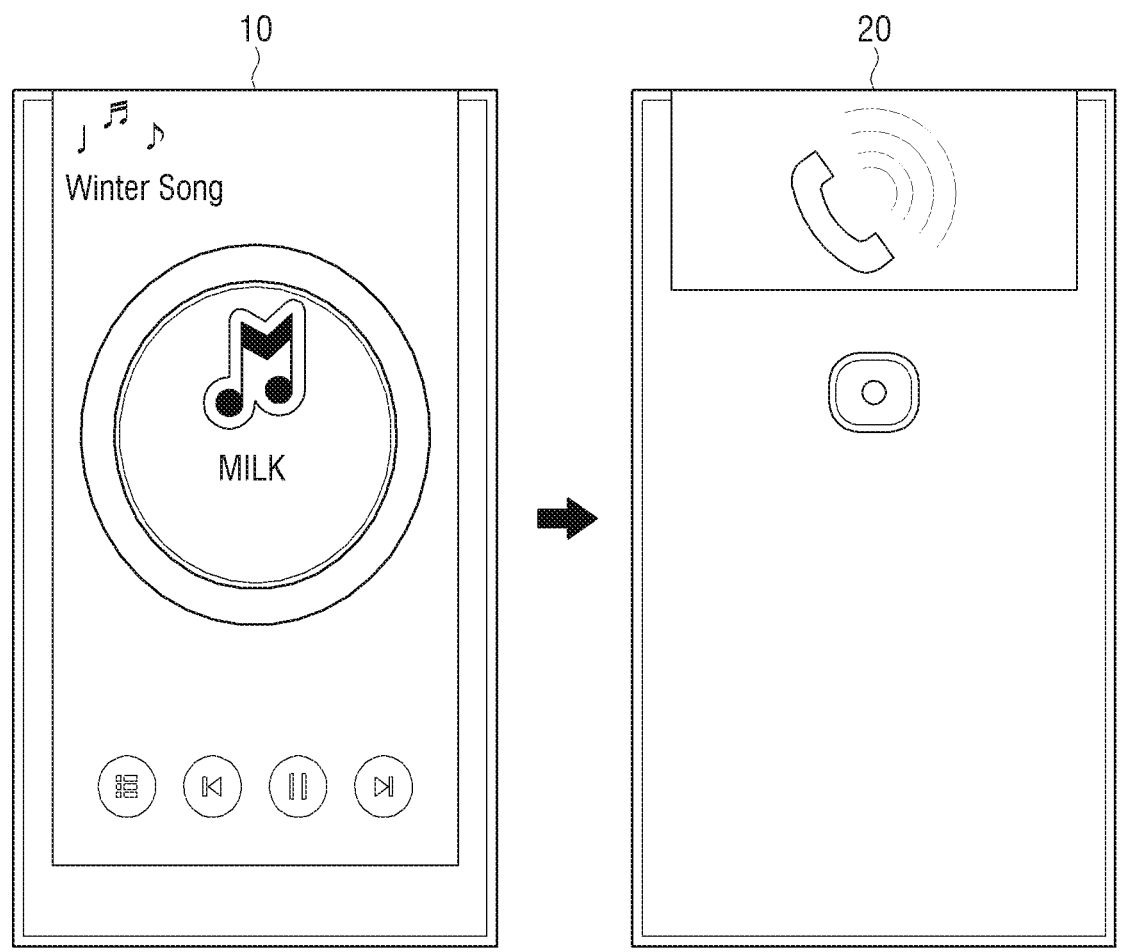

Referring to FIG. 11F, if a call is received while a music content is reproduced on the main display area 10, the processor 120 may display a UI for connecting the received call on the sub display area 20. In this case, if a user touches the UI displayed on the sub display area 20, the processor 120 may connect the call.

However, this is only an example, and the processor 120 may display various UIs on the sub display area 20. For example, the processor 120 may display a UI for informing that a text message, an SNS message, etc. have been received. If a user touches the UI displayed on the sub display area 2, the processor 120 may display the received message on the main display area 10. In addition, the processor 120 may display a UI for updating software or a UI related to WiFi connection. In this case, if the user touches the UI displayed on the sub display area 20, the processor 120 may update software or connect to WiFi.

Figure 11G:
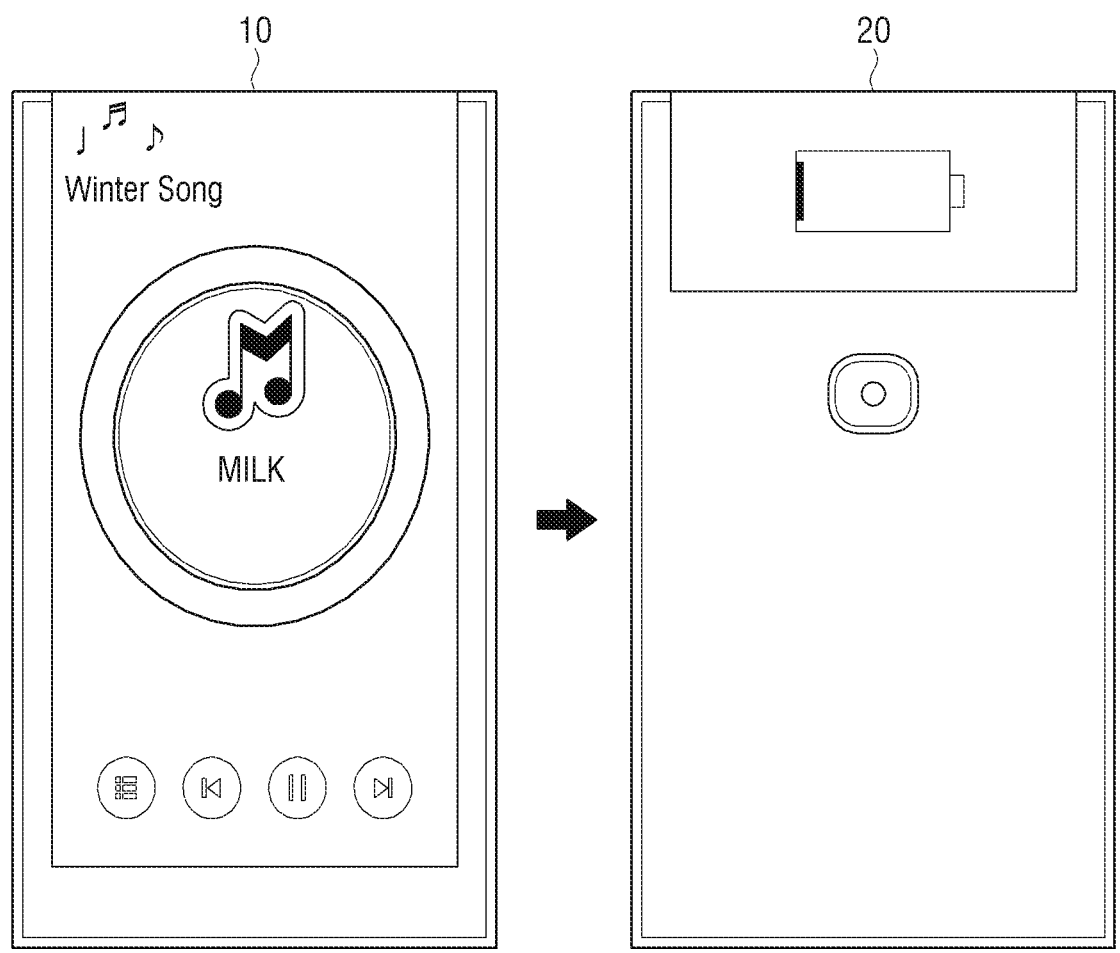

FIG. 11G illustrates an example similar to the example of FIG. 11F, and if a battery is low while a music content is reproduced on the main display area 10, the processor 120 may display a UI for informing that the battery is running low on the sub display area 20. In this case, if a user touches the UI displayed on the sub display area 20, the processor 120 may change the mode of the user terminal apparatus 100 to a power saving mode. In this case, the processor 120 may stop reproducing the music content of the main display area 10. Alternatively, the processor 120 may keep reproducing the music content but inactivate a display function of the main display area 10.

Figure 12A:
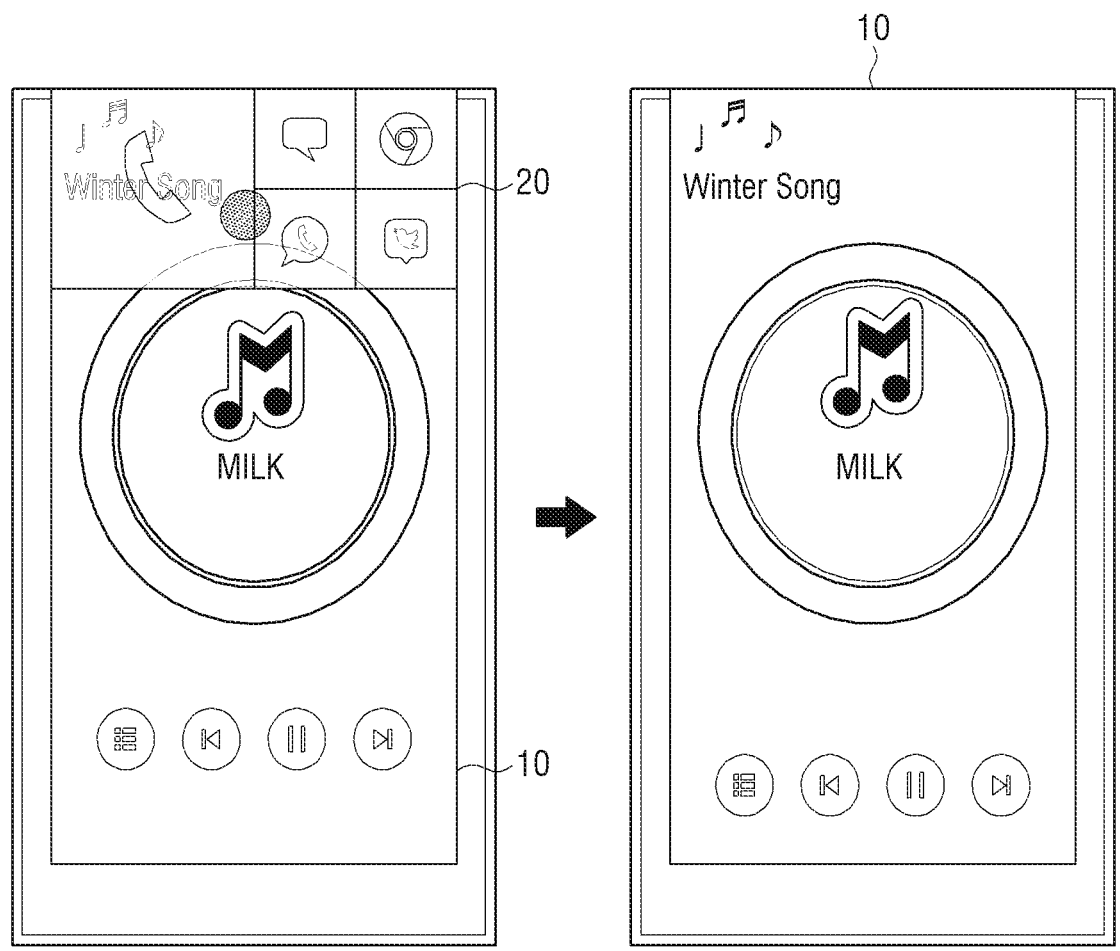
FIGS. 12A and 12B are views provided to explain an example of an operation with respect to a touch input.
Figure 12B:
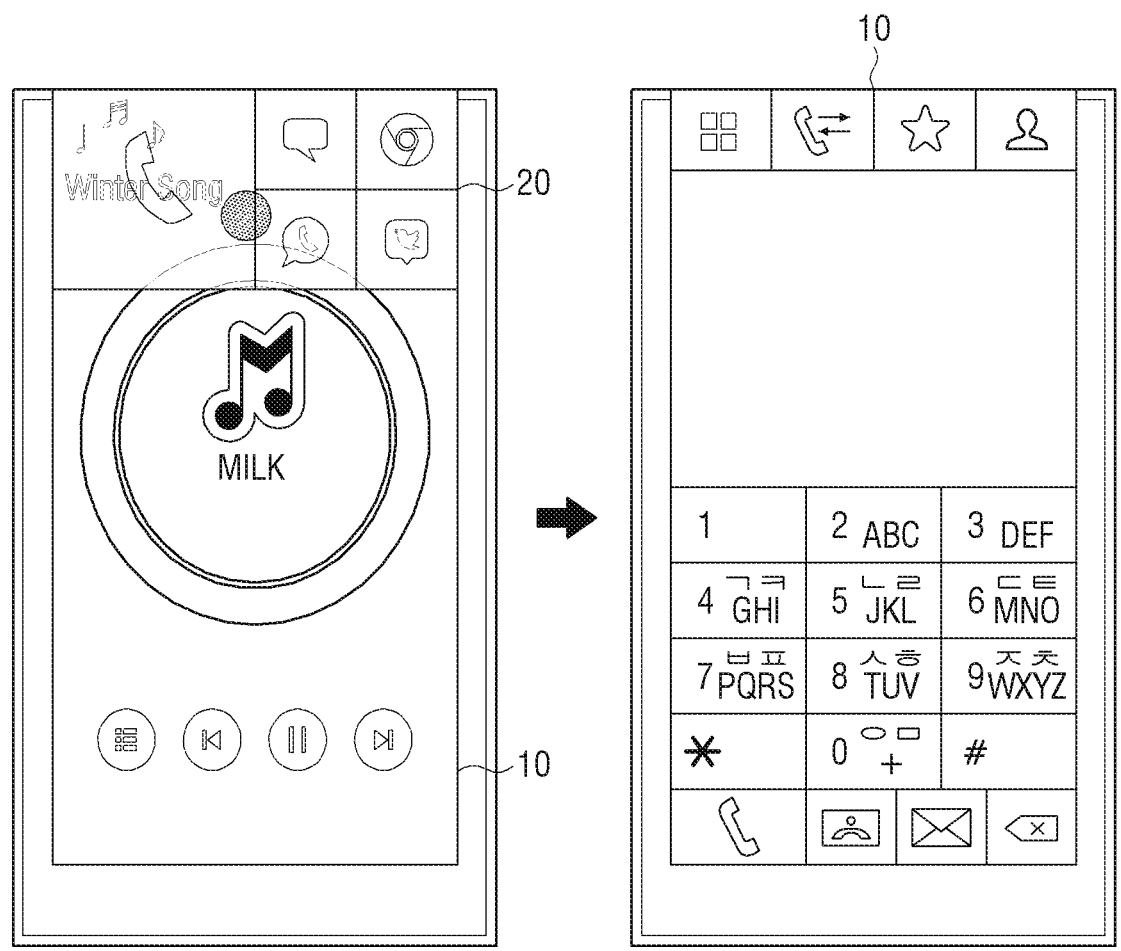

FIGS. 12A and 12B are views provided to explain an example of an operation with respect to a touch input.

Referring to FIG. 12A, if a touch input received on the sub display area 20 is released, the processor 120 may cause the UI displayed on the main display area 10 to disappear. For example, if a user who is touching the sub display area 20 takes his or her touch off, the processor 120 may cause the UI displayed on the main display area 10 to disappear. However, this is only an example, and the processor 120 may cause the UI displayed on the main display area 10 to disappear after a predetermined time elapses after a user's touch is released, or may increase the transparency of the UI displayed on the main display area 10 to make the UI gradually disappear. In addition, the processor 120 may display the UI displayed on the sub display area 20 on the main display area 10 according to a user's touch input, and continuously display the UI displayed on the main display area 10 even without a touch input, and if a touch input is received twice in a row, cause the UI to disappear.

Referring to FIG. 12B, the processor 120 may execute a function corresponding to the input of touching one point of the sub display area 20 while the UI displayed on the sub display area 20 is displayed on the main display area 10. The processor 120 may display the corresponding function on the main display area 10 and remove the UI. For example, if the input of touching the phone icon of the sub display area 20 is received while the UI displayed on the sub display area 20 is displayed on the main display area 10, the processor 120 may display a UI for making a phone call on the main display area 10. The touch input may be received in various ways as described above.

Figure 13A:
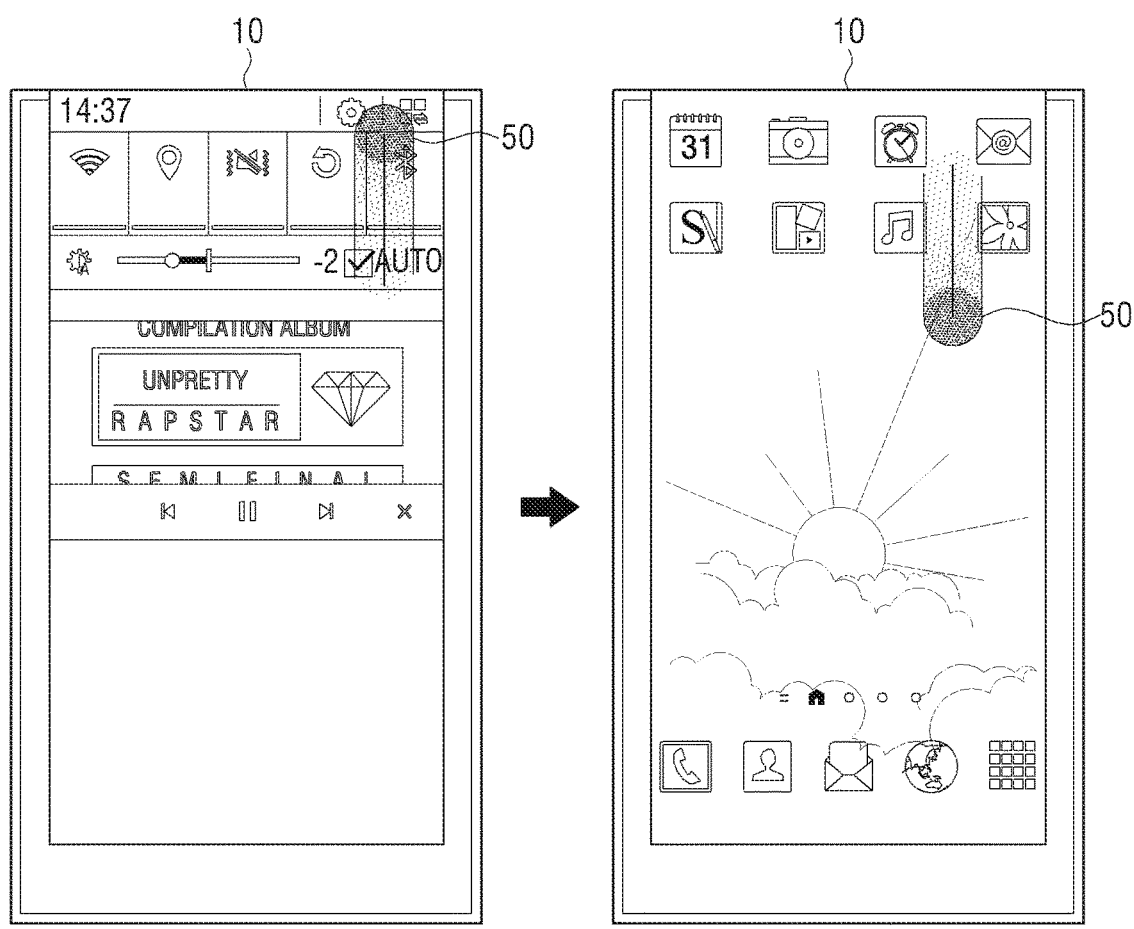
FIGS. 13A and 13B are views provided to explain an operation when a predetermined gesture is input according to an exemplary embodiment.
Figure 13B:
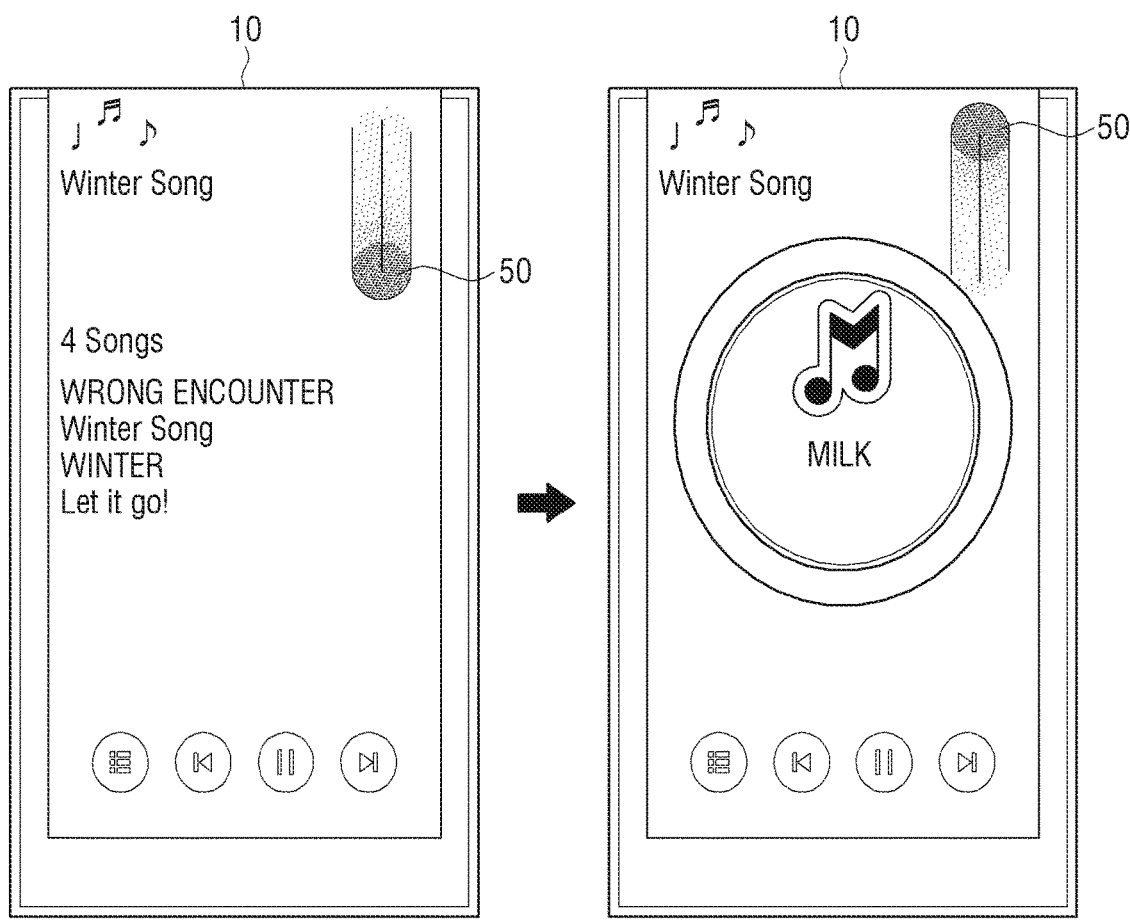

FIGS. 13A and 13B are views provided to explain an operation when a predetermined gesture is input according to an exemplary embodiment.

Referring to FIG. 13A, if a touch input is received on the sub display area 20 according to a predetermined gesture, the processor 120 may execute a function corresponding to the predetermined gesture. For example, if a drag input is received from a point on the sub display area 20 toward the connection part (the round display area) of the main display area 10 and the sub display area 20 as illustrated in the left view of FIG. 13A, the processor 120 may display a notification bar.

If a drag input is received from a connection part (the round display area) of the main display area 10 and the sub display area 20 toward the lower part of the sub display area 20 as illustrated in the right side of FIG. 13A, the processor 120 may cause the notification bar displayed to disappear.

However, this is only an example, and the processor 120 may perform a corresponding function with respect to a drag input in various directions. In addition, the processor 120 may perform a corresponding function with respect to a broken-line drag input or a curved-line drag input rather than a drag input in one direction. In addition, the processor 120 may execute a corresponding function with respect to not only the input of using one finger but also the input of using several fingers.

The predetermined gesture and the corresponding function may be predetermined by a manufacturer, but they may also be set by a user. For example, if a user inputs a drag input in the form of the small letter of 'm' on the sub display area 20, it may be set to display a UI related to a message on the main display area 10.

In addition, if the input of bringing down a point of the sub display area 20 is received while a UI screen for playing music is displayed on the main display area 10 as illustrated in the left view of FIG. 13B, the processor 120 may display a playlist of the music.

In addition, if the input of bringing up a point of the sub display area 20 is received while the playlist of music is displayed as illustrated in the right view of FIG. 13B, the processor 120 may remove the playlist of the music and display the UI screen where music is played. As described above, if a touch input is received on the sub display area 20 according to a predetermined gesture, the processor 120 may perform a different operation according to the function that is executed on the main display area 10. FIGS. 13A and 13B illustrate only a standby state and a music play state, but this is only an example. For example, if a touch input is received according to a predetermined gesture while a video is played on the main display area 10, the processor 120 may display a play information screen regarding the video.

Figure 14:
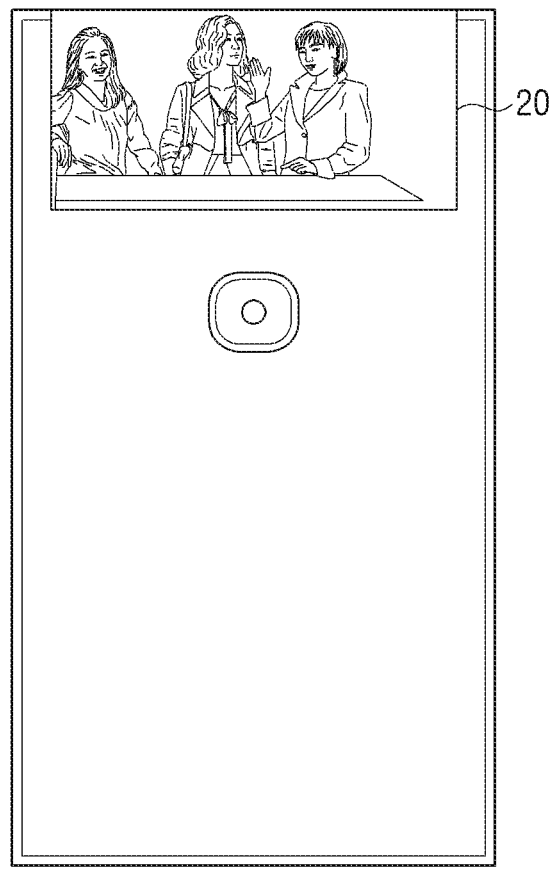
FIG. 14 is a view provided to explain a photographing operation of a user terminal apparatus according to an exemplary embodiment.
Figure 14:
Figure 14:
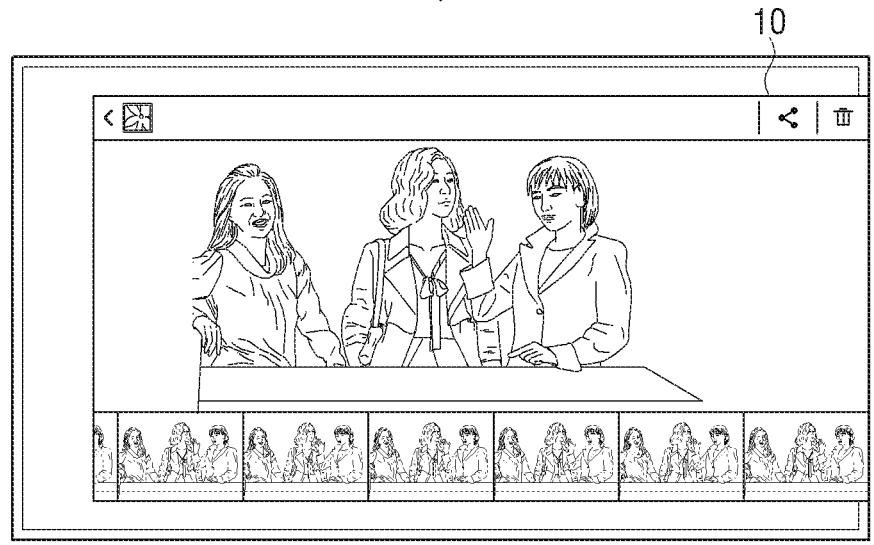

FIG. 14 is a view provided to explain a photographing operation of the user terminal apparatus 100 according to an exemplary embodiment.

As illustrated in FIG. 14, the processor 120 may control a camera to photograph an image and immediately display the photographed image on the sub display area 20. In addition, if the user terminal apparatus 100 is flipped, the processor 120 may display the photographed image displayed on the sub display area 20 on the main display area 10. The processor 120 may sense whether the user terminal apparatus 100 is turned over by using an acceleration sensor and a touch sensor. However, this is only an example, and the processor 120 may sense that the user terminal apparatus 100 is turned over based on whether a user's face is recognized by a camera.

If the operation where the user terminal apparatus 100 is turned over is sensed by a sensor while a user is using the main display area 10, the processor 120 may prepare for photographing by activating a camera. However, this is only an example, and the processor 120 may activate the camera and ready for photographing when a user's face is recognized by the camera provided on the rear surface of the user terminal apparatus 100.

Figure 15:
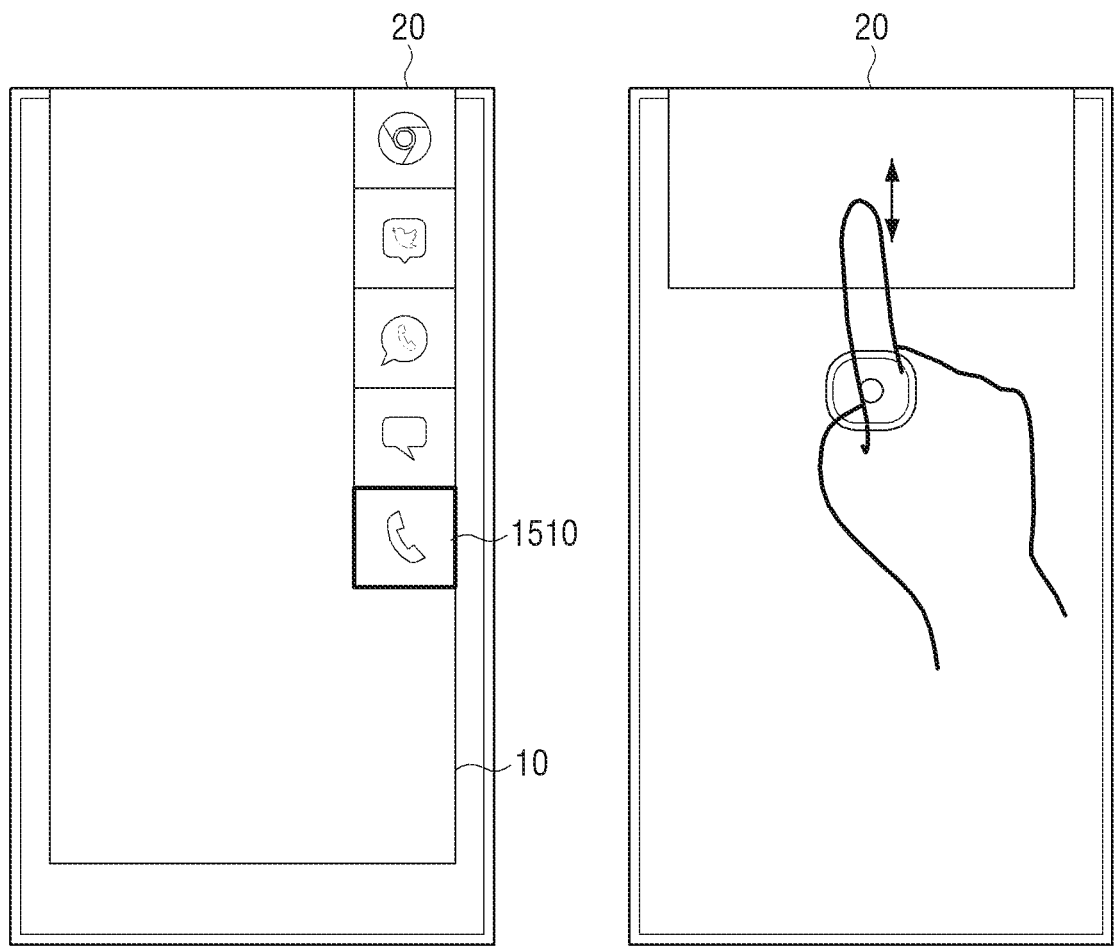
FIG. 15 is a view provided to explain a method of displaying a UI displayed on a sub display area on a main display area according to an exemplary embodiment.

FIG. 15 is a view provided to explain a method of displaying the UI displayed on the sub display area 20 on the main display area 10 according to another exemplary embodiment.

As illustrated in FIG. 15, if a predetermined touch input is received on the sub display area 20, the processor 120 may rearrange at least one UI element included in the UI displayed on the sub display area 20 and display the rearranged at least one UI element on the main display area 10. For example, the processor 120 may arrange and display a plurality of UI elements in a row on the main display area 10 as illustrated in FIG. 15. However, this is only an example, and the processor 120 may arrange UI elements in a different manner, or may receive an arrangement method from a user and arrange the UI elements.

The processor 120 may display a focus 1510 on one of a plurality of UI elements. For example, the processor 120 may display UI elements such that the edge of one of a plurality of UI elements is thicker than others. However, this is only an example, and the processor 120 may display UI elements such that one of a plurality UI elements darkly.

The processor 120 may change the location of the focus 1510 on the sub display area 20 according to a touch input that has the same directivity as the direction where the sub display area 20 is extended. However, this is only an example, and the processor 120 may change the location of the focus according to the number or consecutive touches or a touch input that has the directivity perpendicular to the direction where the sub display area 20 is extended.

Figure 16A:
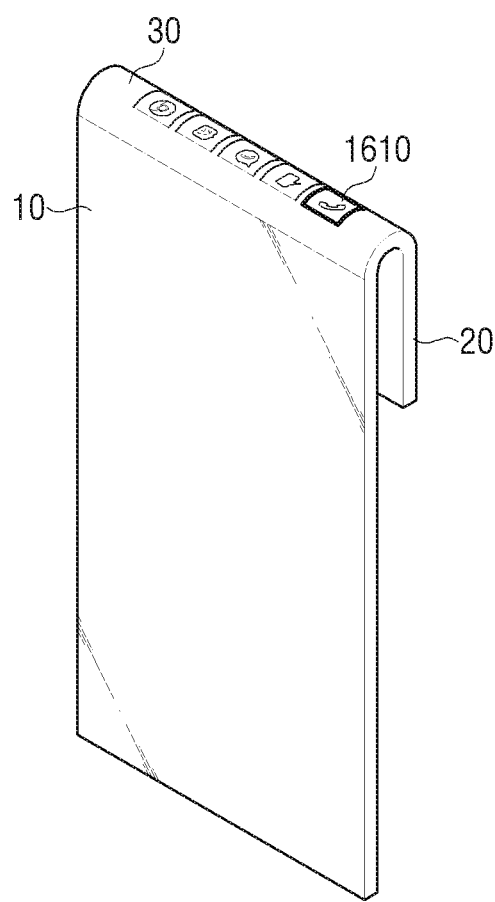
FIGS. 16A and 16B are views provided to explain a method of displaying a UI displayed on a sub display area on a round display area.
Figure 16B:
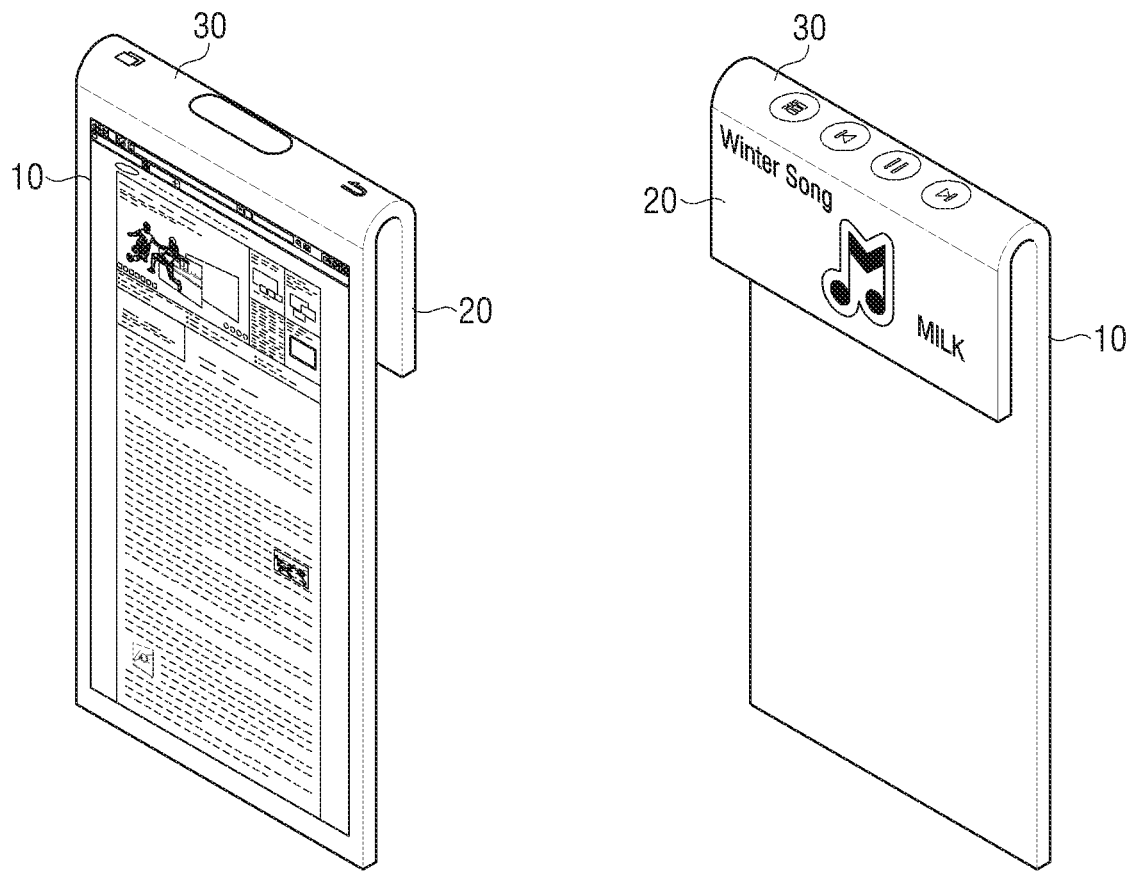

FIGS. 16A and 16B are views provided to explain a method of displaying the UI displayed on the sub display area 20 on the round display area 30.

Referring to FIG. 16A, if a predetermined touch input is received on the sub display area 20, the processor 120 may rearrange at least one UI element included in the UI displayed on the sub display area 20 and display the rearranged at least one UI element on a round display area 30. However, this is only an example, and a UI that is completely different from the UI displayed on the sub display area 20 may be displayed. For example, if a predetermined touch input is received on the sub display area 20, the processor 120 may display the UI displayed on the sub display area 20 on the main display area 10 and display a soft key on the round display area 30.

The processor 120 may display a focus 1610 on one of a plurality of UI elements and move the focus 1610 according to a user's touch input. As the detailed description thereof is the same as that of FIG. 15, so further description will not be provided for simplicity.

Meanwhile, FIG. 16A illustrates that the UI element is displayed on the round display area 30 according to a predetermined touch input on the sub display area 20, but this is only an example. For example, if a user uses the user terminal apparatus 100, the processor 120 may display a communication state, a battery state, memory information, etc. on the round display area 30. In addition, the processor 120 may display related information, such as information of a memory shortage, if necessary, even if the user does not use the user terminal apparatus 100.

Referring to FIG. 16B, the processor 120 may display an Internet screen on the main display area 10, and a screen where a music content is reproduced on the sub display area 20. In other words, the processor 120 may display UIs that are not related to each other on the main display area 10 and the sub display area 20.

The processor 120 may sense a user's gaze and activate a display function of only one of the main display area 10 and the sub display area 20. For example, if it is sensed that the user gazes the main display area 10 of the user terminal apparatus 100, the processor 120 may activate only the display function of the main display area 10. Alternatively, if it is sensed that the user gazes at the sub display area 20 of the user terminal apparatus 100, the processor 120 may activate only the display function of the sub display area 20. However, this is only an example, and the processor 120 may activate the display function of only one of the main display area 10 and the sub display area 20 according to the disposition state of the user terminal apparatus 100.

The processor 120 may display a UI related to the function executed in the area where a display function is activated on the round display area 30. For example, if the display function of the main display area 10 is activated and thus an Internet screen is displayed on the main display area 10, the processor 120 may display a soft key on the round display area 30 for controlling the function of the Internet screen. Alternatively, if the display function of the sub display area 20 is activated and thus a screen where a music content is reproduced is displayed on the sub display area 20, the processor 120 may display a UI for controlling the music content on the round display area 30. In other words, the processor 120 may display a UI related to the function executed in the area where the user gazes on the round display area 30. However, this is only an example, and the processor 120 may display the address of an Internet screen instead of a soft key on the round display area 30. In addition, the processor 120 may display, on the round display area 30, information regarding a music content that is reproduced instead of the UI for controlling the music content.

Further, the processor 120 may display a UI related to the function executed in an area where a display function is inactivated on the round display area 30. For example, if a user gazes at the main display area 10 and thus the sub display area 20 is inactivated, the processor 120 may display an Internet screen on the main display area 10, and display a UI for controlling a music content on the round display area 30. Alternatively, if the user gazes at the sub display area 20 and thus the main display area 10 is inactivated, the processor 120 may display a screen where a music content is reproduced on the sub display area 20, and display a soft key on the round display area 30.

Figure 17A:
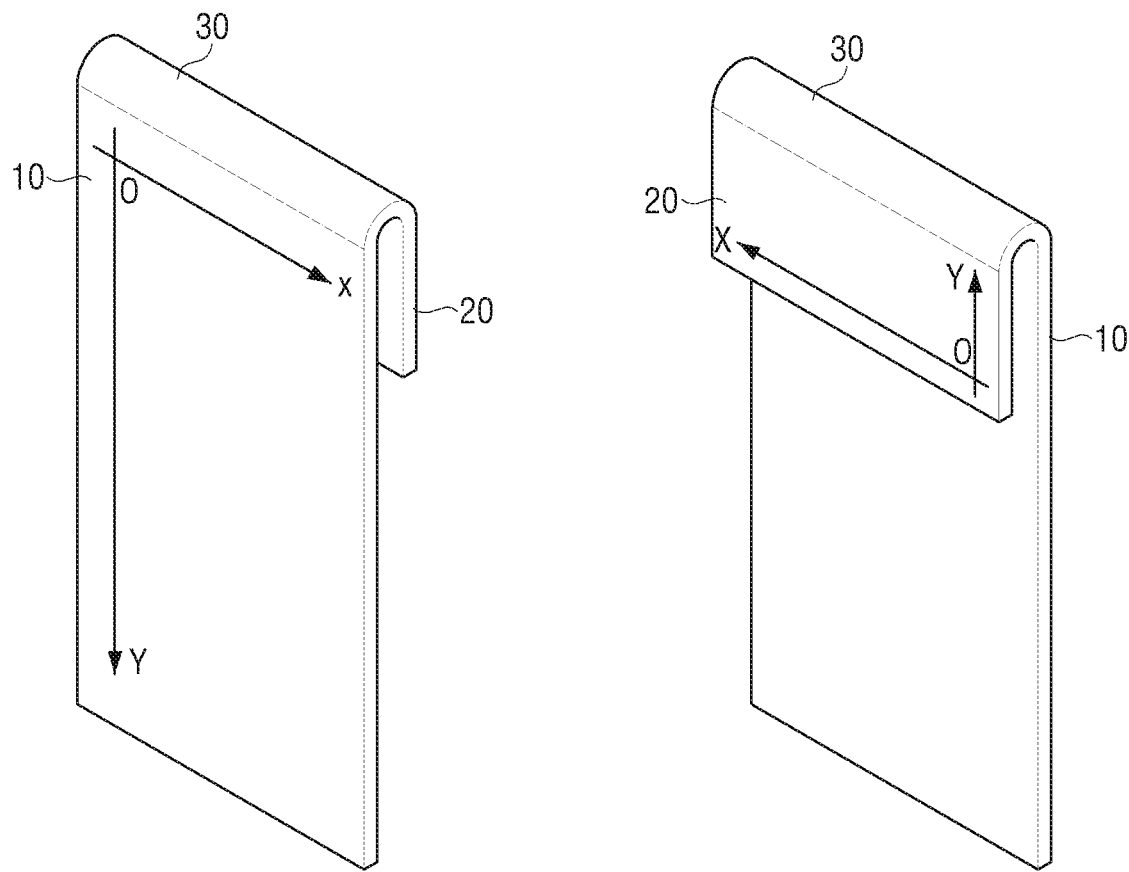
FIGS. 17A to 17C are views provided to explain an example of a method of recognizing a touch input.
Figure 17B:
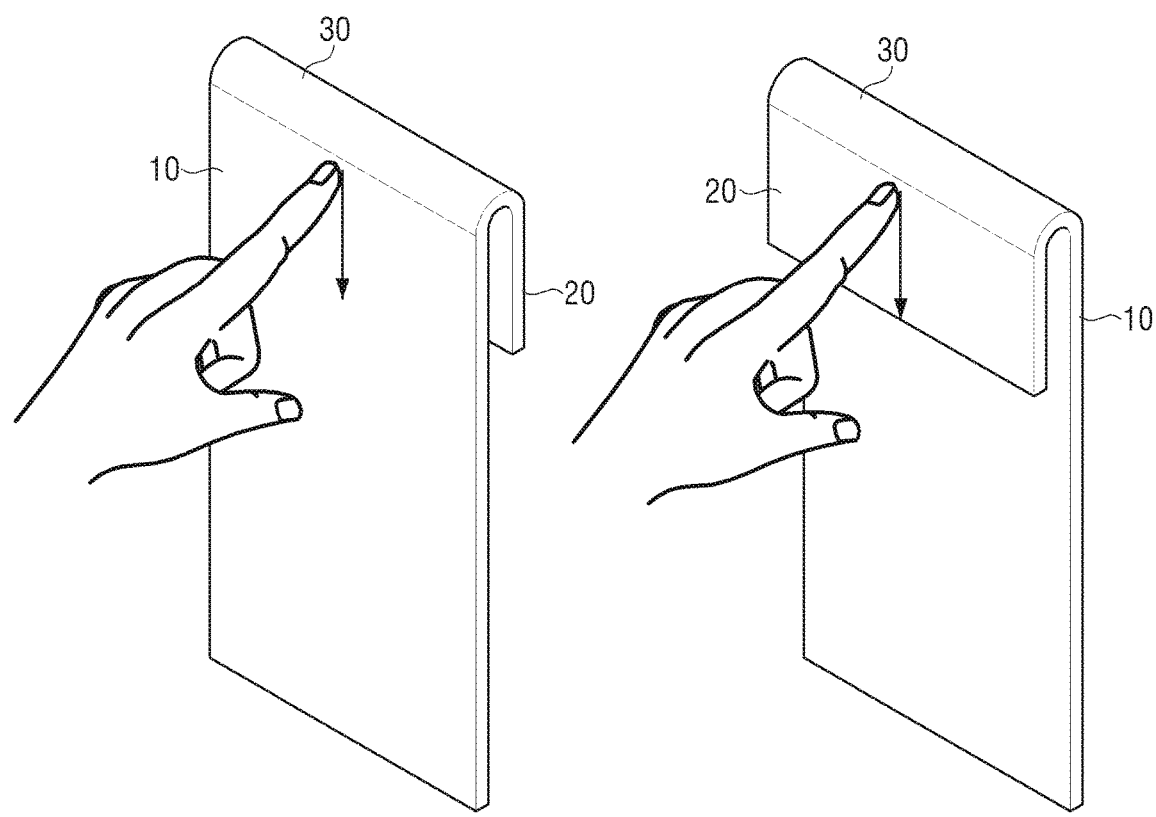
Figure 17C:
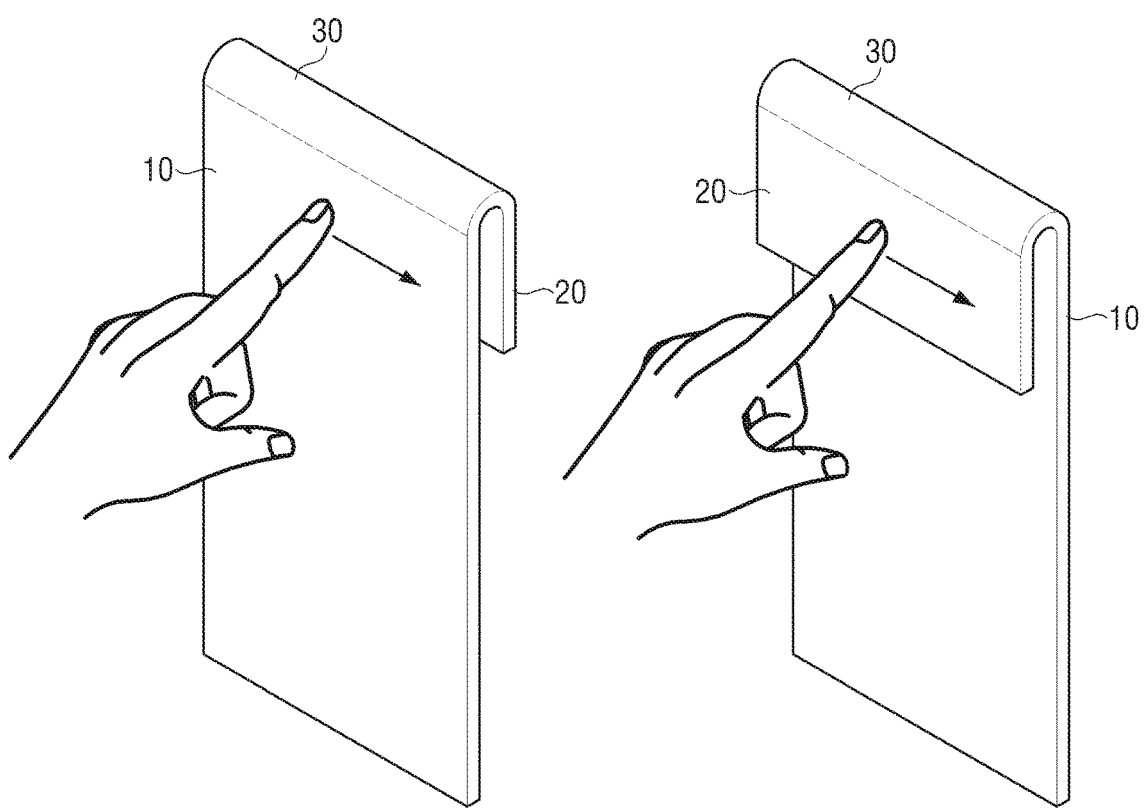

FIGS. 17A to 17C are views provided to explain an example of a method of recognizing a touch input.

FIG. 17A illustrates a standard of a touch input of the display 110. If it is assumed that as it goes farther to the upper right side and lower side with reference to the upper left side on the front side of the display 110, it has more positive value, as it goes farther to the left side and upper side with reference to the lower right side on the rear side of the display 110, it has more positive value. Accordingly, a problem may occur when a user wishes to control the UI of the sub display area 20, which is displayed on the main display area 10 while gazing at the main display area 10. Such a problem may occur as one touch panel is used and coordinates values are reversed in a curved form.

FIG. 17B is a view provided to explain a problem that may occur due to a touch input in a up and down direction. As illustrated in FIG. 17B, if the touch input having the same directivity as the direction where the sub display area 20 is received on the sub display area 20, the processor 120 may recognize the reverse direction of the received touch input and execute a function corresponding to the touch input.

It is assumed that a user controls the UI of the sub display area 20, which is displayed on the main display area 10 while gazing at the main display area. If a drag input in a down direction of the sub display area 20 is received, the processor 120 may determine that the value becomes smaller with respect to Y axis. In this case, the processor 120 may display the GUI displayed on the main display area 10 in response to a value increasing with respect to Y axis.

FIG. 17C is a view provided to explain a problem that may occur due to a touch input in a left and right direction. As illustrated in FIG. 17C, if a drag input regarding an X axis direction is received on the sub display area 20, the processor 120 may recognize the direction of the received touch input reversely and execute a function corresponding to the drag input.

It is assumed that a user controls a UI of the sub display area 20, which is displayed on the main display area 10 while gazing at the main display area 10. If a touch input in the right direction of the sub display area 20 is received, the processor 120 may determine that a value with respect to the X axis becomes smaller. In this case, the processor 120 may display the GUI displayed on the main display area 10 in response to the value with respect to the X axis becoming greater. However, this is only an example, and there may be various ways as described above. In addition the setting may be determined by a user.

Figure 18A:
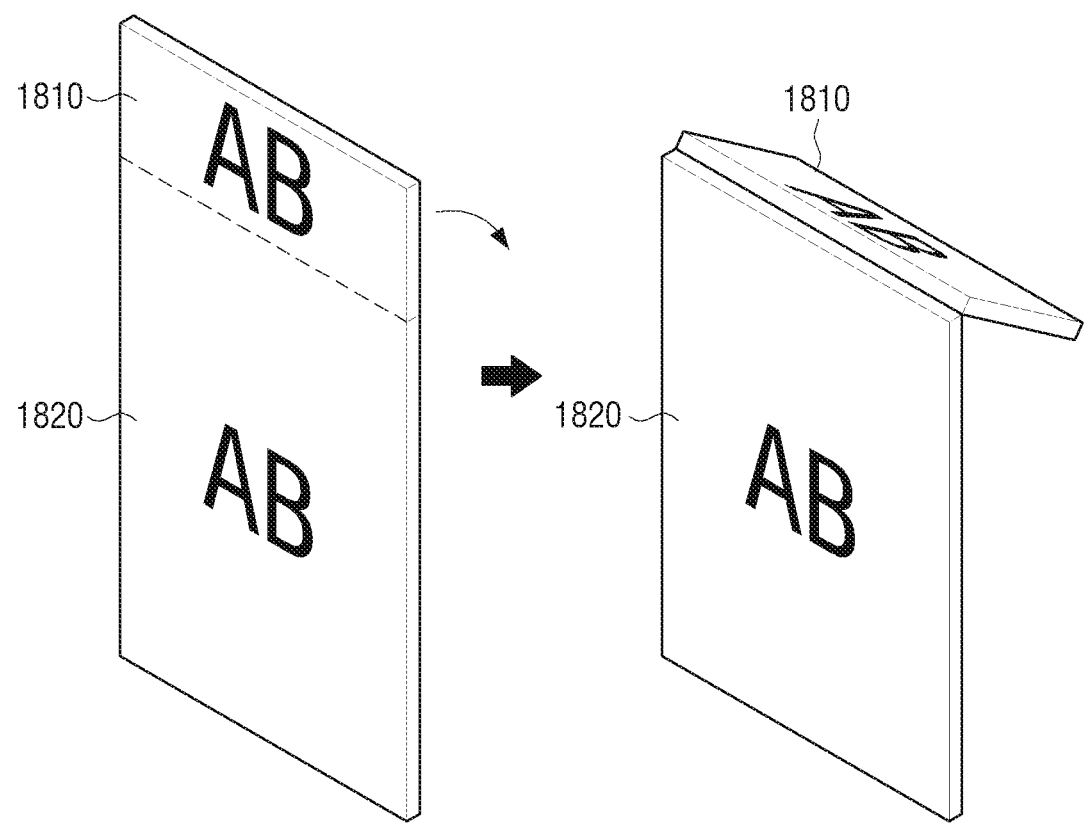
FIGS. 18A and 18B are views provided to explain configuration of a display according to an exemplary embodiment.
Figure 18B:
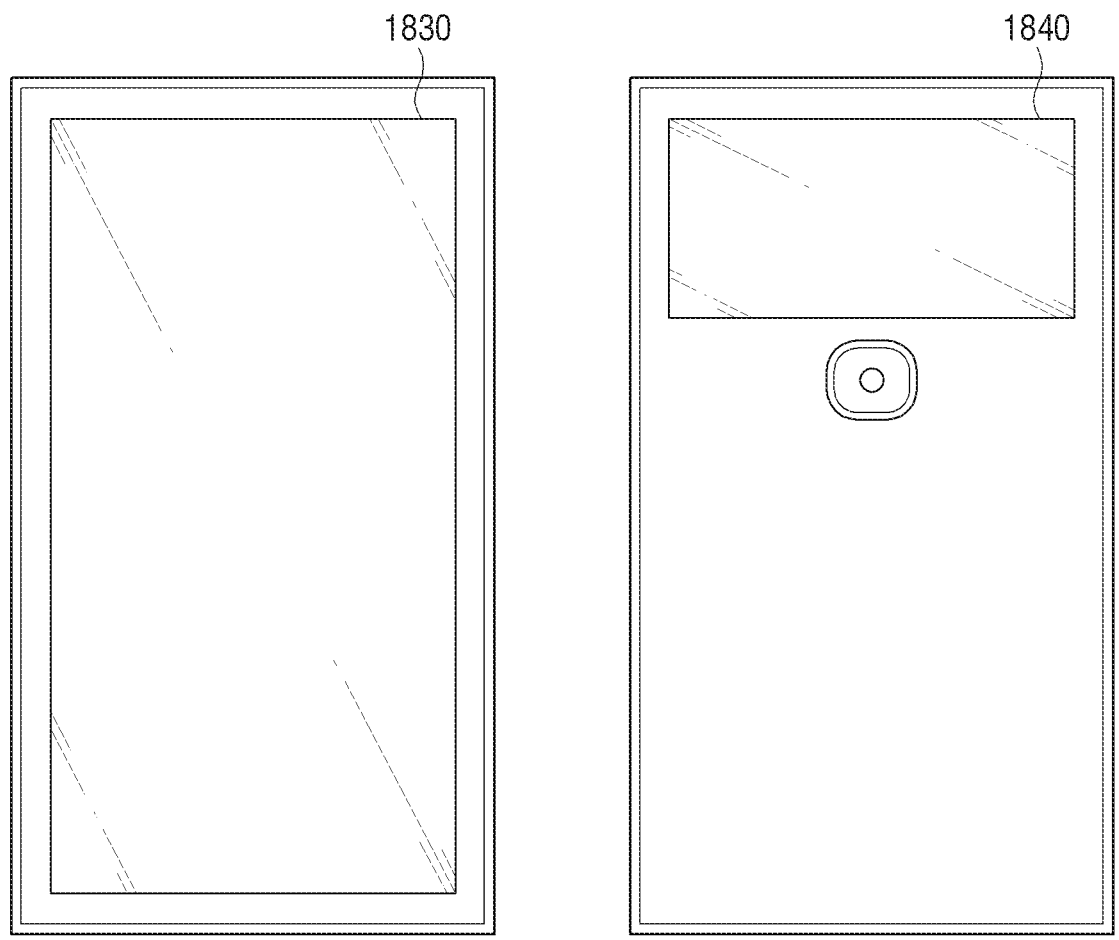

FIGS. 18A and 18B are views provided to explain configuration of a display according to an exemplary embodiment.

FIG. 18A illustrates a flexible display. A user may fold and use the flexible display. In this case, a folded area 1810 corresponds to the sub display area 20, and an unfolded area 1820 corresponds to the main display area 10. If a touch input is received on the folded area 1810, the UI displayed on the folded and flipped area 1810 may be displayed on the unfolded area 1820.

FIG. 18A illustrates that the size of the folded area 1810 is smaller than that of the unfolded area 1820, but this is only an example. For example, a user may fold the flexible display in the middle to have two identical display areas and use the flexible display.

From among the above-described exemplary embodiments, most of the exemplary embodiments except the round display area 30 can be applied to a flexible display, and further description will not be provided. However, if a flexible display is folded twice and a round display area is formed, the above-described exemplary embodiment regarding a round display area can be applied.

FIG. 18B illustrates a user terminal apparatus having a plurality of displays on the front and rear sides. In this case, the front display corresponds to the main display area 10, and the rear display 1840 corresponds to the sub display area 20. Likewise, except the round display area, most of the exemplary embodiments can be applied to a user terminal apparatus having displays on the front and rear sides and thus, further description will not be provided.

Figure 19:
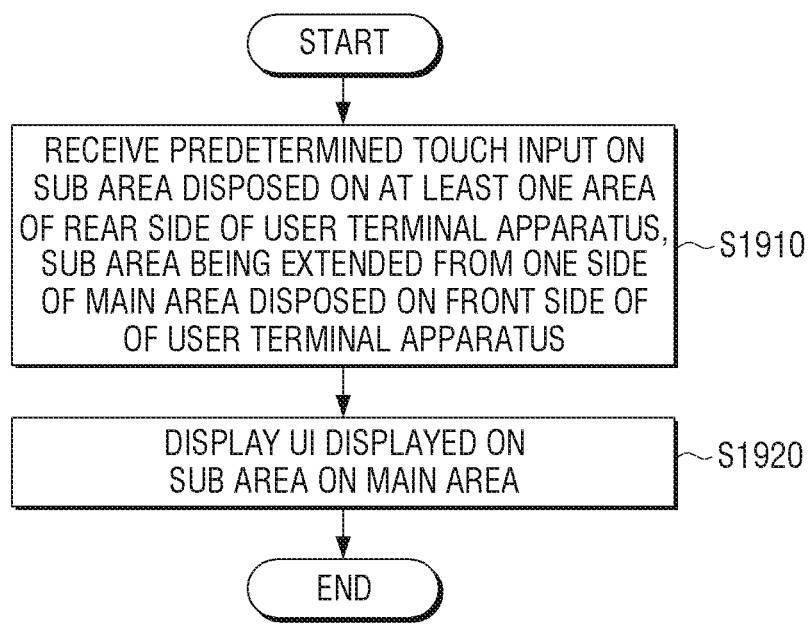
FIG. 19 is a flowchart provided to explain a controlling method of a user terminal apparatus according to an exemplary embodiment.

FIG. 19 is a flowchart provided to explain a controlling method of a user terminal apparatus according to an exemplary embodiment.

A user terminal apparatus receives a predetermined touch input on a sub display area that is disposed at least one area of the rear side of the user terminal apparatus, that is extended from one side of a main display area disposed on the front side of the user terminal apparatus (S1910). The UI displayed on the sub display area is displayed on the main display area (S1920).

Here, the displaying (S1920) may include displaying the UI displayed on the sub display area by overlaying the UI displayed on the sub display area with the UI displayed on the main display area.

In addition, the displaying (S1920) may including displaying at least one UI included in the UI displayed on the sub display area such that the UI has predetermined transparency at a location of the main display area corresponding to the display location of the sub display area.

The displaying (S1920) may include displaying a GUI indicating a point touched on the sub display area at a corresponding location of the main display area.

The displaying (S1920) may include display a UI in a different form on the sub display area according to the type of content displayed on the main display area.

Meanwhile, if a touch input received on the sub display area is released, the step of causing the UI displayed on the main display area to disappear may be further included.

In addition, the receiving (S1910) may further include that the touch input has the same directivity as the direction where the sub display area is extended on the sub display area, and further include recognizing the direction of the received touch input reversely and executing a function corresponding to the touch input.

Meanwhile, the displaying (S1920) includes, if the main display area is activated, displaying the UI displayed on the sub display area on the main display area.

The receiving (S1910) may further include that the touch input is a touch input according to a predetermined gesture on the sub display area, and further include executing a function corresponding to the predetermined gesture.

Meanwhile, the sub display area may be extended to be bent from an upper side of the main display area and disposed on an upper area of the rear side, and the bent area may be in a curved form.

According to the above-described various exemplary embodiments, if a user's touch input is received on a display area that is disposed on the rear side of a user terminal apparatus, the user terminal device may allow a user to watch the UI displayed on the rear side without flipping the user terminal apparatus as the UI displayed on the rear side is also displayed on the front side and thus it is more convenient for a user to use the terminal apparatus.

In the above description, both the main display area and the sub display area are used, but there may be other exemplary embodiments. For example, if a user uses only the sub display area, the processor may inactivate a touch function of the main display area. In addition, if it is determined that a user gazes at the sub display area, the processor may inactivate a display function of the main display area.

In addition, a user terminal apparatus may provide a power-saving mode. For example, if a first power saving mode is activated, the processor may inactivate at least one of the touch function and the display function of the sub display area. In addition, if a second power saving mode is activated, the processor may inactivate at least one of the touch function and the display function of the main display area.

Meanwhile, methods according to the above-described various exemplary embodiments may be programmed and stored in a storage medium. Accordingly, the methods according to the above-described exemplary embodiments may be implemented in various types of electronic apparatuses which execute the storage medium.

Specifically, according to an exemplary embodiment, there may be provided a non-transitory computer readable medium storing a program performs receiving a predetermined touch input on a sub display area that is disposed on at least one area of a rear side of a user terminal apparatus, the sub display area being extended from one side of a main display area disposed on the front side of the user terminal apparatus and displaying a UI displayed on the sub display area on the main display area sequentially.

The non-transitory recordable medium refers to a medium that may store data semi-permanently rather than storing data for a short time, such as register, cache, memory, etc. and is readable by an apparatus. Specifically, the above-described various applications and programs may be stored and provided in a non-transitory recordable medium such as CD, DVD, hard disk, Blu-ray disk, USB, memory card, ROM, etc.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A user terminal apparatus, comprising:
a display comprising:
a main display area disposed on a front side of the user terminal apparatus; and
a sub display area extended from one side of the main display area to be disposed on at least one area of a rear side of the user terminal apparatus; and
a processor configured to, based on a touch input being input on the sub display area, control the display to:
overlay a first user interface (UI) that is displayed on the sub display area, on a second UI that is displayed on the main display area, while the touch input is input on the sub display area; and
display an UI element included in the first UI overlaid on the second UI, the UI element being displayed on a location of the main display area corresponding to a display location of the sub display area.

2. The apparatus as claimed in claim 1, wherein the UI element has predetermined transparency.

3. The apparatus as claimed in claim 1, wherein the processor is further configured to control the display to display a graphical user interface (GUI) indicating a point that is touched on the sub display area, on a corresponding location of the main display area.

4. The apparatus as claimed in claim 1, wherein the processor is further configured to control the display to display the first UI in a different form on the sub display area, based on a type of content that is displayed on the main display area.

5. The apparatus as claimed in claim 1, wherein the processor is further configured to, based on the touch input on the sub display area being released, control the display such that the second UI displayed on the main display area disappears.

6. The apparatus as claimed in claim 1, wherein the processor is further configured to, based on the touch input having a first direction same as a second direction in which the sub display area is extended being input on the sub display area, recognize a reverse direction of the touch input, and perform a function corresponding to the reverse direction that is recognized.

7. The apparatus as claimed in claim 1, wherein the processor is further configured to, based on the main display area being activated, control the display to display the first UI displayed on the sub display area, on the main display area.

8. The apparatus as claimed in claim 1, wherein the processor is further configured to, based on a predetermined touch gesture being input on the sub display area, perform a function corresponding to the predetermined touch gesture.

9. The apparatus as claimed in claim 1, wherein the sub display area is extended to be bent from an upper side of the main display area to be disposed on an upper area of the rear side, and
wherein the sub display area extended to be bent is in a curved form.

10. A controlling method of a user terminal apparatus with a display comprising of a main display area disposed on a front side of the user terminal apparatus, and a sub display area extended from one side of the main display area to be disposed on at least one area of a rear side of the user terminal apparatus, the method comprising:
based on a touch input being input on the sub display area:
overlaying a first user interface (UI) that is displayed on the sub display area, on a second UI that is displayed on the main display area, while the touch input is input on the sub display area; and display an UI element included in the first UI overlaid on the second UI, the UI element being displayed on a location of the main display area corresponding to a display location of the sub display area.

11. The method as claimed in claim 10, wherein the UI element has predetermined transparency.

12. The method as claimed in claim 10, wherein the overlaying comprises displaying a graphical user interface (GUI) indicating a point that is touched on the sub display area, on a corresponding location of the main display area.

13. The method as claimed in claim 10, wherein the overlaying comprises displaying the first UI in a different form on the sub display area, based on a type of content that is displayed on the main display area.

14. The method as claimed in claim 10, further comprising, based on the touch input on the sub display area being released, controlling the second UI displayed on the main display area to disappear.

15. The method as claimed in claim 10, further comprising, based on the touch input having a first direction same as a second direction in which the sub display area is extended being input on the sub display area, recognizing a reverse direction of the touch input, and performing a function corresponding to the reverse direction that is recognized.

16. The method as claimed in claim 10, wherein the overlaying comprises, based on the main display area being activated, displaying the first UI displayed on the sub display area, on the main display area.

* * * * *